United States Patent
Iino et al.

[11] Patent Number: 6,067,795
[45] Date of Patent: May 30, 2000

[54] HYDRAULIC CONTINUOUSLY VARIABLE TRANSMISSION FOR USE ON VEHICLE

[75] Inventors: Takashi Iino; Yoshihiro Katagiri, both of Kawachi-gun; Shigeru Morimoto, Utsunomiya, all of Japan

[73] Assignee: Honda Giken Kogyo Kabushiki Kaisha, Tokyo, Japan

[21] Appl. No.: 09/075,030

[22] Filed: May 8, 1998

[30] Foreign Application Priority Data

May 12, 1997 [JP] Japan .............................. H09-137847

[51] Int. Cl.⁷ ..................................................... F16D 31/08
[52] U.S. Cl. .............................. 60/327; 60/436; 60/442; 60/468; 180/338
[58] Field of Search ............................ 60/327, 436, 437, 60/442, 464, 468; 180/307, 338

[56] References Cited

U.S. PATENT DOCUMENTS

| | | | |
|---|---|---|---|
| 3,923,129 | 12/1975 | Rusch et al. | 60/436 |
| 4,887,428 | 12/1989 | Iino | 60/468 |
| 4,958,494 | 9/1990 | Maki et al. | 60/468 |
| 5,001,900 | 3/1991 | Sasajima et al. | 60/327 |
| 5,277,286 | 1/1994 | Yamamoto et al. | 60/468 |

FOREIGN PATENT DOCUMENTS 62-147148 of 1987 Japan .
2566457 of 1996 Japan .

OTHER PUBLICATIONS

English language translation of Abstract of JP 62–147148.
English language translation of Abstract of JP 2566457.

*Primary Examiner*—F. Daniel Lopez
*Attorney, Agent, or Firm*—Lyon & Lyon LLP

[57] ABSTRACT

A hydraulic continuously variable transmission for use on a vehicle comprises a hydraulic closed circuit, first and second pressure controlling means, brake operation detecting means and deceleration detecting means. The hydraulic closed circuit includes a hydraulic pump, a hydraulic motor, a first oil passage connecting a port of the hydraulic pump with a port of the hydraulic motor and a second oil passage connecting another port of the hydraulic pump with another port of the hydraulic motor, and first and second pressure controlling means control the pressures of the first and second oil passages, respectively. If the deceleration of the vehicle is greater than a standard deceleration when the operation of the brake is detected, then the pressure of the first or second oil passage whose pressure is higher than that of the other is lowered to a predetermined low pressure that is higher than the pressure of either oil passage which is lower by either the first or second pressure controlling means. This predetermined low pressure is determined in reverse proportion to the engine rotational speed, thus preventing the engine from stalling when the wheels are locked up in an abrupt braking operation.

16 Claims, 37 Drawing Sheets

Fig. 20
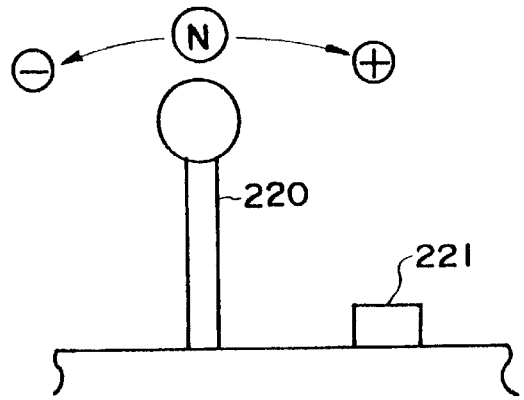
Fig. 21
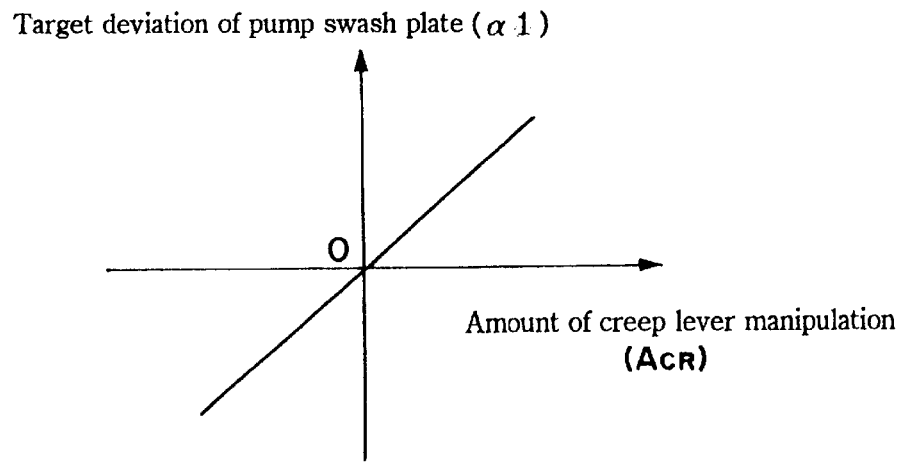
Target deviation of pump swash plate ($\alpha 1$)
Amount of creep lever manipulation ($A_{CR}$)
Fig. 22
| SHIFT POSITION | N, P | R | D, L, S, M | |
|---|---|---|---|---|
| BRAKE | Both ON and OFF | | OFF | ON |
| $\alpha 0$ | 0 | Predetermined value 1 | Predetermined value 2 | Predetermined value 3 |
| $\beta 0$ | 0 | MAX | MAX | |

| DRIVE DIRECTION | FORWARD (FLAT ROAD) | | REARWARD (FLAT ROAD) | |
|---|---|---|---|---|
| ACCELERATION DECELERATION CONDITION | ACCELERATION | DECELERATION | ACCELERATION | DECELERATION |
| FIRST OIL PASSAGE | HIGH PRESSURE | LOW PRESSURE | LOW PRESSURE | HIGH PRESSURE |
| SECOND OIL PASSAGE | LOW PRESSURE | HIGH PRESSURE | HIGH PRESSURE | LOW PRESSURE |

*Fig. 41*

| NN 0. | DETERMINATION FACTORS | | | | | | DETERMINATION RESULTS | |
|---|---|---|---|---|---|---|---|---|
| | SHIFT POSITION | ≤IDLE NE | ≤PREDETERMINED VEHICLE SPEED | ≤PREDETERMINED TH | BRAKE ON | | SETTING OF TARGET HIGH RELIEF PRESSURE (PHA) FOR ACCELERATION I | SETTING OF TARGET HIGH RELIEF PRESSURE (PHB) FOR DECELERATION II |
| ① | YES | — | — | — | — | → | 0 | 0 |
| ② | NO | YES | — | — | — | → | SET IN CORRESPONDENCE WITH NE | SET IN CORRESPONDENCE WITH NE |
| ③ | NO | NO | YES | YES | YES | → | PREDETERMINED VALUE | PREDETERMINED VALUE |

*Fig. 44*

Fig. 45
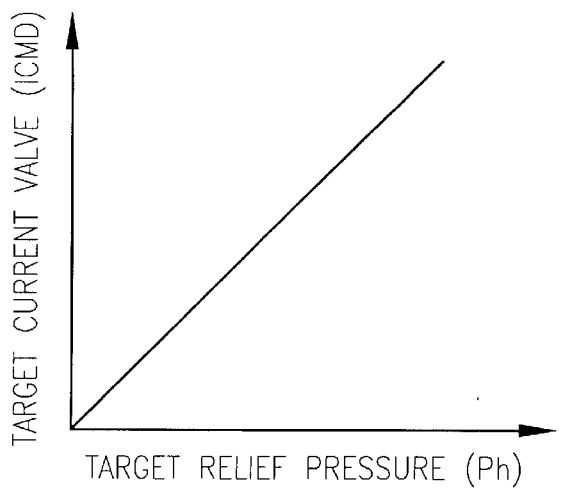
Fig. 47
| DETERMINATION FACTORS | | | DETERMINATION FACTORS | |
|---|---|---|---|---|
| PUMP DISCHARGE Qp>Qp0 | HIGH PRESSURE GENERATED Ph>Ph0 | | SUBNOTCH VALVE (SUB-OIL PASSAGE) | SOLENOID VALVE ⑪ ⑫ |
| YES | – | | OPEN | OFF |
| NO | NO | | OPEN | OFF |
| NO | YES | | CLOSE | ON |
Fig. 48
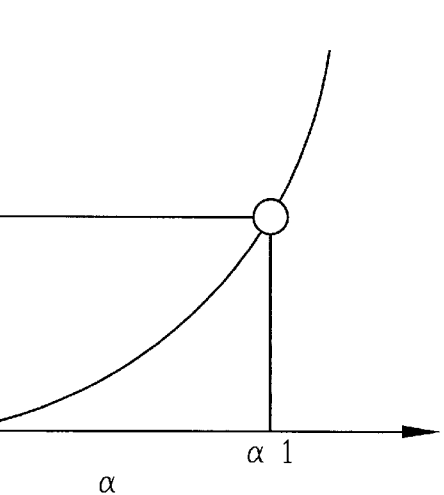

HYDRAULIC CONTINUOUSLY VARIABLE TRANSMISSION FOR USE ON VEHICLE

FIELD OF THE INVENTION

The present invention relates to a hydraulic continuously variable transmission, which can be used on a vehicle, the transmission comprising a hydraulic pump and a hydraulic motor, at least one of which is of a variable displacement type. In this transmission, the pump being driven by the engine delivers the hydraulic oil that actuates the motor, which will, in turn, drive the vehicle.

BACKGROUND OF THE INVENTION

Various types of hydraulic continuously variable transmissions have been proposed in constructions comprising a hydraulic pump and a hydraulic motor, at least one of which is of a variable displacement type. Also, plunger type swash plate pumps and motors are well-known as a pump and a motor which can be used in variable displacement for such transmissions. In addition, there is another type of hydraulic continuously variable transmission which is known as hydromechanical continuously variable transmission (e.g., Japanese Laid-Open Patent Publication No. S62(1987)-147148). This type of transmission includes a mechanism for carrying out mechanical power transmission, which is provided parallel to a power transmission mechanism that comprises a hydraulic pump and a hydraulic motor. The above mentioned former type, which comprises only a hydraulic pump and a hydraulic motor, is generally referred to as "hydrostatic continuously variable transmission". Therefore, here, both types, including the latter, are termed as "hydraulic continuously variable transmission."

Such hydraulic continuously variable transmissions require simultaneous control of the throttling of the engine and the varying of the capacities of the hydraulic pump and the hydraulic motor. For this reason, a number of control methods are practiced at present, and, for example, Japanese Patent Publication No. 2566457 discloses a method for controlling the speed change ratio (i.e., a method for controlling the capacities of the pump and the motor). In this method, the actual engine rotational speed is brought to a target engine rotational speed that is determined in relation to the degree of operation of the accelerator (i.e., the engine throttle opening).

In the vehicle which is controlled by this control method, when the brake pedal is stepped down, generally the accelerator pedal is released. This return of the accelerator pedal causes the accelerator to come into a complete closure, to which condition, a small target engine rotational speed is assigned. Generally, when the target engine rotational speed becomes small, the speed change is controlled toward the TOP. For example, if the speed of the vehicle decreases gradually in response to a normal operation of the brake, then the speed change ratio is adjusted toward the TOP (or it stays at the TOP if it was there before the operation of the brake). Thereafter, the engine rotational speed decreases as the speed of the vehicle decreases, and when it reaches the target rotational speed or below, the speed change ratio is then controlled to shift toward the LOW. Along with this control, in the transmission that is described in the above mentioned patent publication, when the speed of the vehicle decreases to a certain speed, another control is carried out to open a clutch valve that shortcircuits the hydraulic closed circuit which is provided for the operation of the hydraulic pump and the hydraulic motor.

However, if the wheels of the vehicle are locked up in an abrupt braking operation, then the rotational speed of the output shaft of the hydraulic motor decreases to zero in response to the lock up of the wheels, and the rotational speed of the hydraulic pump also decreases to zero very rapidly. As a result, the rotational speed of the engine, which drives the pump, also deceases rapidly, and this condition may cause a problem of engine stall.

In the transmission which is described in the above Patent Publication No. 2566457, for preventing the engine from stalling, the target engine rotational speed is amended to a larger value when the brake is operated, so that the speed change ratio shifts toward the LOW earlier, and the engine rotational speed is prevented from decreasing too much to cause an engine stall. However, generally the response of the shift control of the speed change ratio is low, so the decrease of the engine rotational speed which results from the wheel lock caused by a quick or abrupt application of the brake occurs before the start of the control to shift the speed change ratio toward the LOW, and the problem of engine stall is likely to happen.

Therefore, the transmission of the above patent publication includes a main clutch valve that shortcircuits the two oil passages which constitute the hydraulic closed circuit, and when the speed of the vehicle decreases, this main clutch valve is opened to prevent the engine from stalling. However, most hydraulic continuously variable transmissions are not equipped with this kind of valve, and they are designed to establish a neutral condition by bringing the skew angle of the swash plate of the pump to zero degree. However, when such an abrupt or quick braking operation is applied as to lock up the wheels, the response of the skew angle control of the swash plate fails to establish the neutral condition. In this condition, there may be a problem that the engine rotational speed may decrease rapidly, thus causing an engine stall.

SUMMARY OF THE INVENTION

It is an object of the present invention to provide a hydraulic continuously variable transmission for use on a vehicle which can prevent the engine from stalling even in a condition where the wheels are locked up in an abrupt braking operation.

In order to achieve this objective, the present invention embodies a hydraulic continuously variable transmission for use on vehicle which comprises a hydraulic pump and a hydraulic motor, at least one of which is of a variable displacement type. In this transmission, the hydraulic pump which is driven by the engine delivers oil that actuates the hydraulic motor, and the hydraulic motor in turn drives the vehicle. This transmission further comprises a hydraulic closed circuit, first and second pressure controlling means, brake operation detecting means, which detects the operation of the brake, and deceleration detecting means, which detects the deceleration of the vehicle. The hydraulic closed circuit includes a first oil passage connecting one of the two ports of the hydraulic pump with one of the two ports of the hydraulic motor and a second oil passage connecting the other port of the hydraulic pump with the other port of the hydraulic motor, and the first and second pressure controlling means control the pressures of the first and second oil passages, respectively. In this transmission, if the deceleration of the vehicle, which is detected by the deceleration detecting means, is greater than a standard deceleration when the brake operation detecting means detects the operation of the brake, then either the first pressure controlling means or the second pressure controlling means controls to lower the pressure of either the first oil passage or the second oil passage whose pressure is higher than that of the other to a predetermined low pressure that is higher than the pressure of either oil passage which is lower. This predetermined low pressure is determined in reverse proportion to the engine rotational speed, so the higher the engine rotational speed, the lower the value for the predetermined low pressure.

If there is a braking operation applied so abrupt as to cause the wheels of the vehicle to lock up, then the pressure of either oil passage whose pressure is higher than that of the other (i.e., the high relief pressure) is lowered to the predetermined low pressure in the hydraulic closed circuit. As the response of this pressure control is quite good, it is possible to lower this pressure in synchronization with the decrease of the engine rotational speed. Therefore, the engine is prevented from stalling when the engine rotational speed decreases greatly in a wheel lock condition. As the predetermined low pressure is higher than the pressure of either oil passage which is lower (i.e., the low relief pressure), the pressure control of the hydraulic closed circuit is maintained intact in the original condition, and the relation between the oil passage at a higher pressure and the oil passage at a lower pressure is retained without being reversed.

The predetermined low pressure, which is set to a relatively low value for a relatively high engine rotational speed, is determined in consideration of the general condition that the engine torque is relatively large while the engine rotational speed is low, but the engine torque becomes smaller as the engine rotational speed increases. The predetermined low pressure, to which the pressure of either oil passage whose pressure is higher than that of the other (i.e., the high relief pressure) is lowered, is maintained as high as possible within the limit that prevents the engine from stalling. In fact, when the engine torque is relatively large while the engine rotational speed is low, there is no problem of engine stall even if the predetermined low pressure is set to a relatively high value. As the predetermined low pressure, which is the momentary pressure of either oil passage whose pressure is higher than that of the other, is maintained as high as possible, the recovery of this pressure to the original high relief pressure is performed smoothly after the braking operation is terminated.

It is preferable that the transmission further comprise shift determination means, which determines whether there is a shift position change or not, and that only if the shift determination means determines that there is no shift position change, then the control which lowers the pressure of either oil passage whose pressure is higher than that of the other to the predetermined low pressure is performed. This is to exclude the condition where the deceleration of the vehicle may increase greatly without operation of the brake while the speed change ratio changes rapidly in a shift position change. In such condition, engine stall never happens even if the wheels are locked up.

It is also preferable that if the control which lowers the pressure of either oil passage whose pressure is higher than that of the other to the predetermined low pressure is started, then it be continued as long as the braking operation is being detected, notwithstanding the deceleration of the vehicle. Or preferably, the control which lowers the pressure of either oil passage whose pressure is higher than that of the other to the predetermined low pressure be continued until the brake operation detecting means detects the termination of the braking operation and the deceleration detecting means detects that the deceleration of the vehicle has become smaller than the standard deceleration.

It is also preferable that if the control which lowers the pressure of either oil passage whose pressure is higher than that of the other to the predetermined low pressure is started, then either the first pressure controlling means or the second pressure controlling means control the pressure of either oil passage whose pressure is higher than that of the other to gradually return to the original predetermined high pressure when this control is terminated. Thereby, the control to recover the driving force of the hydraulic motor is performed smoothly to achieve the original driving force gradually.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 20 is a side view of a creep lever and an EXC switch, which are provided at the driver seat.

FIG. 21 is a graph showing a relation between the amount of displacement of the creep lever and the target skew angle of the swash plate of the pump.

FIG. 22 is a list showing the initial skew angles of the swash plates of the pump and the motor;

FIG. 41 is a list showing the pressures of first and second lines which correspond to the drive direction and the acceleration or deceleration of the vehicle;

FIG. 44 is a list showing the setting for the high relief pressure in correspondence with a specific condition;

FIG. 45 is a graph showing a relation between the target high relief pressure and the target control current applied to the second and third linear solenoid valves to achieve this pressure;

FIG. 47 is a list showing relations among the discharge of the pump and the high pressure generated and the open or close control of the notch valve;

FIG. 48 is a graph showing a relation between the skew angle of the swash plate and the discharge of the pump;

DESCRIPTION OF THE PREFERRED EMBODIMENTS

Construction of the Transmission

Figure 1:
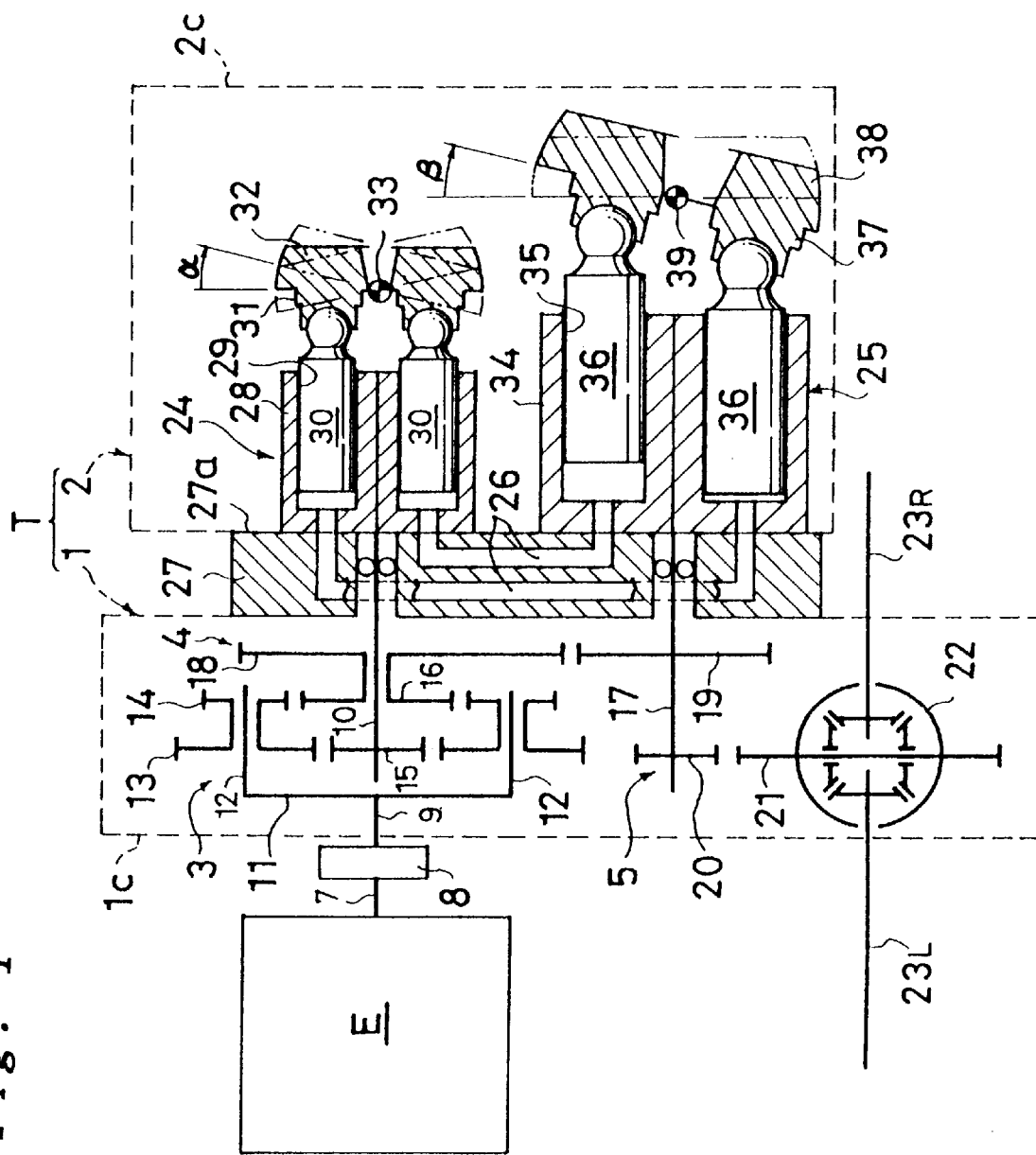
FIG. 1 is a schematic view showing the construction of a hydraulic continuously variable transmission, which is used on a vehicle, according to the present invention.

FIG. 1 shows a continuously variable transmission T. As seen from the figure, this transmission T can be used either for front wheel drive or for rear wheel drive, and it is a hydromechanical transmission, which comprises a mechanical unit 1 for drive transmission and a hydrostatic unit 2 for continuous speed variation. An engine E to drive this transmission is provided opposite the hydrostatic unit 2, making the mechanical unit 1 being positioned therebetween.

The mechanical drive transmission unit 1 comprises a power distribution mechanism 3, a power transmission mechanism 4, and a final speed reduction mechanism 5 in a first casing 1c. The power distribution mechanism 3 comprises the input shaft 9 of the transmission, which is connected with the output shaft 7 of the engine E through a torque damper 8; a carrier 11, which is directly connected to the input shaft 9; and a pump input shaft 10, which faces the carrier 11 and extends coaxially and opposite to the input shaft 9. In addition, a plurality of pinion spindles 12 are integrally provided on the carrier 11 in such a way that the pinion spindles revolve around the input shaft 10. On each of these pinion spindles 12, a pair of large and small pinions 13 and 14 which are connected to each other in integration are pivotally provided. A small sun gear 15 with a relatively small diameter which meshes with the large pinions 13 having a relatively large diameter is provided on the input shaft 10 of the pump. In addition, a large sun gear 16 with a relatively large diameter which meshes with the small pinions 14 having a relatively small diameter is provided pivotally on the input shaft 10.

An interdrive gear 18 is provided pivotally on the pump input shaft 10 and integrally connected with the large sun gear 16, and an interdriven gear 19, which meshes with the interdrive gear 18, is provided on the output shaft 17 of the motor. These drive and driven gears 18 and 19 constitute the above mentioned power transmission mechanism 4. Furthermore, a final drive gear 20 is provided on the motor output shaft 17, and a final driven gear 21 which incorporates a differential mechanism 22 meshes with the final drive gear 20. These final drive and driven gears constitute the above mentioned final speed reduction mechanism 5. From the differential mechanism 22, a right axle 23R and a left axle 23L extend in the respective opposing directions, and through these axles 23R and 23L, the mechanical power is transmitted to drive the right and left wheels (not shown).

The hydrostatic unit 2 for continuous speed variation comprises a hydraulic plunger type swash plate pump 24 for variable delivery, a hydraulic plunger type swash plate motor 25 for variable displacement, and a control block 27, which incorporates a hydraulic closed circuit 26 interconnecting the pump 24 and the motor 25. The control block 27 is provided between the mechanical drive transmission unit 1 and the pump 24 and the motor 25, being attached to a side of the mechanical drive transmission unit 1, such that the control block 27 pivotally supports the pump input shaft 10 and the motor output shaft 17.

The hydraulic pump 24 comprises a pump cylinder block 28 having a plurality of cylinder bores 29 around the rotational axis thereof, a plurality of pump plungers 30, which are provided slidably in the cylinder bores 29, and a pump swash plate 32 with variable skew, which slidably abuts on the shoes 31 that are pivotally attached to the tops of the plunger 30. The pump cylinder block 28 is coaxially connected to the pump input shaft 10 and in rotatably contact with a valve plate face 27a of the control block 27.

The pump swash plate 32 is swiveled about a trunnion 33, which is provided orthogonal to the pump input shaft 10 (i.e., perpendicular to the plane of FIG. 1). This swash plate can be oriented at any position between an upright position, where the swash plate is perpendicular to the pump input shaft 10 as shown in real line in the figure (the skew angle of the pump swash plate is zero $\alpha=0$), and predetermined right and left maximally tilted positions ($\alpha=\alpha R(MAX)$ and $\alpha F(MAX)$), where the swash plate is swiveled rightward at a predetermined maximum angle or leftward at the predetermined maximum angle as shown in dotted line in the figure. By swiveling this swash plate, it is possible to adjust the stroke of the pump plungers 30, which reciprocate in the cylinder bores when the pump cylinder block 28 is rotated. While the pump input shaft 10 is rotated by the engine E, if the swash plate is at the upright position, then the amount of stroke is zero, and the pump discharges no oil. While the swash plate is being swiveled toward the maximally tilted position with an increasing skew angle, the amount of stroke gradually increases, and the pump discharges in corresponding, increased amount. The direction of the oil flow is dependent on the direction of the tilt of the swash plate either toward the right maximally tilted position or toward the left maximally tilted position. As described in detail later, this tilt of the swash plate determines the direction of the vehicle whether it moves forward or rearward.

The hydraulic motor 25 comprises a motor cylinder block 34 having a plurality of cylinder bores 35 around the rotational axis thereof, a plurality of motor plungers 36, which are provided slidably in the cylinder bores 35, and a motor swash plate 38 with variable skew, which slidably abuts on the shoes 37 that are pivotally attached to the tops of the motor plunger 36. The motor cylinder block 34 is coaxially connected to the motor output shaft 17 and in rotatably contact with a valve plate face 27a of the control block 27. As seen, the hydraulic motor 25 is a variable displacement motor with plungers and a swash plate.

The motor swash plate 38 is swiveled about a trunnion 39, which is provided orthogonal to the motor output shaft 17 (i.e., perpendicular to the plane of FIG. 1). The swash plate can be oriented at any position between an upright position, where the swash plate is perpendicular to the motor output shaft 17 as shown in dotted line in the figure (the skew angle of the motor swash plate is zero $\beta=0$), and a predetermined maximally tilted position ($\beta=\beta(MAX)$), where the swash plate is swiveled rightward at a predetermined maximum angle as shown in real line in the figure. By swiveling this swash plate, it is possible to adjust the rotation of the motor cylinder block 34 while a predetermined hydraulic pressure is applied by the pump 24 (with a constant flow of oil). When the swash plate is at the upright position, the motor cylinder block 34 is retained stationary. As the swash plate is swiveled toward the maximally tilted position with an increasing skew angle, the rotational speed of the motor cylinder block 34 gradually increases. The motor swash plate 38 can be swiveled only between the upright position and the clockwise tilted position as shown in the figure.

A second casing 2c accommodates the pump 24 and the motor 25, and the second casing is combined to the control block 27, which is combined to the first casing accommodating the mechanical unit 1.

Operation of the Transmission

Now, the operation of the above continuously variable transmission is described. When the engine E is started, the engine output is transmitted from the output shaft 7 of the engine through the torque damper 8 to the transmission. In this condition, the input shaft 9 and the carrier 11 of the transmission are driven at the same rotational speed as the output shaft 7 of the engine. As the carrier 11 is driven, the power from the engine is divided into two portions and transmitted through the large and small pinions 13 and 14 to the small and large sun gears 15 and 16.

Figure 2:
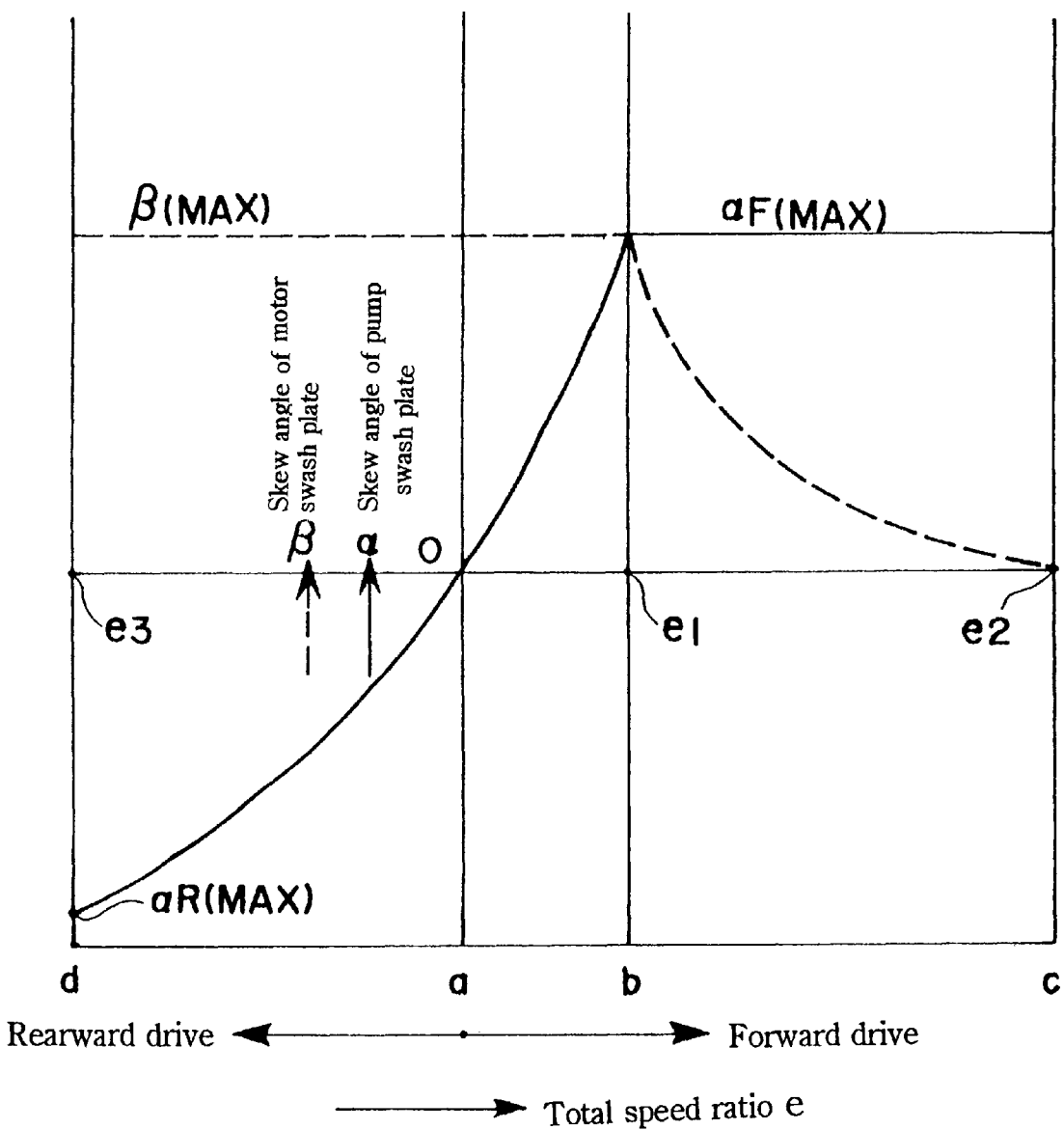
FIG. 2 is a graph showing relations between the skew angles of the swash plates of the pump and the motor of the hydraulic transmission and the total speed ratio of the transmission.

With reference to FIG. 2, which shows relations between the skew angles $\alpha$ and $\beta$ of the swash plates of the pump 24 and the motor 25 and the total speed ratio e of the transmission, the above mentioned division of the power is explained. The total speed ratio e is the ratio of the output rotational speed to the input rotational speed of the transmission T, and it is given in Equation (1). In FIG. 2, the ordinate represents the skew angles of the swash plates of the pump and the motor. The rightward tilts of the swash plates are plotted in the positive quadrants, and the leftward tilts are plotted in the negative quadrants. The abscissa represents the total speed ratio e, and the speed ratio in forward drive is plotted in the positive quadrants, and the speed ratio in rearward drive is plotted in the negative quadrants. In the figure, the skew angle of the swash plate of the pump is shown in real line, and that of the motor is shown in dotted line.

$$\text{Total speed ration } e=(No)/(Ni) \tag{1}$$

where Ni is the rotational speed of the input shaft 9 of the transmission, and No is the rotational speed of the final driven gear 21.

When the pump swash plate 32 is at the upright position ($\alpha=0$) and the motor swash plate 38 is at the maximally tilted position ($\beta=\beta\beta(MAX)$), the pump cylinder block 28 is rotatable freely, and the pump discharges no oil. The motor cylinder block 34 is hydraulically locked and retained stationary because no oil is supplied there from the pump 24. As a result, the large sun gear 16 and the interdrive gear 18 are stationary, and the small sun gear 15 rotates freely (together with the pump input shaft 10 and the pump cylinder block 28, which are connected to the small sun gear) as the carrier 11 rotates. In this condition, the engine output is wasted in idling, and no power is transmitted to the right and left axles 23R and 23L. This condition is depicted by vertical line a in FIG. 2. In this condition, the total speed ratio is zero (e=0), and the transmission T has an infinite speed change ratio.

This condition is selected when the shift lever, which is operated by the driver at the driver seat, is set at the D or R range, which is a vehicle drive range. If the shift lever is set at the P or N range, then the skew angle of the motor swash plate is controlled to become zero ($\beta=0$). As a result, the motor cylinder block 34 also becomes freely rotatable, and a neutral condition is established.

When the pump swash plate 32 is swiveled clockwise from this condition, the discharge of oil from the pump 24 starts and increases in correspondence with the increase of the skew angle of the swash plate. The oil discharged from the pump is supplied to the motor 25 to drive the output shaft 17 of the motor 25 (and the motor cylinder block 34). In this condition, if this rotational drive power is transmitted through the axles 23R and 23L to the wheels, then the wheels are driven in the forward direction. The rotational speed of the motor output shaft 17 increases as the skew angle $\alpha$ of the pump swash plate increases. When the skew angle becomes the maximum skew angle in the forward drive direction $\alpha F(MAX)$, the condition becomes the one indicated by vertical line b in FIG. 2. Therefore, the total speed ratio e increases from zero (vertical line a) to e1 (vertical line b). On the other hand, the rotational speed of the pump input shaft 10 decreases while the rotational speed of the motor output shaft 17 increases because the mechanical power transmission through the small pinion 14, the large sun gear 16, the interdrive gear 18 and the interdriven gear 19 (i.e., through the power transmission mechanism) progresses at the same time.

After the pump swash plate achieves the maximum skew angle in the forward drive direction $\alpha F(MAX)$ (i.e., reaches the condition indicated by vertical line b), the motor swash plate is swiveled to make the skew angle $\beta$ thereof gradually small from the maximum angle. As the skew angle becomes smaller and smaller, the rotational speed of the motor output shaft 17 increases further above the speed which is indicated by vertical line b. When the skew angle $\beta$ becomes zero (i.e., the swash plate comes to the upright position), the rotational speed of the motor output shaft reaches the maximum speed (i.e., the total speed ratio becomes e2, and this condition is indicated by vertical line c in the figure).

However, as mentioned above, while the rotational speed of the motor output shaft 17 increases, the mechanical power transmission through the power transmission mechanism 4 increases, and the rotational speed of the pump input shaft 10 decreases. The gear ratio of the power distribution mechanism 3 and the power transmission mechanism 4 is predetermined in such a way that the rotational speed of the pump input shaft 10 (and the pump cylinder block 28) becomes zero when the skew angle $\beta$ of the motor swash plate becomes zero (i.e., the swash plate comes to the upright position). Therefore, when the motor swash plate is at the upright position ($\beta=0$), the motor cylinder block 34 is freely rotatable, and the pump cylinder block 28 is hydraulically locked and becomes stationary. In this condition (which is indicated by vertical line c in the figure), only the mechanical power transmission through the power transmission mechanism 4 is performed.

On the other hand, if the pump swash plate 32 is swiveled counterclockwise, starting from the condition indicated by vertical line a in the figure, then the oil is discharged from the pump 24 in the direction opposite to that described above in the hydraulic closed circuit 26. This reversed flow of oil to the motor 25 drives the motor output shaft 17 (and the motor cylinder block 34) in the direction opposite to that described above (i.e., in the reverse drive direction). The rotational speed of the motor output shaft 17 increases as the skew angle $\alpha$ of the pump swash plate increases. When the skew angle becomes $\alpha R(MAX)$, the condition reaches the point which is indicated by vertical line d in FIG. 2. In this way, the total speed ratio e changes from zero (vertical line a) to a negative value (e3).

Hydraulic Closed Circuit for Power Transmission

Figure 3:
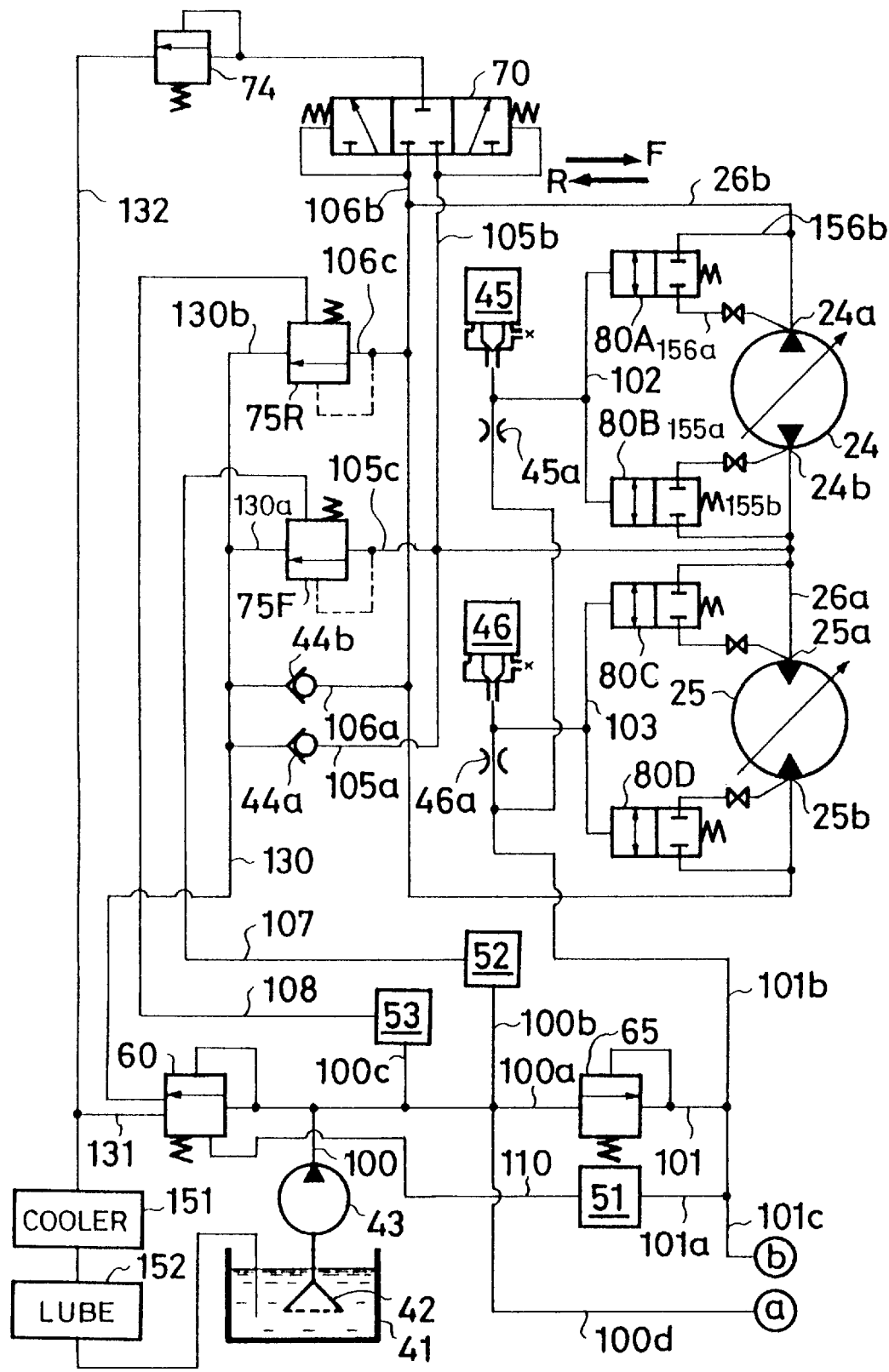
FIG. 3 is a hydraulic circuit diagram showing the closed hydraulic circuit of the transmission and a circuit for providing a control pressure.

Now, with reference to FIG. 3, the hydraulic closed circuit 26 and the hydraulic circuit control system of the hydrostatic unit 2 for continuous speed variation are described. In this figure, the hydraulic pump 24 and the hydraulic motor 25 are indicated in symbols. The hydraulic closed circuit 26 comprises a first oil passage 26a which connects one port 24b of the pump 24 with one port 25a of the motor 25 and a second oil passage 26b which connects the other port 24a of the pump 24 with the other port 25b of the motor 25.

As mentioned previously, the swash plate 32 of the pump 24 is swiveled in either direction, clockwise or counterclockwise, from the upright position (neutral position). When the pump swash plate is swiveled clockwise (i.e., in the forward drive direction), the oil sucked from the port 24a is discharged from the port 24b. This oil is supplied to the motor 25 through the port 25a to drive the motor 25 in the forward drive direction. Then, the oil is discharged from the port 25b, again to be sucked into the port 24a, thus circulating in the closed circuit 26. In this condition, if the wheels are driven by the rotation of the motor 25, then the pressure in the first oil passage 26a becomes high in correspondence, and the pressure in the second oil passage 26b become low. On the other hand, if the rotational speed of the wheels are being reduced by engine brake in coasting, for example, then the pressure in the second oil passage 26b becomes high in proportion to the force of engine brake, and the pressure in the first oil passage 26a become low.

When the pump swash plate 32 is swiveled counterclockwise (i.e., in the rearward drive direction), the oil flow is reversed from that described above. This reversed oil flow drives the motor in the rearward drive direction. Likewise, the conditions of the pressure in the first and second oil passages 26a and 26b become opposite of what is described above.

In this way, the power transmission between the hydraulic pump and the hydraulic motor is performed. However, in this power transmission, while the oil is circulated in the hydraulic closed circuit 26, heat is generated, and the temperature of the oil rises. Also, in the circulation, contaminants may be collected in the oil, or some part of the oil may leak, for example, through the clearance of the plungers, into an oil tank. To solve such problems, the system enables part of the oil to be exchanged for cooling, supplementary feed, and purification (or flushing). A charge pump 43 is provided to supply oil in the oil tank 41 to a first line 100 through a suction filter 42. The charge pump 43 is driven by the engine E directly, so the amount of discharge is proportional to the rotation of the engine.

Figure 5:
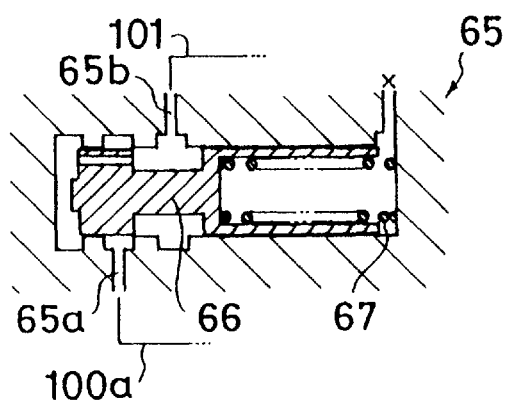
FIG. 5 is a schematic, sectional view of a modulator valve, which is used in the control pressure circuit.

The oil discharged from the charge pump 43 into the first line 100 is regulated by a regulator valve 60 to have a predetermined line pressure PL. The first line 100 is branched as shown in the figure, and one branched first line 100a is connected to a modulator valve 65, which includes a reducing valve. The output port of the modulator valve 65 is connected to a second line 101 to adjust the pressure of the second line to a predetermined modulated pressure Pm. FIG. 5 shows the construction of the modulator valve 65, which includes a spool 66, which is biased leftward by a spring 67, in a housing. The hydraulic pressure in the branched first line 100a, which is connected to a port 65a of the modulator valve 65, is reduced to a pressure (a constant pressure) at which the force of the spring 67 balances with the force of the pressure in the control line 101, thus creating the modulated pressure Pm in the control line 101. In the figure, mark "x" indicates a drainage line.

Figure 6:
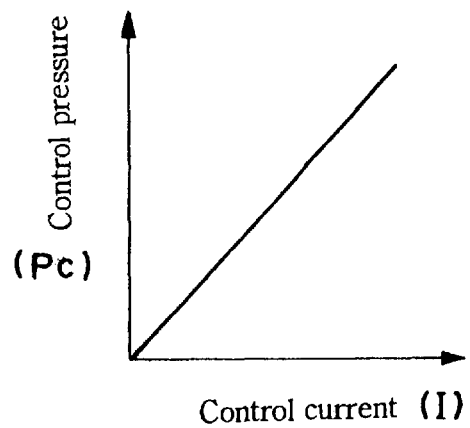
FIG. 6 is a graph showing a relation between the control current (I) and the control pressure (Pc) of a first linear solenoid valve.

The second line 101 also branches into a plurality of lines, and one of the branched line, a branched second line 101a, leads to a first linear solenoid valve 51. The first linear solenoid valve 51 adjusts the modulated pressure Pm to generate a control pressure PCL in proportion to a control current (I) as shown in FIG. 6, and the control pressure PCL acts on the regulator valve 60 through a control line 110.

Figure 4:
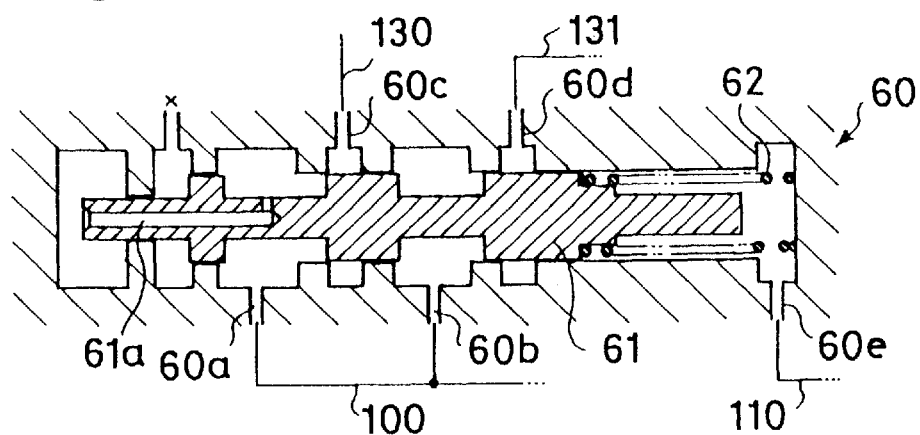
FIG. 4 is a schematic, sectional view of a regulator valve, which is used in the above mentioned control pressure circuit.

FIG. 4 shows the construction of the regulator valve 60, which comprises a spool 61, which is slidable leftward and rightward, and a spring 62, which biases the spool 61 leftward, in a housing. The regulator valve has a plurality of ports 60a–60e in the housing. The ports 60a and 60b are connected to the first line 100, the port 60c is connected to a charge line 130, the port 60d is connected to a discharge line 131, and the port 60e is connected to the above mentioned control line 110.

Figure 7:
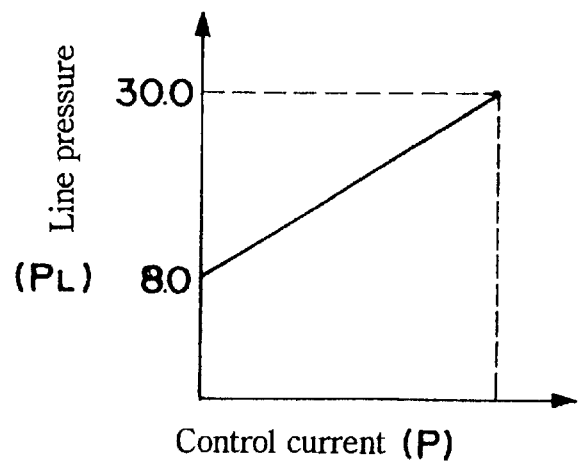
FIG. 7 is a graph showing a relation between the control pressure (P) and the line pressure (PL) of the regulator valve.

In this condition, the left end of the spool 61 of the regulator valve 60 is exposed to the line pressure PL from the first line 100 through the internal fluid-communication hole 61a, and the right end is pushed by the biasing force of the spring 62 and exposed to the control pressure PCL. As mentioned above, the control pressure PCL is adjustable with the first linear solenoid valve 51, so the line pressure PL is controllable by controlling the control current (I), which is applied to the first linear solenoid valve 51, as shown in FIG. 7. In the control of the line pressure PL with the regulator valve 60, excess oil flows into the charge line 130 when the port 60a comes into fluid communication with the port 60c as the spool 61 shifts to the right. Further excess oil flows into the discharge line 131 when the port 60b comes into fluid communication with the port 60d.

As shown in FIG. 3, the charge line 130 is connected with a charge supply lines 105a and 106a, which are connected with the first and second oil passages 26a and 26b respectively through check valves 44a and 44b. The oil flowing into the charge line 130 must pass through either the check valve 44a or the check valve 44b before being supplied into either the first oil passage 26a or the second oil passage 26b whose pressure is lower than the other. In this way, the oil in the hydraulic closed circuit 26 is replenished.

The oil discharged into the discharge line 131 is cooled by an oil cooler 151, and then it is returned through a lubricator 152 into the tank 41.

Figure 8:
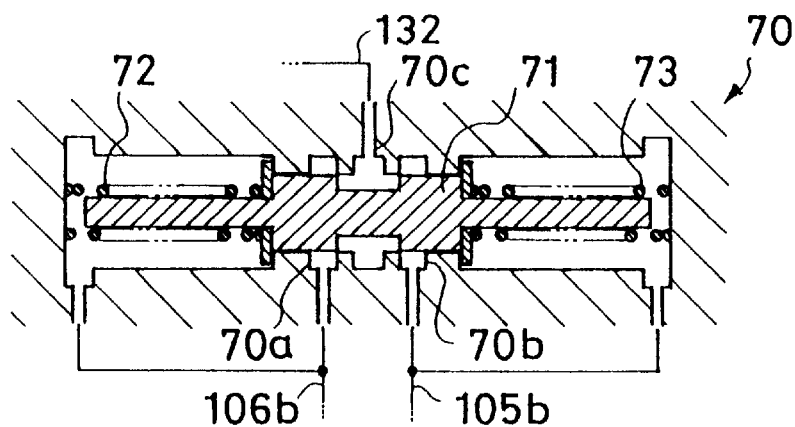
FIG. 8 a schematic, sectional view of a shuttle valve, which is used in the control pressure circuit.

As shown in FIG. 3, the first and second oil passages 26a and 26b constituting the hydraulic closed circuit 26 are connected with discharge lines 105b and 106b respectively, and these discharge lines 105b and 106b are connected to a shuttle valve 70. FIG. 8 shows the construction of the shuttle valve 70, which comprises a spool 71, which is slidable rightward and leftward in a housing, a pair of springs 72 and 73, one of which biases the spool 71 to the right, and the other to the left.

The hydraulic pressures of the discharge lines 105b and 106b work on the right and left ends of the spool 71 respectively. When the pressure of either one of the first or second oil passage 26a or 26b becomes higher than the other, the spool 71 is shifted by the pressure difference, and either the left side port 70a or the right side port 70b of the shuttle valve 70 whose hydraulic pressure is lower than the other is connected with the port 70c which leads to a discharge line 132 to discharge some oil from the line which has the lower pressure. In this way, the oil is discharged in the amount which corresponds with the amount replenished in the hydraulic closed circuit 26, and the hydraulic oil is cooled and flushed, etc. In addition, the discharge line 132 is provided with a low pressure relief valve 74, which regulates the pressure of the line having the lower pressure. The oil discharged into the discharge line 132 is also cooled by the oil cooler 151 and returned through the lubricator 152 into the tank 41.

Figure 9:
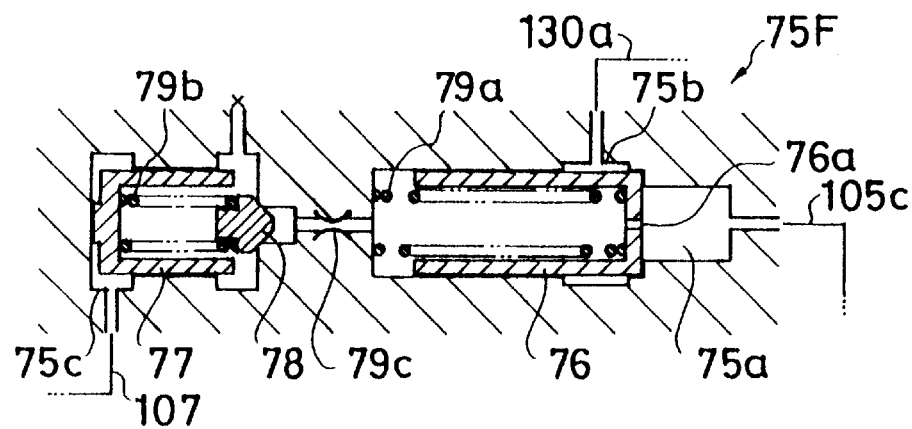
FIG. 9 is a schematic, sectional view of a high-pressure release valve, which is used in the control pressure circuit.

The hydraulic closed circuit 26 is also provided with high pressure relief valves 75F and 75R, which are connected through relief lines 105c and 106c to control the maximum pressure of the first oil passage 26a and the second oil passage 26b. These relief valves are identical in construction, so here, the high relief valve 75F, one of these two valves, is described with reference to FIG. 9.

The high relief valve 75F has two independent spools 76 and 77 in a housing. A first spool 76 is biased rightward by a first spring 79a to cut off the fluid communication between the right side port 75a and a port 75b located inward in the housing, but if the spool is shifted leftward against this biasing force, then the two ports 75a and 75b are brought into fluid communication. The port 75a is connected to the first oil passage 26a through the relief line 105c, and the port 75b is connected to a branched charge line 130a. In addition, an orifice 76a is provided in the first spool 76, so the pressure in the first oil passage 26a provided through the port 75a acts on both the right and left sides of the first spool 76. Therefore, the first spool 76 is positioned at the right end of its stroke by the bias of the first spring 79a in normal condition.

On the other hand, the second spool 77 is biased leftward by a second spring 79b whose right end is also biasing a blocking valve piece 78 rightward in the housing. In this condition, the blocking valve piece 78 blocks a fluid communication passage 79c which is provided with an orifice to communicate with the valve chamber of the first spool 76. The left side port 75c, to which the left end of the second spool 77 faces, is connected through a control line 107 to a second linear solenoid valve 52, which adjusts the line pressure PL of a branched line 100b in correspondence with a control current to provide a control pressure PCH to the control line 107. In this condition, the pressure on the left end of the second spool 77 can be controlled by controlling the control current applied to the second linear solenoid valve 52.

In the high pressure relief valve 75F, the pressure of the first oil passage 26a acts on the blocking valve piece 78 from the right, and the force of the second spring 79b act on the blocking valve piece 78 from the left. Because the left end of the second spring 79b is placed on the second spool 77, the force of the control pressure PCH from the control line 107 acting on the second spool 77 is added to the rightward biasing force. Therefore, the biasing force acting on the blocking valve piece 78 rightward is controllable by adjusting the control pressure PCH, which is controlled by the second linear solenoid valve 52.

By this rightward biasing force, the blocking valve piece 78 blocks a fluid communication passage 79c. However, if the pressure of the first oil passage 26a rises, and the force from this pressure acting on the blocking valve piece 78 leftward exceeds the above rightward biasing force, then the blocking valve piece 78 is shifted leftward opening the fluid communication passage 79c to the drainage. As a result, an oil flow is generated through the orifice 76a of the first spool 76, which in turn creates a difference between the pressures on the right and left sides of the first spool 76. By this pressure difference, the first spool 76 is shifted leftward, and the port 75a and the port 75b are brought into fluid communication. As a result, some oil is discharged from the first oil passage 26a to the branched charge line 130a, and this discharged oil is fed into the second oil passage 26b through the check valve 44b.

Figure 10:
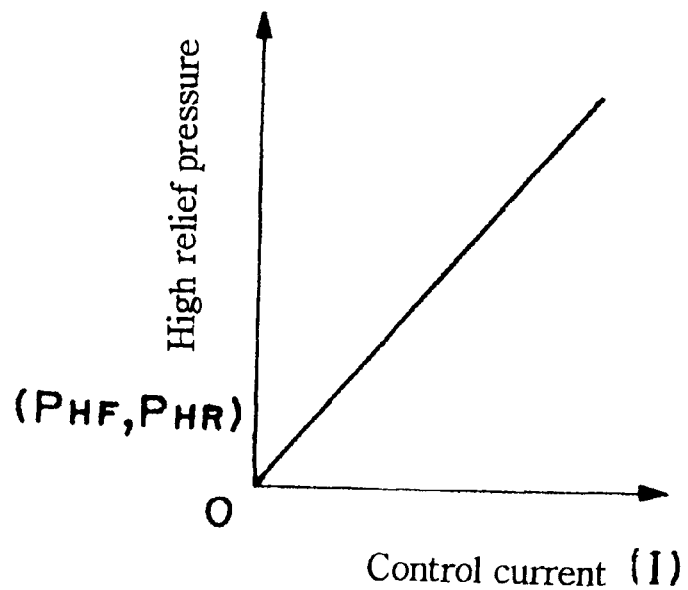
FIG. 10 is a graph showing relations between the high relief pressure (PH) of the high-pressure release valve and the control current (I) of second and third linear solenoid valves.

In summary, when the pressure of the first oil passage 26a rises above a predetermined value, the blocking valve piece 78 is released, and the first spool 76 shifts to the left, which discharges oil from the first oil passage 26a to the second oil passage 26b to maintain the pressure of the first oil passage 26a at or below the predetermined value. On the other hand, if the pressure of the second oil passage 26b rises above the predetermined value, the other high pressure relief valve 75R discharges oil from the second oil passage 26b to the first oil passage 26a to prevent the pressure of the second oil passage 26b from rising above the predetermined value. In this way, the pressures of the first and second oil passages 26a and 26b are prevented from rising above the predetermined value by the high pressure relief valves 75F and 75R, which value or pressure is adjustable by controlling the current applied to the second and third linear solenoid valves 52 and 53 as described above. In this example, the high relief pressure (PHF and PHR) is adjustably set in proportion with the control current (I) as shown in FIG. 10.

Figure 11:
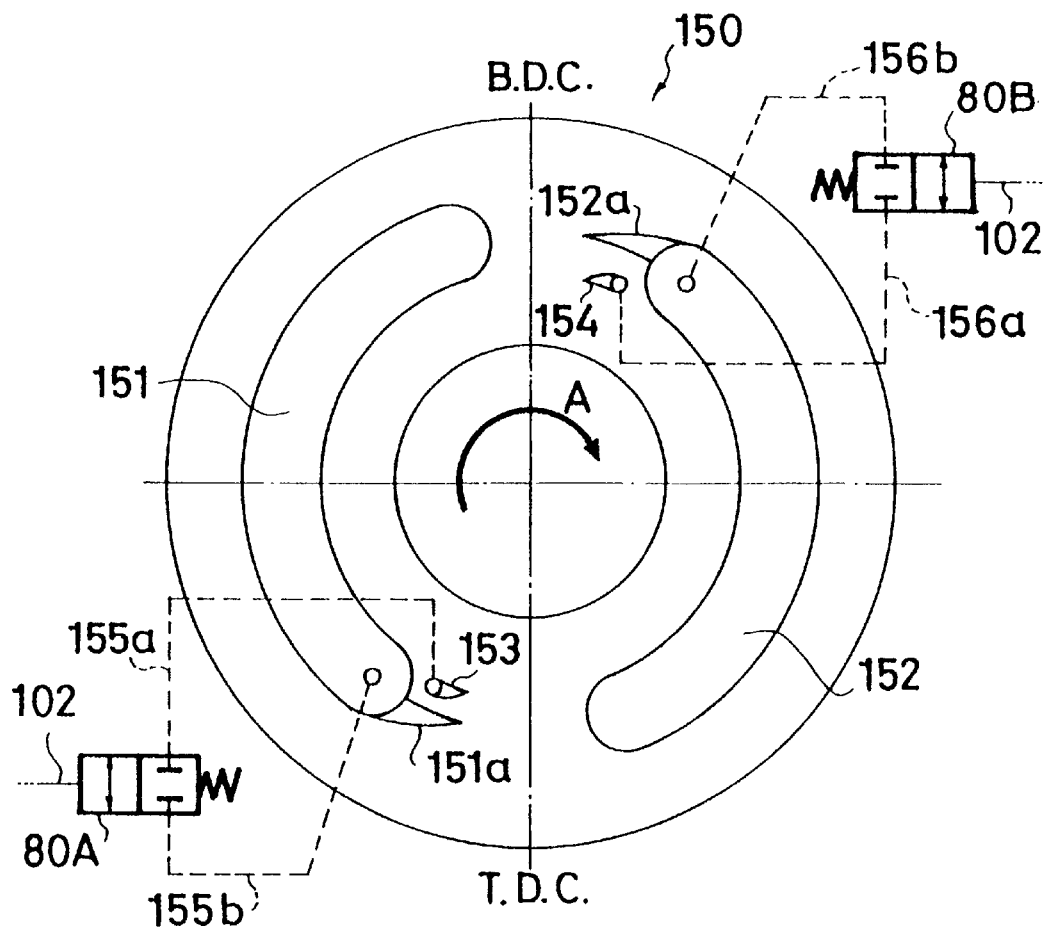
FIG. 11 is a schematic view showing the surface configuration of the valve plate of the hydraulic pump and the location of variable notch valves.

In this embodiment, the control block 27 of the hydraulic pump 24 and the motor 25 is provided with respective valve plates, each having a configuration shown in FIG. 11, in the valve plate face 27a. These valve plates, one provided for the pump and the other for the motor, may differ from each other in size, but their basic configurations and functions are identical. Thus, only the valve plate 150 of the pump 24 is described here with reference to FIG. 11.

In the pump 24, the pump cylinder block 28 is driven by the engine and is rotated in the direction indicated with arrow A in the figure (clockwise) in contact with the valve plate 150. When the pump swash plate 32 is swiveled in the forward drive direction, the pump plungers 30 reciprocate in the cylinder bores in synchronization with the rotation of the pump cylinder block 28. In this reciprocation, the pump plungers 30 reach the top dead center (T.D.C.) at the lower end of the valve plate as shown in FIG. 11, and they reach the bottom dead center (B.D.C.) at the upper end of the valve plate as the cylinder block rotates. While the pump plungers 30 travel from the top dead center (T.D.C.) to the bottom dead center (B.D.C.) above the left half of the valve plate as shown in the figure, oil is sucked, and while they travel from the bottom dead center (B.D.C.) to the top dead center (T.D.C.) above the right half of the valve plate, the oil is discharged.

Therefore, the valve plate 150 is provided with a semicircular first port 151 in the left half and with a semicircular second port 152 in the right half of the valve plate. The first port 151 is connected to the second oil passage 26b, and the second port 152 is connected to the first oil passage 26a. In addition, the valve plate is provided with main notches 151a and 152a, which extend to the respective entrances of the first and second ports 151 and 152 in the rotational direction. These main notches are to moderate the rapid pressure change which occurs when the cylinder bores 29 are brought into fluid communication with the ports 151 and 152 as the pump cylinder block 28 rotates. Furthermore, sub notches 153 and 154 are provided independently from and in parallel with the main notches 151a and 152a as shown in the figure.

As the sub notches 153 and 154 are independent and away from the main notches 151a and 152a and the ports 151 and 152, no notch effect can be expected in this condition. However, the sub notches 153 and 154 are connected to the inlets of the first and second ports 151 and 152 through shortcircuiting oil passages 155a and 155b and 156a and 156b as shown in dotted line in the figure, and variable notch valves 80A and 80B are provided on the shortcircuiting oil passages to open and close the shortcircuiting oil passages.

Figure 12:
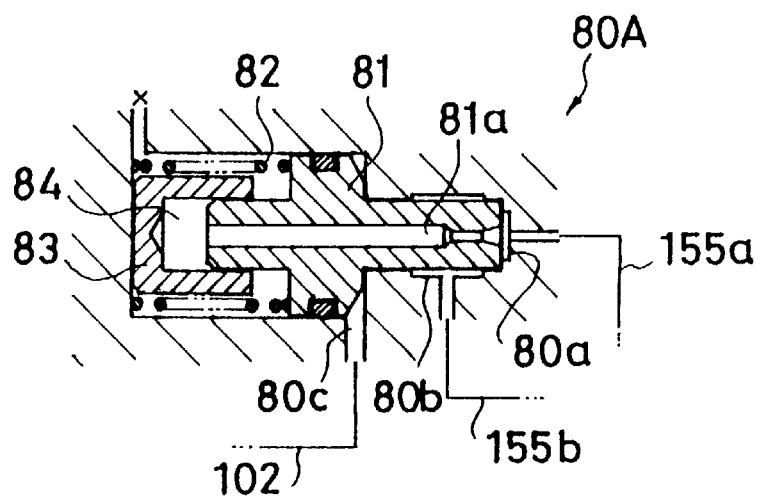
FIG. 12 is a schematic, sectional view of the variable notch valve.

Both the variable notch valves 80A and 80B have an identical construction, which is shown in the FIG. 12 (this figure shows the variable notch valve 80A). The variable notch valve 80A comprises a valve spool 81, which is slidable rightward and leftward, a spring 82, which biases the valve spool 81 rightward, and a supporting spool 83, which slidably engages with the left end portion of the valve spool 81, in a housing. The housing is provided with a first port 80a, which is connected to the shortcircuiting oil passage 155a, a second port 80b, which is connected to the shortcircuiting oil passage 155b, and a third port 80c, which is connected to a control line 102. When the valve spool 81 is biased by the force of the spring 82 and positioned at the right side as shown in the figure, the right end portion of the spool 81 cuts off the fluid communication between the first and second ports 80a and 80b. When the valve spool 81 is shifted to the left, theses ports are brought into fluid communication. The pressure in the first port 80a is communicated through a bore 81a which is provided in the spool 81 to the chamber 84 which exists between the valve spool 81 and the supporting spool 83. Therefore, this pressure will not provide any thrust to the valve spool 81.

As shown in FIG. 3, the control line 102 is connected with a branched second line 101b through an orifice 45a and to an open-close control solenoid valve 45, which can open the control line 102 to the drainage. When the open-close control solenoid valve 45 opens the control line 102 to the drainage, the pressure in the control line 102 is lowered. On the other hand, when the open-close control solenoid valve 45 closes or cuts off the fluid communication of the control line 102 to the drainage, the modulated pressure Pm is supplied from the branched second line 101b to the control line 102.

When the control line 102 is maintained at the low pressure by the opening of the open-close control solenoid valve 45, the valve spool 81 of the variable notch valve 80A is positioned at the right side by the biasing force of the spring 82, blocking the shortcircuiting oil passages 155a and 155b. In this condition, the sub notch 153 has no effect on the system. On the other hand, when the control line 102 is supplied with the modulated pressure Pm by the closing of the open-close control solenoid valve 45, the valve spool 81 is shifted to the left side by this pressure, bringing the shortcircuiting oil passages 155a and 155b into fluid communication. In this condition, the sub notch 153 becomes effective.

This description is made of the variable notch valve 80A, but the same can be said of the other variable notch valve 80B, which is controllable in the same way as the variable notch valve 80A. Also, the hydraulic motor 25 is provided with such sub notches, and the pressure of a control line 103 is variably set with an open-close control solenoid valve 46 to control variable notch valves 80C and 80D, which control the sub notches.

Skew Angle Control System for the Swash Plates

Figure 13:
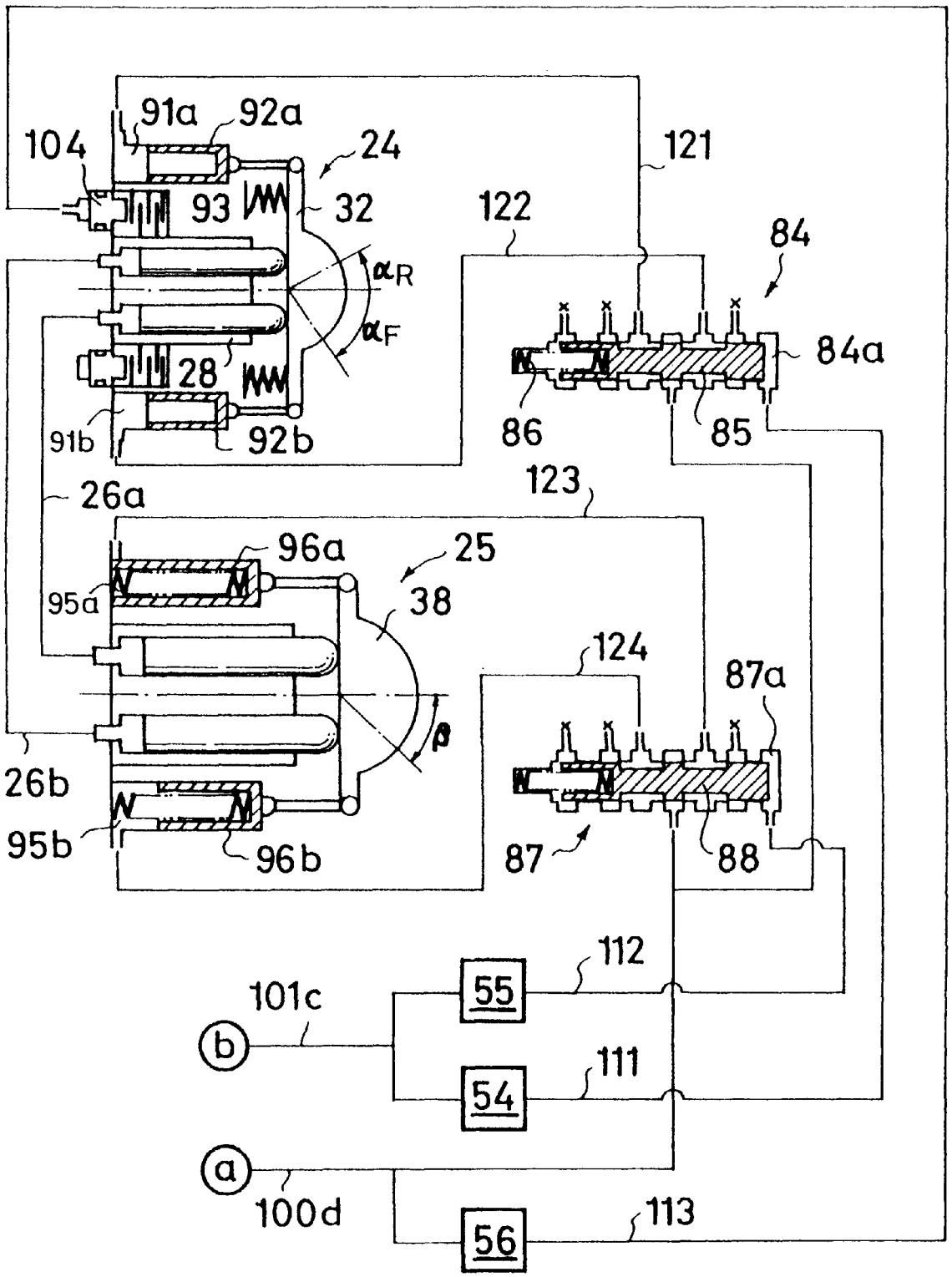
FIG. 13 is a hydraulic circuit diagram showing a circuit which controls the skewing angles of the pump and the motor.

Now, a control system for swiveling the pump swash plate 32 and the motor swash plate 38 is described with reference to FIG. 13. This control system uses the line pressure PL, which is supplied through a branched first line 100d, and the modulated pressure Pm, which is supplied through a branched second line 101c. In FIGS. 3 and 13, circled letters "a" and "b" in one of the figures are connected to the respective circled letters of the other figure.

For swiveling the pump swash plate 32, a pair of servo cylinders 92a and 92b are provided slidably in servo cylinder bores 91a and 91b as shown in the figure, and the servo cylinder bores 91a and 91b are connected through servo control lines 121 and 122 to a pump control valve 84, which is a four way valve. Depending on the position of the spool 85, the pump control valve 84 switches the supply of the line pressure PL from the branched first line 100d either to the servo control line 121 or to the servo control line 122. The spool 85 is biased rightward by a spring 86, and the right end of the spool receives the pressure coming through the right end port 84a. The balance of the forces from the spring and the pressure sets the position of the spool in the housing.

When the pressure of the right end port 84a is controlled, the position of the spool 85 is adjusted to operate the servo cylinders 92a and 92b, which eventually regulates the pump swash plate 32. To control the pressure of the right end port 84a, a pump control pressure PCP is supplied to the port 84a from a fourth linear solenoid valve 54 through a control line 111. The fourth linear solenoid valve 54 controls the modulated pressure Pm of the branched second line 101c to generate the pump control pressure PCP in proportion with a control current and leads the pump control pressure into the control line 111. Thus, by controlling the control current applied to the fourth linear solenoid valve 54, the pump control valve 84 is controlled to control the skew angle of the pump swash plate 32.

The control of the skew angle of the motor swash plate 38 is operated in the same manner. A pair of servo cylinders 96a and 96b are provided slidably in servo cylinder bores 95a and 95b, which are connected through servo control lines 123 and 124 to a motor control valve 87. In the same way as the pump control valve 84, the pressure of the right end port 87a is controlled to control the position of the spool 88, which controls the servo cylinders 96a and 96b to regulate the motor swash plate 38. To control the pressure of the right end port, a motor control pressure PCM is supplied to the port 87a from a fifth linear solenoid valve 55 through a control line 112. Thus, by controlling the control current applied to the fifth linear solenoid valve 55, the motor control valve 87 is controlled to control the skew angle of the motor swash plate 38.

In this embodiment, the hydraulic pump 24 is provided with a lock-up brake 93, which can hold the pump cylinder block 28 stationary. As previously mentioned, when the skew angle of the pump swash plate becomes the maximum skew angle in the forward drive direction, i.e., $\alpha=\alpha F(MAX)$, and the skew angle of the motor swash plate becomes zero ($\beta=0$) in the forward drive condition (represented by vertical line c in FIG. 2), in theory, the rotational speed of the pump cylinder block 28 comes to zero, and the power transmission is carried out only through the power transmission mechanism 4 (if there is no transmission loss). However, in reality, there is a loss from frictional drag, oil leak, etc., which causes the pump cylinder block 28 to rotate a little and reduces the efficiency of the power transmission through the power transmission mechanism 4. To solve this problem, the pump cylinder block 28 is held stationary with the lock-up brake 93 to perform only the mechanical power transmission and to improve the transmission efficiency.

The lock-up brake 93 is a wet multiple disc brake, and it is operated in cooperation with a piston 104. The lock-up pressure PLB which empowers the piston 104 to squeeze the brake is generated by a sixth linear solenoid valve 56 and supplied through a lock-up line 113. The sixth linear solenoid valve 56 generates the lock-up pressure PLB, which is proportional to the control current supplied to the solenoid valve. Therefore, it is possible to control the lock-up brake 93 to engage partially or completely as much as desired.

Operational Control

Figure 14:
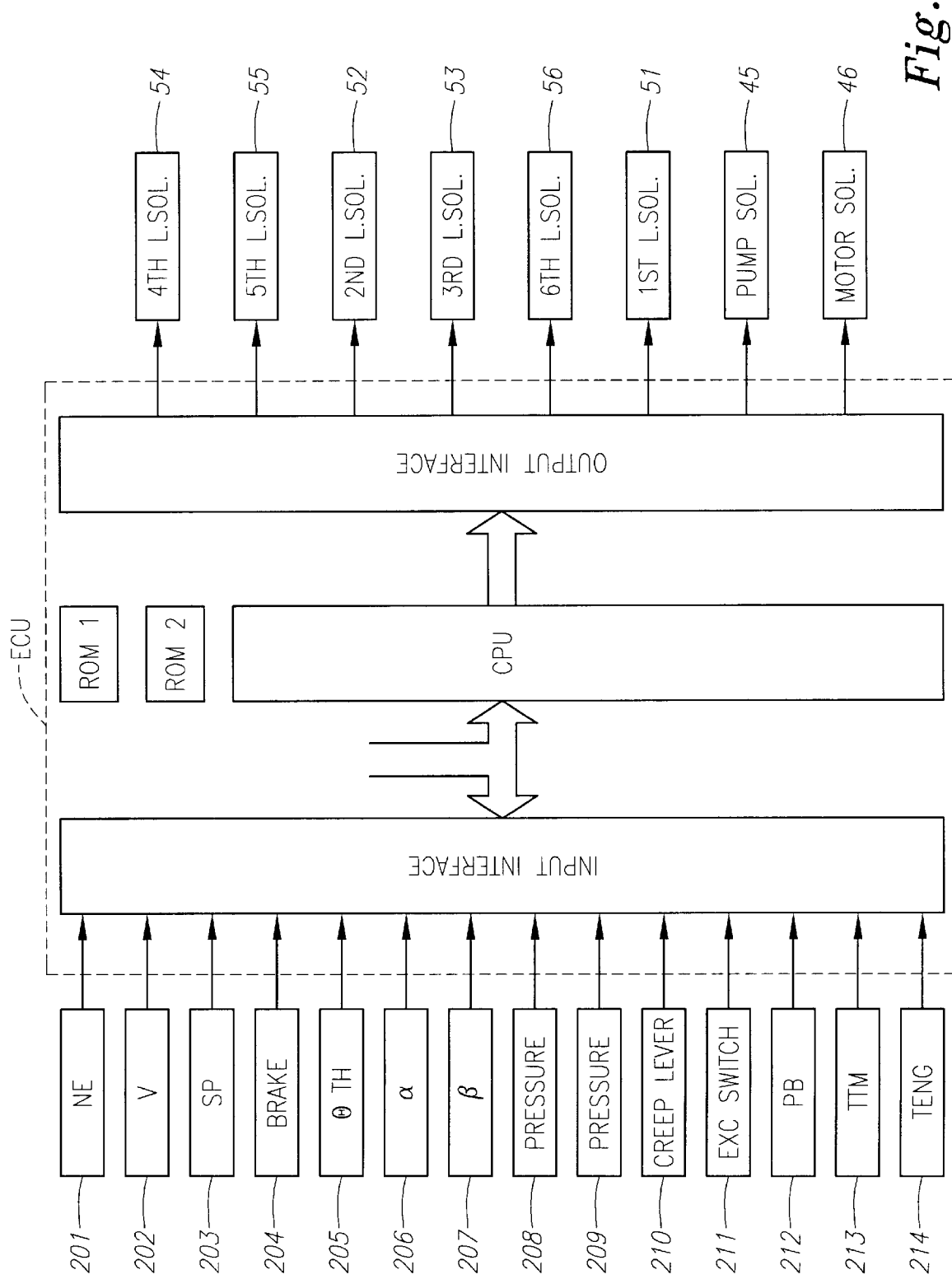
FIG. 14 is a schematic diagram of a control device which controls the operation of the continuously variable transmission of the present invention.

Now, the operational control of the variably continuous transmission T, which has the above construction and control circuit, is described. FIG. 14 shows the general construction of the control system. A control unit ECU generates control signals to the solenoid valves 45, 46 and 51–56 (these valves constitute the hydraulic circuit, and they have been already explained) in response to detection signals which are received from various sensors 201–214. The control unit ECU comprises an input interface to receive signals from the sensors and an output interface to send signals to the solenoid valves. The control unit ECU is operated by the central processing unit CPU, which operates on a software program that is stored in memory ROM 1 and ROM 2 to generate the control signals.

The sensors include an engine rotation sensor 201, which detects the rotational speed Ne of the engine E, a vehicle speed sensor 202, which detects the speed of the vehicle V, a shift position sensor 203, which detects the position of the shift lever, a brake sensor 204, which detects the operation of the brake of the vehicle, a throttle opening sensor 205, which detects the degree of the throttle opening θ TH or how much the engine throttle is opened, a pump swash plate angle sensor 206, which detects the skew angle α of the pump swash plate, a motor swash plate angle sensor 207, which detects the skew angle β of the motor swash plate, a pressure sensor 208, which detects the pressure P1 of the first oil passage 26a that rises high when the vehicle is accelerated, a pressure sensor 209, which detects the pressure P2 of the second oil passage 26b that rises high when the vehicle is decelerated, a creep lever sensor 210, which detects the amount of manipulation of the creep lever operated by the driver to set a creeping force, an EXC switch sensor 211, which detects the operation of an EXC switch that renews the initial value for the skew angle of the pump swash plate, a PB sensor 212, which detects the negative pressure of the engine in suction, a transmission oil temperature sensor 213, which detects the temperature of the oil in the transmission, and an engine water temperature sensor 214, which detects the temperature of the engine cooling water.

Figure 16:
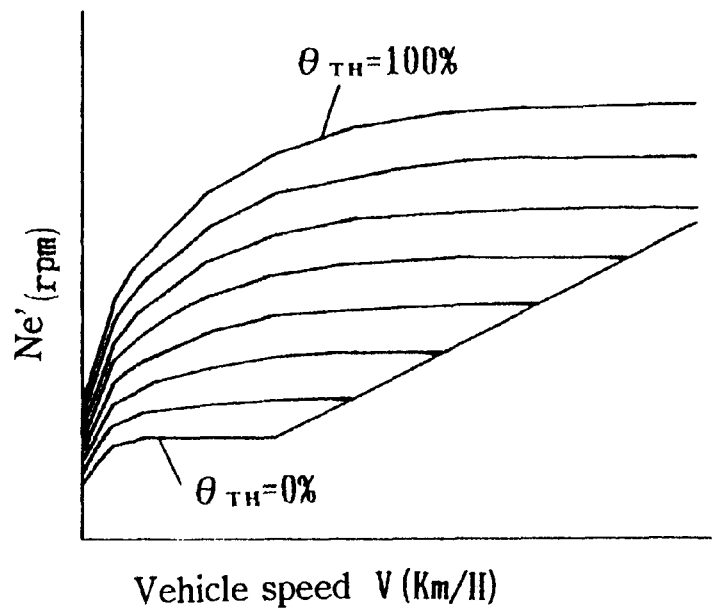
FIG. 16 is a graph showing relations between the vehicle speed and the engine throttle (i.e., accelerator opening) and the target rotational speed of the engine.
Figure 15:
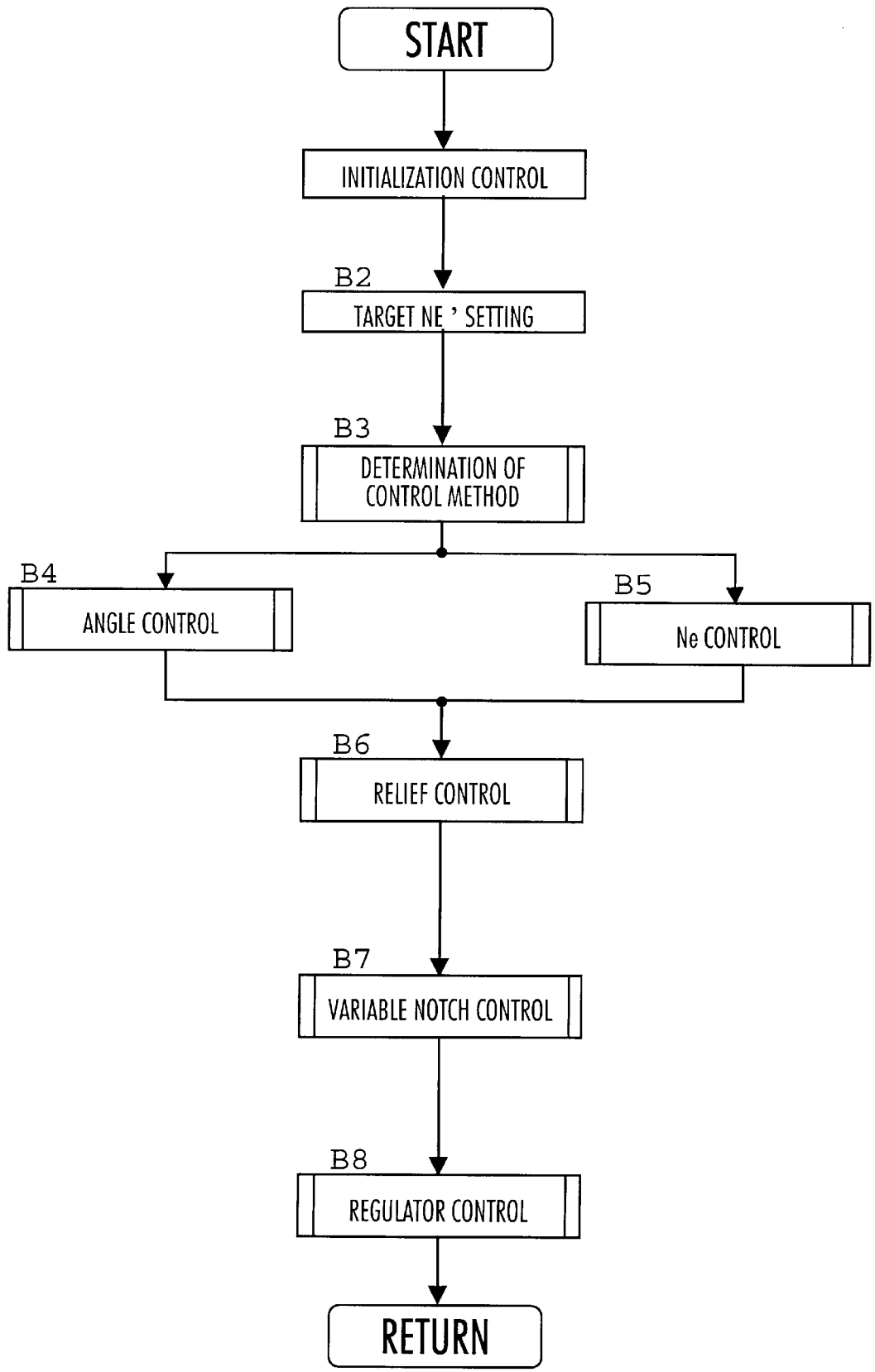
FIG. 15 is a main flow chart showing the control flow of the above control device.

The operational control of the transmission follows a main control flow which is shown in FIG. 15. At first, at Step B1, an initialization control is executed to set an initial value to the output current which is supplied to the solenoid valves. Then, a target engine rotational speed Ne' is set on the basis of the vehicle speed V, the throttle opening θ TH and the shift lever position at Step B2. This step is executed, for example, by using a map such as shown in FIG. 16. The map shows the target engine rotational speed Ne' in ordinate in relation with the vehicle speed V in abscissa for respective throttle openings. When the vehicle speed V and the throttle opening θ TH at present are detected, a value for the target engine rotational speed Ne' is taken in correspondence from the map. The map shown in FIG. 16 is for the condition where the shift lever is positioned at the D range, and different maps are prepared for other conditions where the shift lever is positioned at other ranges. In this way, with the detection of the shift lever position, the appropriate map is selected in correspondence with the position of the shift lever to set the target engine rotational speed Ne'.

Then, the control flow proceeds to Step B3, and a determination is made to proceed either to an angle control (B4) or to an Ne control (B5) (the details of these controls are described later). The angle control (B4) is to set the skew angle of the pump swash plate to a predetermined angle. This will be described more in detail later. The Ne control is to control the skew angles of the pump swash plate and motor swash plate and the operation of the lock-up brake in feedback on the basis of the engine rotational speed Ne. This will be also described more in detail later.

While either the angle control (B4) or the Ne control (B5) is being executed, the high pressure relief valves 75F and 75R are controlled at Step B6; the operation of the variable notch valves 80A–80D is controlled at Step B7; and the line pressure PL is set by the regulator valve 60 at Step B8. These steps are repeated as shown in FIG. 15, and these steps will be also described more in detail later.

Now, the determination performed at Step B3 is described with reference to FIG. 17. At first, a determination is made whether the shift position is in the N or P range or not at Step C1. If the shift position is in the N or P range, then the angle control B4 is performed. If the shift position is in any other range, then another determination is made whether the vehicle speed V is in acceleration or not, i.e., whether the speed is increasing or not at Step C2. If the vehicle is not in acceleration, then an abrupt braking operation determination control B9 (to set a flag PBF for an abrupt braking operation) is performed (the details of this control will be described later). Then yet another determination is made whether the vehicle speed V is equal to or less than a predetermined speed V1 (e.g., 5.0 km/h) or not at Step C3. If it is equal to or less than the predetermined speed, then the angle control B4 is performed. However, if it is above the predetermined speed, then the control flow proceeds to Step C4.

On the other hand, if the vehicle is determined as being accelerating at Step C2, then the control flow proceeds to Step C6, and a determination is made of the throttle opening θ TH of the engine whether the throttle opening is about zero or not (i.e., whether the accelerator pedal is released or not). If the throttle opening θ TH is determined to be not zero, then the control flow proceeds to Step C4. However, if it is determined as almost zero, then the control flow proceeds to Step C7, where another determination is made whether the vehicle speed V is equal to or less than the predetermined speed. If it is so, then the angle control B4 is performed. The driver is judged as not in consideration of accelerating the vehicle if the throttle is closed completely and the vehicle is running very slowly (at the predetermined speed or less) even though the vehicle is in acceleration, so the angle control B4 is carried out. However, if the vehicle speed V is above the predetermined speed, then the control flow proceeds to Step C4.

At Step C4, a determination is made of the actual rotational speed Ne of the engine whether the actual rotational speed Ne is less than the target engine rotational speed Ne', which is set at Step B2. If the actual rotational speed Ne is determined to be greater or equal to the target rotational speed Ne', then a determination is made of the flag for abrupt braking operation whether it is zero or not (PBF=0) at Step C8. If it is zero (PBF=0), then the Ne control B5 is carried out. On the other hand, if the actual rotational speed Ne is determined to be less than the target rotational speed Ne', then another determination is made of the skew angle α of the pump swash plate whether the angle α is equal to or smaller than a predetermined value α' or not. If it is equal to or smaller than the predetermined value, then a determination is made of the flag for abrupt braking operation whether it is zero or not (PBF=0) at Step C8. If it is zero (PBF=0), then the angle control B4 is carried out. However, if it is above the predetermined value, then the Ne control B5 is carried out. For this predetermined value α', the control flow uses the target skew angle α' for the swash plate that is determined in another control method determination flow, which will be described later with reference to FIGS. 18 and 19. On the other hand, if the flag for abrupt braking operation is not zero (PBF≠0), then the control flow proceeds to Step B10 where a feedback termination control is performed. This control will be described in detail later.

The above control flow for control method determination makes clear that the angle control B4 is performed in the following conditions:

(1) the position of the shift lever is at the N (neutral) or P (parking);
(2) the vehicle is not in acceleration, and it is driving at a speed which is equal to or less than the predetermined speed;
(3) the throttle is closed completely, and the vehicle speed is equal to or less than the predetermined speed even though the vehicle is in acceleration; and
(4) the skew angle α of the pump swash plate is equal to or smaller than the predetermined value, and the actual engine rotational speed Ne is less than the target engine rotational speed Ne'.

Figure 18:
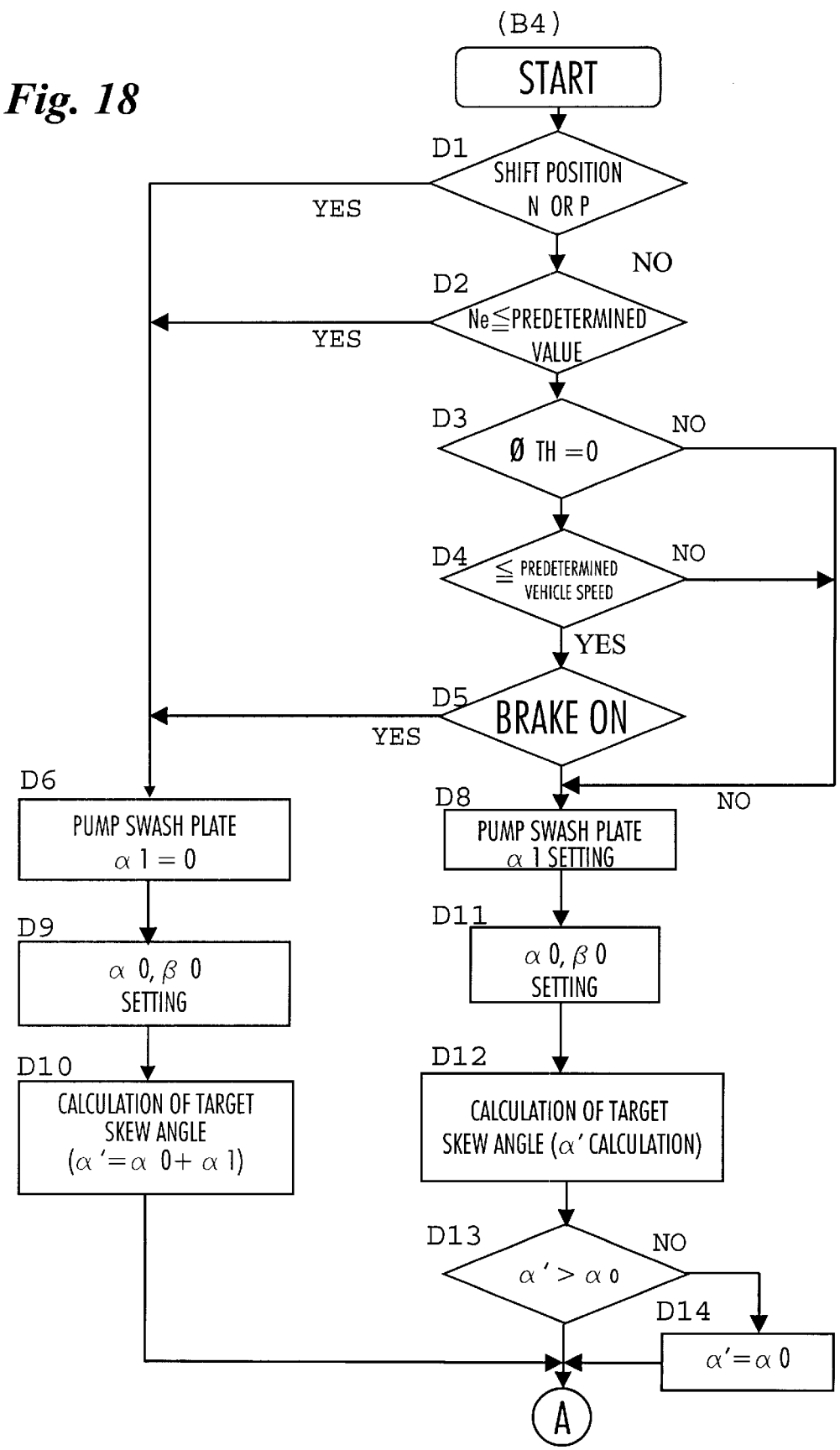
FIG. 18 is a subflow chart showing angular determinations, which are part of the control flow shown in the main flow chart.
Figure 19:
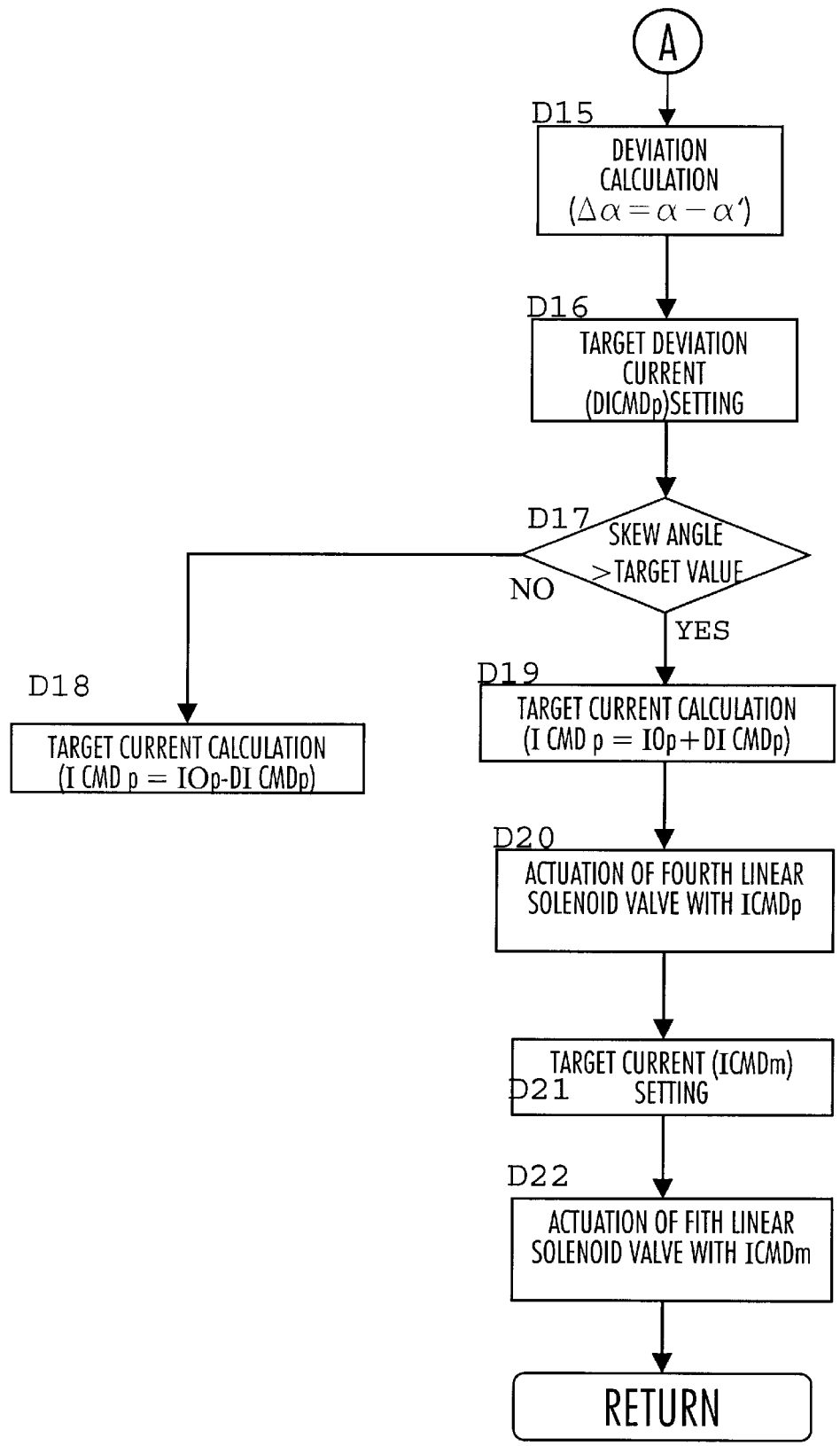
FIG. 19 is another subflow chart, which shows angular determinations made in the control flow shown in the main flow chart.

Now, the angle control B4 is described with reference to FIGS. 18 and 19. It is clear from the above mentioned control flow that the angle control B4 is to be performed when the transmission is close to its neutral condition (in the vicinity of vertical line a in FIG. 2). The skew angle β of the motor swash plate is set either at zero or at the maximum value β(MAX). This means that when the shift position is in the N or P range, the skew angle β is set at zero, and the skew angle β is set at the maximum value β(MAX) in other cases. The skew angle of the motor swash plate is easily set at these angles by adjusting the motor control pressure PCM, which is supplied to the right end port 87*a* of the motor control valve 87, to zero or to the maximum value so as to shift the spool 88 to the left end position or to the right end position.

In addition to the above control of the skew angle of the motor swash plate, the angle control B4 is to carry out the positional feedback control of the skew angle of the pump swash plate. In this control, first, a determination is made whether the shift position is in the N or P range or not at Step D1. If the shift position is in the N or P range, then the target deviation α1 of the pump swash plate is set at zero (α1=0) at Step D6.

If the shift position is in any range other than the N or P range, then a determination is made of the engine rotational speed Ne whether the rotational speed Ne is equal to or less than a predetermined rotational speed (e.g., 600 rpm, which is a little less than an idling rotational speed, i.e., 700 rpm) at Step D2. If the engine rotational speed Ne is equal to or less than the predetermined rotational speed, then the target deviation α1 of the pump swash plate is set at zero (α1=0) at Step D6. From this control, it is understood that when the positional feedback control for the pump swash plate (angle control) is performed, the target deviation α1 is set to zero (α1=0) unconditionally if the engine rotational speed is equal to or less than the idling rotational speed so as to prohibit any control which may increase the delivery of the pump.

On the other hand, if the engine rotational speed is above the predetermined value, then a determination is made whether the engine throttle opening is completely closed (θTH=0) or not at Step D3. If the throttle is open, then the control flow proceeds to Step D8, where the target deviation α1 of the pump swash plate is set. If the throttle is completely closed, then the control flow proceeds to Step D4, and a determination is made whether the vehicle speed V is equal to or less than a predetermined vehicle speed (e.g., 5 km/h) or not. If the vehicle speed V is above the predetermined speed, then the control flow proceeds to Step D8. However, if it is equal to or less than the predetermined vehicle speed, then the control flow proceeds to Step D5, where another determination is made whether the brake operation is ON or not, i.e., whether the brake pedal is being applied or not. If the brake is ON, then the control flow proceeds to Step D6. If it is OFF, then the control flow proceeds to Step D8.

Since the target deviation α1 of the pump swash plate is set at Step D6 or D8, the setting carried out at Step D8 is described at first. As shown in FIG. 20, a creep lever 220 and an EXC switch 221 are provided at the driver seat. The creep lever 220 is manipulated by the driver, and the EXC switch 221 is used to renew the initial value of the skew angle of the pump swash plate. At Step D8, the target deviation α1 of the pump swash plate is set on the basis of the manipulated amount ACR of the creep lever 220. Specifically, a relation between the manipulated amount ACR of the creep lever 220 and the target deviation α1 of the pump swash plate is predetermined as shown in FIG. 21, and the setting is performed in accordance with this relation.

As shown in FIG. 20, the creep lever 220 is swiveled forward and backward from an upright position, which is a neutral position N. The creep lever 220 is an automatically resetting lever which automatically returns to the neutral position, so when it is not manipulated, it is positioned at the neutral position N as shown in the figure. When the creep lever 220 is at the neutral position N, the target deviation α1 of the pump swash plate is zero. If the lever 220 is swiveled to the "+" side as shown in the figure, then the target deviation α1 is set to a positive value which is proportional to the manipulated amount of the creep lever. Likewise, if the creep lever is swiveled to the "−" side, then the target deviation α1 is set to a negative value which is proportional to the manipulated amount of the creep lever.

At Step D11, the initial value α0 of the skew angle of the pump swash plate and the initial value β0 of the skew angle of the motor swash plate are set. These values are set on the basis of the shift position as shown in FIG. 22. If the shift position is in the N, P or R range, then these values are set to respective predetermined values notwithstanding the condition, i.e., ON or OFF, of the brake. However, if the shift position is in any forward drive range (D, L, S or M range), then these values are set at respective different predetermined values which are dependent on the condition, i.e., ON or OFF, of the brake. In this case, as the brake is OFF, Predetermined value 2 is selected. In the table of the figure, Predetermined value 1 which is selected for the R (rearward drive) range is a negative value (e.g., −5 degrees), and the predetermined values 2 and 3 which are selected for the D, L, S and M (forward drive) ranges are positive values (e.g., +5 degrees and +3 degrees, respectively).

Figure 23:
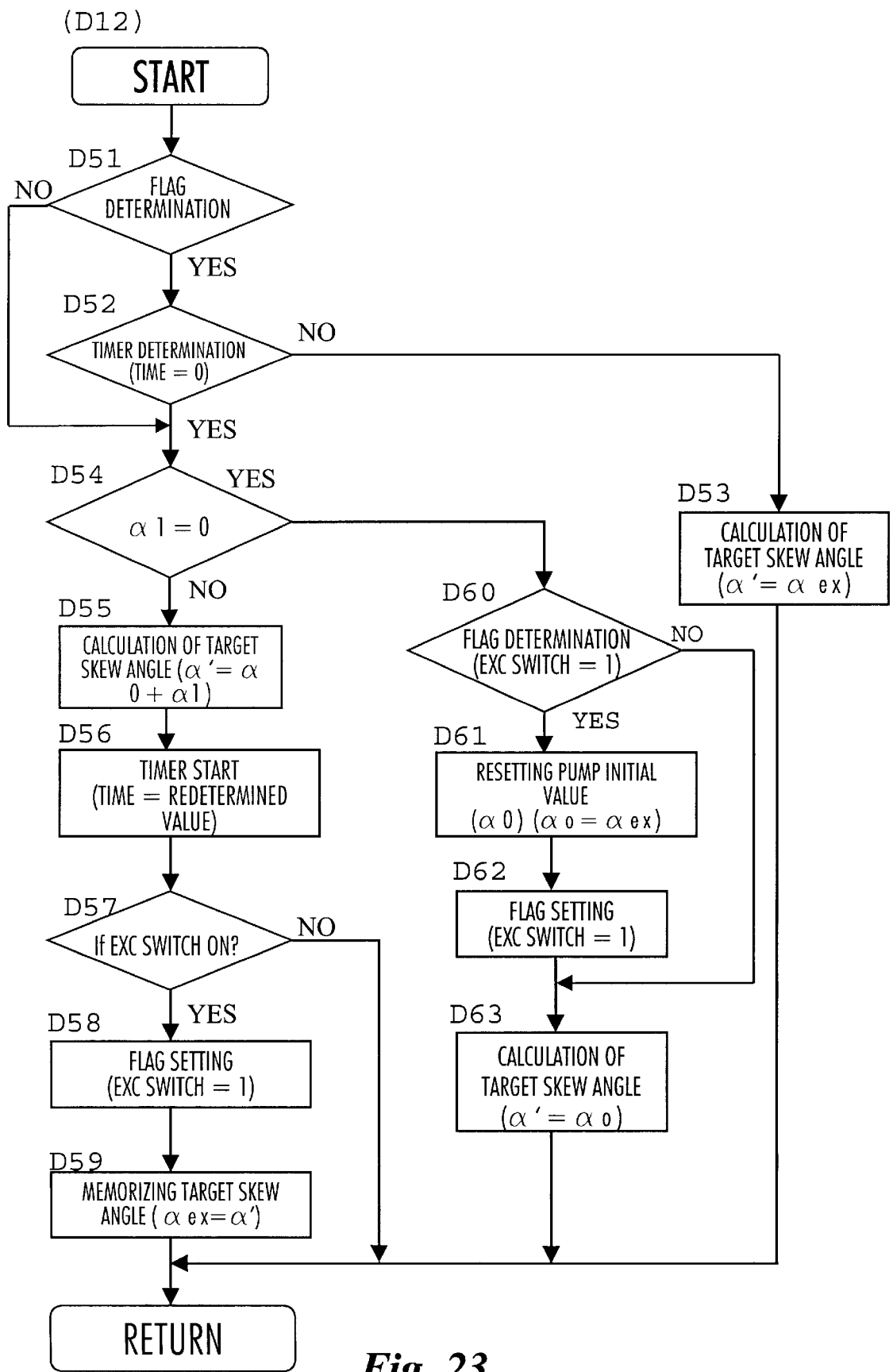
FIG. 23 is a subflow chart showing the calculation of the target skew angles of the swash plates (Step D12)

From the target deviation α1 of the pump swash plate and the initial value α0 of the skew angle, a target skew angle α' is calculated for the pump swash plate at Step D12. This calculation is described with reference to FIG. 23. As mentioned previously, the target deviation α1 of the pump swash plate is set when the creep lever 220 is manipulated by the driver. More specifically, the target deviation α1 of the pump swash plate is taken for the calculation of the target skew angle α' when the driver presses the EXC switch 221 down while he is manipulating the creep lever (i.e., when the driver shows his intention to set the value). The EXC switch 221 is a momentary switch, which is ON only while it is pressed down, and it returns to OFF when released.

At this step, a determination is made of the flag which is set up when the EXC switch is turned on whether the flag is one (EXC switch=1) or not. If the flag is zero (0), then the control flow proceeds to Step D54, and another determination is made of the target deviation α1 of the pump swash plate whether the target deviation is zero (α1=0) or not. If the target deviation is not zero, i.e., the creep lever 220 is being manipulated, then the control flow proceeds to Step D55, where the target skew angle α' is calculated (α'=α0+α1). At this point, a timer is set to count a predetermined time period at Step D56, and a determination is made of the condition of the EXC switch 221 whether the EXC switch is turned on or not at Step D57. If the switch is OFF, then the control flow return to the start of this control flow. However, if the switch is turned ON, then the flag is set up (EXC switch=1) at Step D58, and the target skew angle α' at this moment is memorized as αex at Step D59.

When the flag is one (EXC switch=1), the control flow returns to the start of this control flow and proceeds to Step D51 and to Step D52, and the target skew angle (α'=αex) is retained until the time which is set on the timer elapses. When the time is up, a determination is made of the target deviation α1 of the pump swash plate whether the target deviation is zero (α1=0) or not at Step D54. If it is zero (α1=0), i.e., the creep lever 220 is released after the EXC switch 221 is pressed, the control flow proceeds to Step D60. There, another determination is made whether the flag is up (EXC switch=1) or not. If the flag is up (1), then the initial value α0 for the skew angle of the pump swash plate is reset at Step D61 with the target skew angle αex which is memorized at Step D59, and the flag is lowered (EXC switch=0) at Step D62. This reset initial value α0 is then set as the target skew angle α' at Step D63.

Summarizing the above control at Step D12, the following can be said. If the EXC switch 221 is pressed down while the creep lever 220 is manipulated, then the target skew angle α' of the pump swash plate is set by adding the initial value α0 of the skew angle of the pump swash plate to the target deviation α1 which corresponds with the amount of manipulation of the creep lever at the moment. Then, this target skew angle α' is retained even though the creep lever 220 is returned to the neutral position. In addition, this target skew angle α'(=αex) becomes a new initial value α0 for the skew angle of the pump swash plate. Thereafter, if the EXC switch 221 is pressed down while the creep lever 220 is manipulated again, then the current target skew angle α' of the pump swash plate is added with the target deviation α1 which corresponds with the amount of manipulation of the creep lever made at this moment. Thus, if the manipulation of the creep lever 220 and the pressing of the EXC switch 221 are repeated, then the target skew angle α' is set accordingly with the addition of the target deviations α1 which correspond to the repeated operations.

After the target skew angle α' of the pump swash plate is set at Step D12 as described above, a determination is made at Step D13 whether this value α' is greater than the initial value α0, which is set at Step D11. If the target skew angle α' is equal to or smaller than the initial value α0 (α'≧α0), then the target skew angle α' is set equal to the initial value (α'=α0) at Step D14. When the creep lever 220 is manipulated to the negative side, the target skew angle α' may become smaller than the initial value (α'≧α0). However, even if such case happens, the skew angle of the pump swash plate will not be set to a value smaller than the initial value α0.

On the other hand, the target deviation α1 of the pump swash plate is set to zero (α1=0) at Step D6, and the initial value α0 for the pump swash plate and the initial value β0 for the motor swash plate are set in accordance with the table of FIG. 22 at Step D9. In this case, as the brake is ON, Predetermined value 3 is taken as an initial value when the shift position is in a forward drive range (D, L, S or M). Predetermined value 3 is smaller than Predetermined value 2 so as to make the initial value α0 relatively small when the brake pedal is applied. This initial value α0 and the target deviation α1 are added to achieve the target skew angle α' for the pump swash plate at Step D10.

Figure 24:
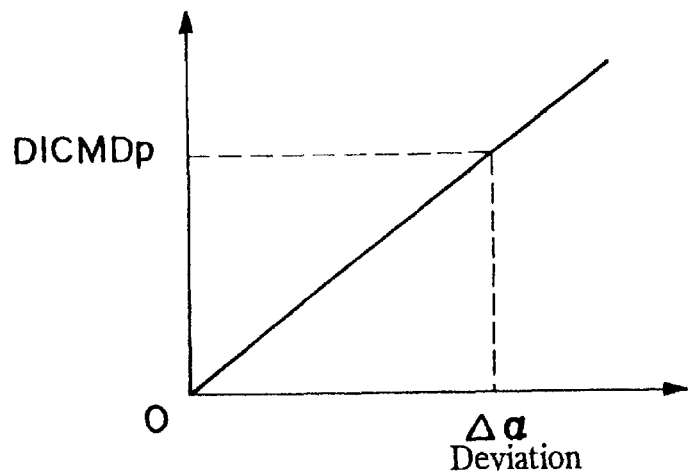
FIG. 24 is a graph showing a relation between angular deviation and the current applied to a fourth linear solenoid valve to clear target deviation.

Then, a calculation is made for the deviation angle Δα (=α−α') of this target skew angle α' from the current skew angle α of the pump swash plate at Step D15, and a target current (target deviation current DICMDp) which is applied to the fourth linear solenoid valve 54 is set to realize this deviation angle in the pump swash plate control at Step D16. Relations between the target deviation current DICMDp and the deviation angle Δα are predetermined on the basis of the operational characteristics of the pump swash plate 32, which correspond with the operation of the fourth linear solenoid valve 54 as shown in FIG. 24. The target deviation current DICMDp is taken from the figure in correspondence with the deviation angle Δα, which is calculated at Step D15.

With this target deviation current DICMDp, a feedback control is performed to set the skew angle of the pump swash plate to the target skew angle α'. At first, for deciding the direction for the control, a determination is made whether the current skew angle α is greater than the target skew angle α' or not at Step D17. If the current skew angle is greater than the target skew angle (α>α'), then a target current ICMDp is calculated at Step D19 by adding the target deviation current DICMDp to a control current IOp which is needed to retain the spool 85 of the pump control valve 84 at the neutral position. However, if the current skew angle is equal to or smaller than the target skew angle (α≧α'), then the target current ICMDp is calculated at Step D18 by subtracting the target deviation current DICMDp from the control current IOp which is needed to retain the spool 85 of the pump control valve 84 at the neutral position. With this target current ICMDp, the fourth linear solenoid valve 54 is actuated at Step D20 to control the skew angle of the pump swash plate closer to the target skew angle α'.

It is understood from the above description that when the vehicle is in the N or P range, the skew angle of the pump swash plate is set to zero, but when the vehicle is in any other drive range, the skew angle of the pump swash plate is controlled to the target skew angle α', and the vehicle comes into creeping condition. As the target skew angle α' changes with the amount of manipulation of the creep lever 220, the inching of the vehicle is possible with the operation of the creep lever.

As for the skew angle β of the motor swash plate, the initial value β0 has been already set as mentioned previously. As this initial value is either zero or the maximum value, a maximum current or zero current is set as a target current ICMDm at Step D21. With this target current, the fifth linear solenoid valve 55 is actuated at Step D22 to control the motor swash plate to the upright position or to the maximally slanted position.

Now, the Ne control B5 is described with reference to FIG. 25. This is to control the skew angles of the swash plates of the pump and the motor and the operation of the lock-up brake, thereby regulating the engine rotational speed Ne to the target engine rotational speed Ne' in feedback control. At first, a deviation rotational speed Δ Ne is calculated by subtracting the actual engine rotational speed Ne from the target engine rotational speed Ne' at Step E1 (ΔNe=Ne'−Ne).

Figure 26:
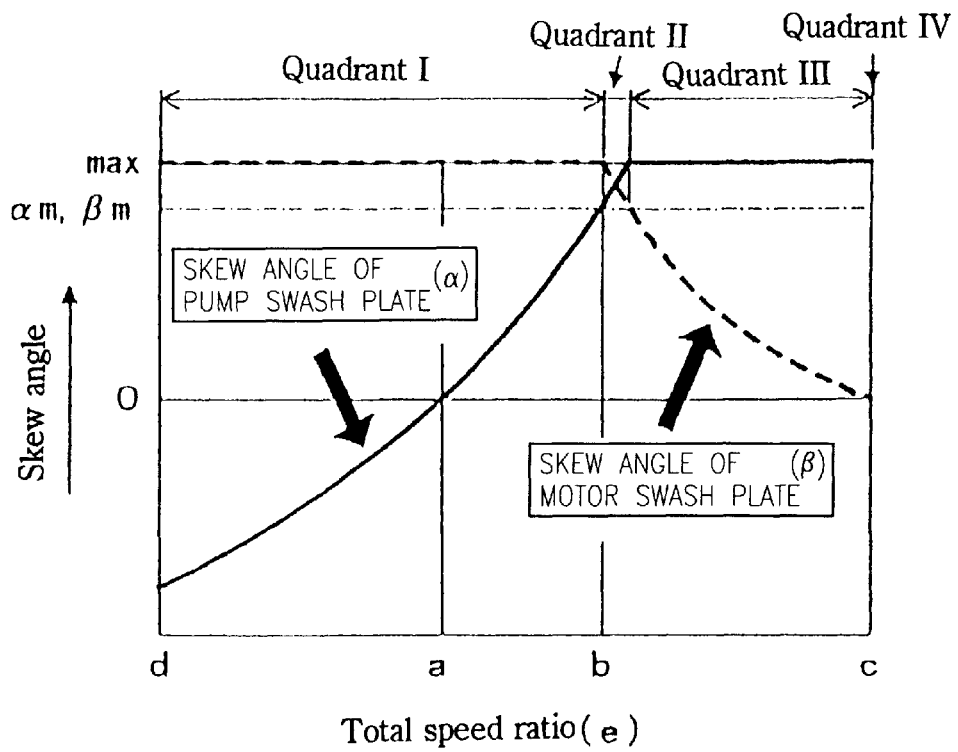
FIG. 26 is a graph showing relations between the skew angles of the swash plates of the pump and the motor of the hydraulic transmission and the total speed ratios, and this graph also depicts control area.

Then, at Step E2, a determination is made which quadrant the condition of the transmission is in, of the graph of FIG. 2. As mentioned previously, this graph describes the relation of the changes in the total speed ratio to the changes in the skew angles α and β of the swash plates of the pump and the motor. For controlling the speed change, this graph representing the condition of the transmission in control is divided into four control quadrants or zones (Quadrant I–IV) as shown in FIG. 26, and a determination is made which control quadrant the actual condition is in at Step E2. This determination is described in the following with reference to FIG. 27.

Figure 27:
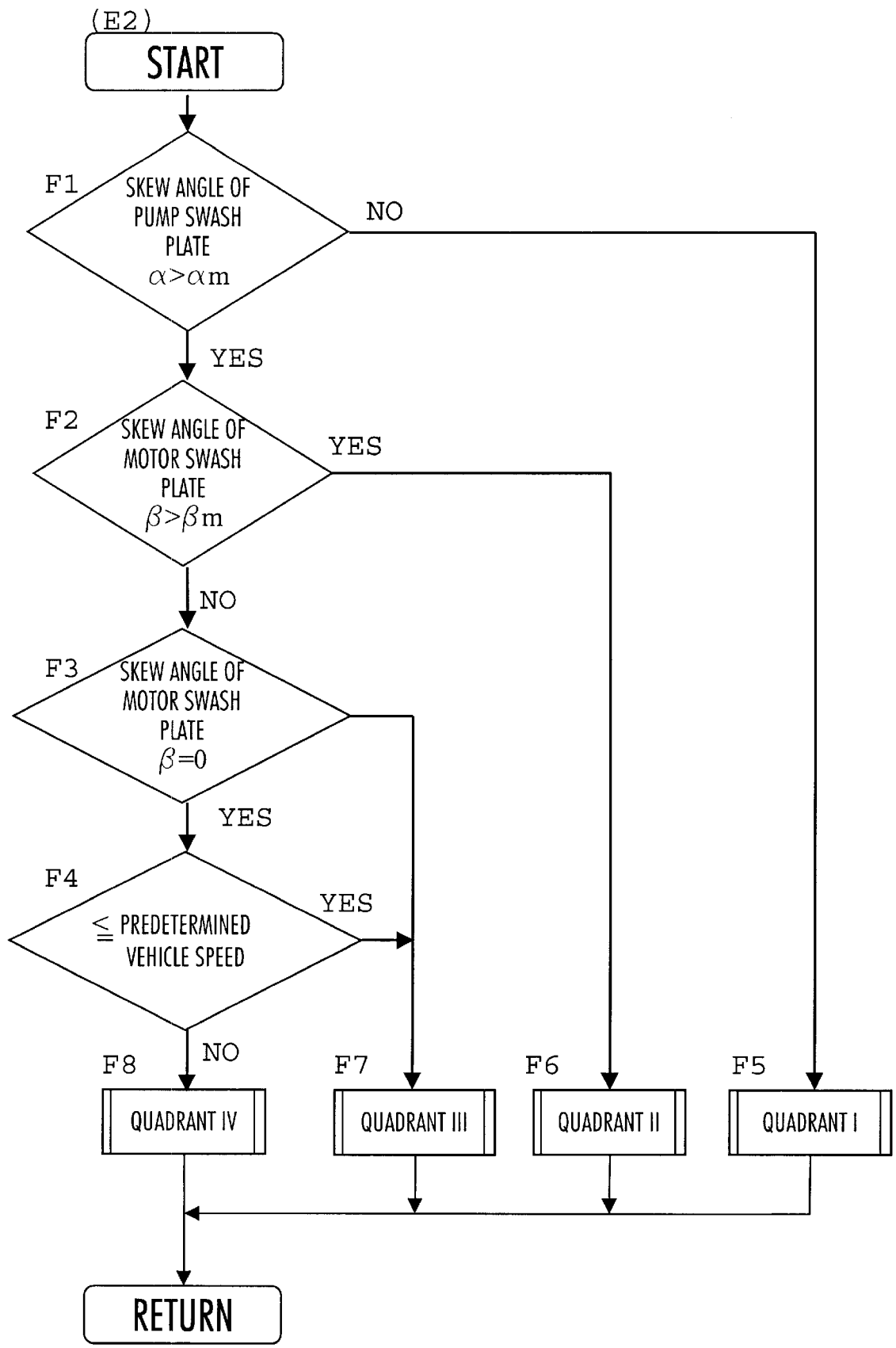
FIG. 27 is a subflow chart showing control determinations for the control area, which is part of the Ne control subflow shown in FIG. 25.
Figure 28A:
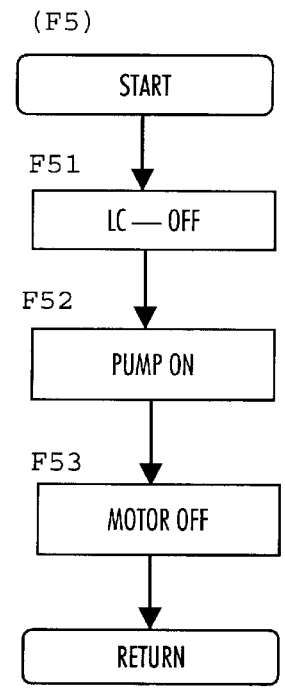
FIG. 28 is comprised of subflow charts, FIGS. 28(*a*) through 28(*d*), showing control area determinations, which is part of the subflow shown in FIG. 27.

As shown in FIG. 27, first a determination is made at Step F1 whether the skew angle α of the pump swash plate is greater than an intermediate angle αm, which is between zero and the maximum value. This is to determine whether the skew angle α of the pump swash plate is near the maximum skew angle in the forward drive direction αF(MAX). If the skew angle α of the pump swash plate is equal to or smaller than the intermediate angle αm (α≧αm), then the transmission is in the condition which corresponds to Quadrant I in FIG. 26, so the control flow proceeds to Step F5, whose control is described in detail in FIG. 28(a). There, the control of the lock-up brake is turned OFF at Step F51; the control of the pump swash plate is turned ON at Step F52; and the control of the motor swash plate is turned OFF at Step F53. In this way, only the control of the pump swash plate is carried out for the condition in Quadrant I. Also, in this zone, the angle control B4 and the Ne control are switched, i.e., the controls for the start and stop of the vehicle are smoothly exchanged.

Figure 28B:
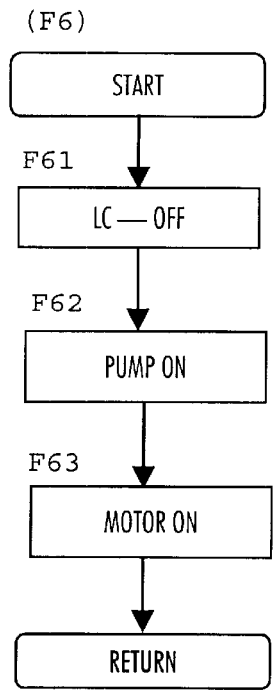

If the skew angle α of the pump swash plate is greater than the intermediate angle αm (α>αm), then a determination is made at Step F2 whether the skew angle β of the motor swash plate is greater than an intermediate angle βm, which is between zero and the maximum value. This is to determine whether the skew angle of the motor swash plate is near the maximum skew angle or not. If the skew angle of the motor swash plate is greater than an intermediate angle (β>βm), then the transmission is in the condition which corresponds to Quadrant II in FIG. 26, so the control flow proceeds to Step F6, whose control is described in detail in FIG. 28(b). There, the control of the lock-up brake is turned OFF at Step F61; the control of the pump swash plate is turned ON at Step F62; and the control of the motor swash plate is turned ON at Step F63. In this way, the controls of the pump and motor swash plates are carried out at the same time for the condition in Quadrant II, and these two controls are carried over from one control to the other smoothly.

Figure 28C:
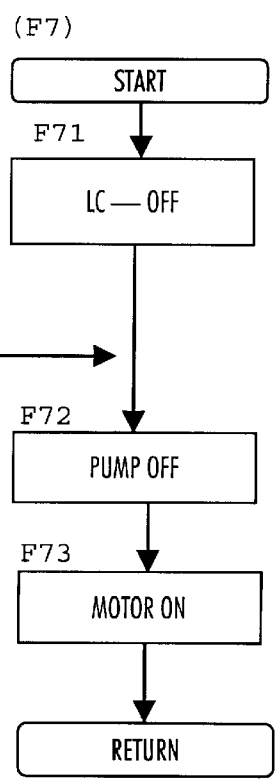
Figure 28D:
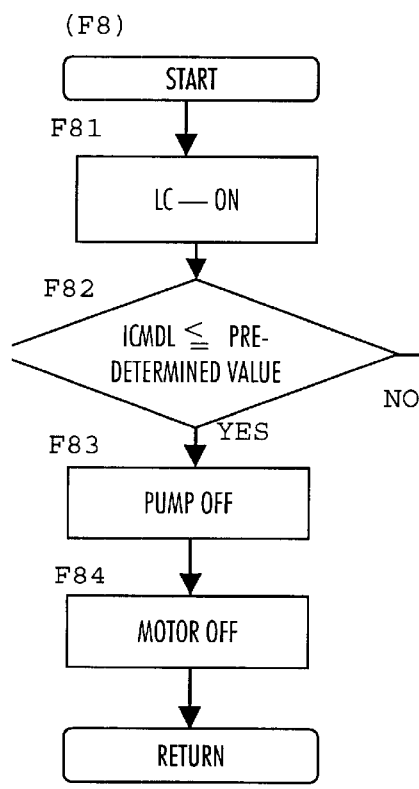

If the skew angle of the motor swash plate is equal to and smaller than an intermediate angle (β≧βm), then a determination is made whether the skew angle β of the motor swash plate is zero or not at Step F3. If the skew angle β of the motor swash plate is not zero, then the transmission is in the condition which corresponds to Quadrant III in FIG. 26, so the control flow proceeds to Step F7, whose control is described in detail in FIG. 28(c). There, the control of the lock-up brake is turned OFF at Step F71; the control of the pump swash plate is turned OFF at Step F72; and the control of the motor swash plate is turned ON at Step F73. In this way, only the control of the motor swash plate is carried out for the condition in Quadrant II, and most part of the vehicle drive control is performed in Quadrant III and Quadrant IV, which is described in the following.

If the skew angle β of the motor swash plate is zero, then a determination is made whether the vehicle speed is equal to or less than a predetermined speed or not at Step F4. If the vehicle speed is equal to or less than the predetermined speed, then the above mentioned control for Quadrant III is performed at Step F7. In this way, the lock up is not carried out for the condition where the vehicle has a speed equal to or less than the predetermined speed. However, if the vehicle speed is greater than the predetermined value, then the transmission is in the condition which corresponds to Quadrant IV in FIG. 26, so the control flow proceeds to Step F8. There, the control of the lock-up brake is turned ON at Step F81, and a determination is made of the target current ICMDL which controls the sixth linear solenoid valve 56 that actuates the lock-up brake whether this current is equal to or smaller than a predetermined value or not at Step F82. If it is equal to or smaller than the predetermined value (i.e., the engaging force of the lock-up brake is relatively small), then the control of the pump is turned OFF at Step F83; and the control of the motor is turned ON at Step F84. However, if the target current is greater than the predetermined value (i.e., the lock-up brake is engaged to a certain degree), then not only the control of the pump is turned OFF at Step F72, but also the control of the motor is turned OFF at Step F73.

Figure 25:
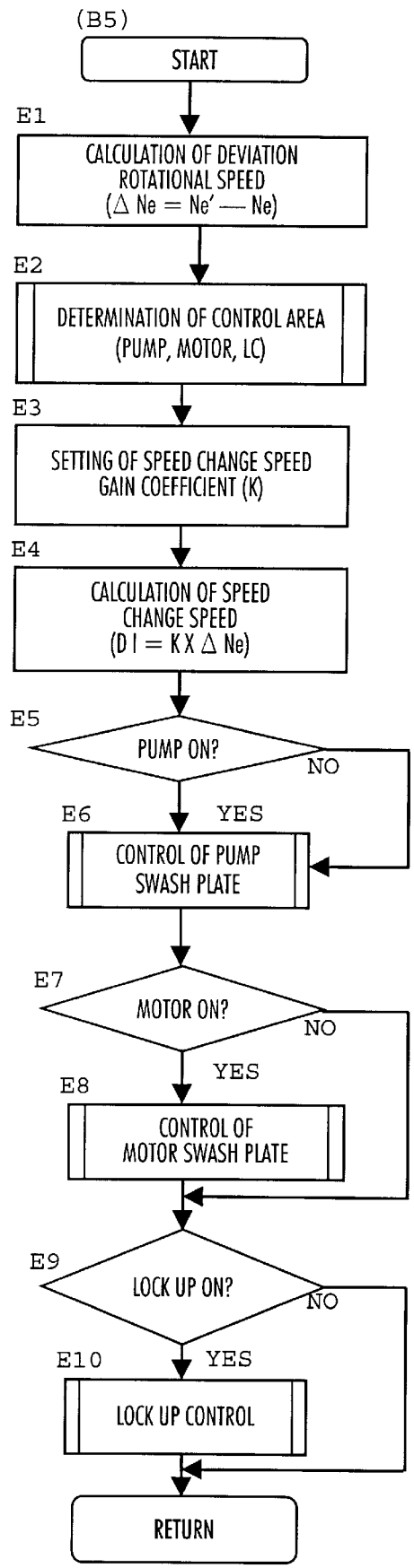
FIG. 25 is a subflow chart, which depicts Ne control flow in the control flow shown in the main flow chart.
Figure 29:
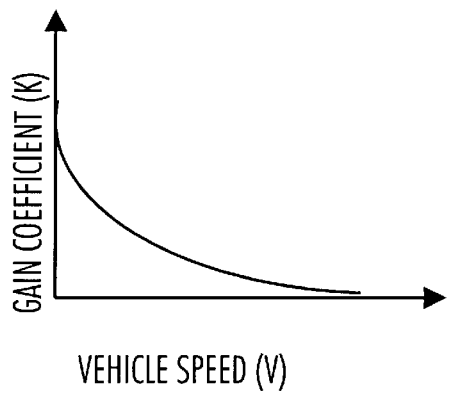
FIG. 29 is a graph showing a relation between the speed gain coefficient of speed change which is determined in the Ne control subflow shown in FIG. 25 and the vehicle speed.

After the determination of the control zone is performed at Step E2 of FIG. 25 in this way, a gain coefficient K for speed change speed is set at Step E3. As the gain coefficient K is predetermined in relation to the vehicle speed V as shown in FIG. 29, the gain coefficient K is taken in correspondence with the actual vehicle speed V at the moment. It is clear from the figure that the smaller the vehicle speed V the greater the gain coefficient. Then, this gain coefficient K is multiplied by the deviation rotational speed α Ne, which is calculated at Step E1, to produce a speed change speed DI (=K×ΔNe) at Step E4.

Thereafter, determinations are made whether the controls of the pump, the motor and the lock-up brake are ON or not at Steps E5, E7 and E9. If the control of the pump is ON, then the pump swash plate is controlled at Step E6; if the control of the motor is ON, then the motor swash plate is controlled at Step E8; and if the control of the lock-up brake is ON, then the lock up is controlled at Step E10.

First, the control of the pump swash plate executed at Step E6 is described with reference to FIG. 30. The pump swash plate is controlled to swivel in the forward drive direction α F or in the rearward drive direction α R. Although these directions are opposite to each other, the pump swash plate 32 is controlled in either direction in the same manner. Therefore, the control in the forward drive direction is described here, as an example. This is to control the current applied to the fourth linear solenoid valve 54, taking the engine rotational speed as the value to be controlled. For example, if the actual engine rotational speed Ne is less than the target engine rotational speed Ne', then the speed ratio is controlled to become greater (i.e., shifted toward LOW), which is to make the skew angle α of the pump swash plate smaller. On the other hand, if the actual engine rotational speed Ne is greater than the target engine rotational speed Ne', then the speed ratio is controlled to become smaller (i.e., shifted toward TOP), which is to make the skew angle α of the pump swash plate greater.

Figure 30:
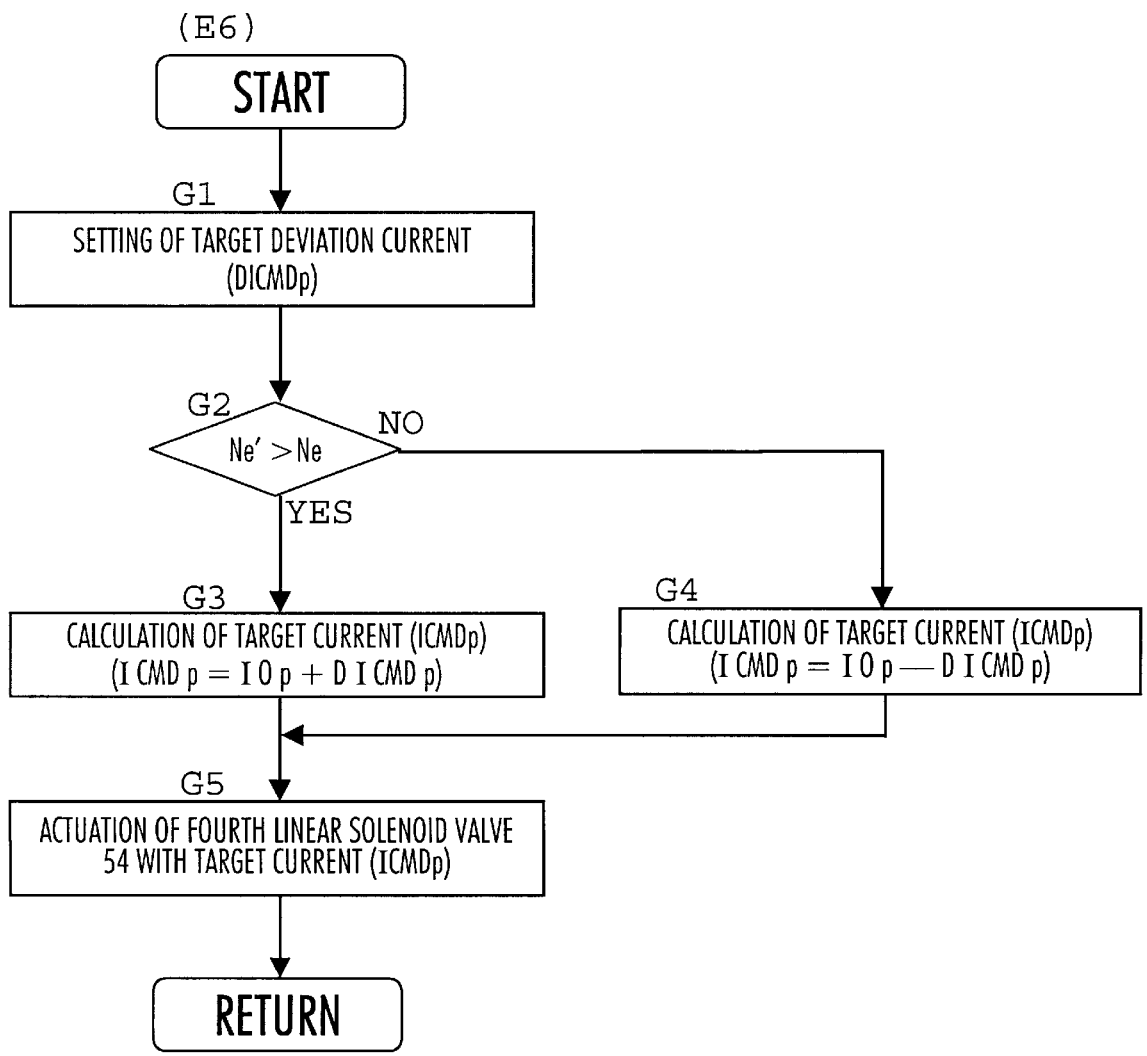
FIG. 30 is a subflow chart showing the control of the swash plate of the pump, which is part of the Ne control subflow shown in FIG. 25.
Figure 31:
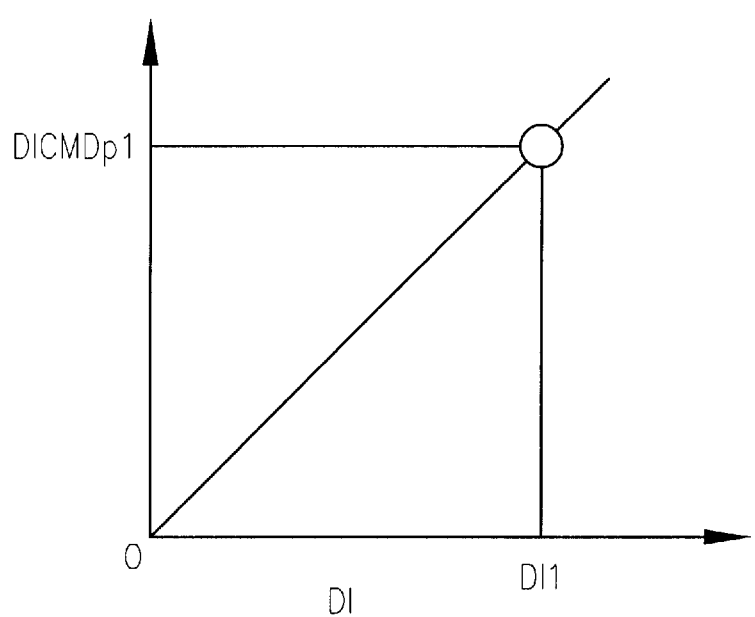
FIG. 31 is a graph showing a relation between the current inducing the target skew angle of the swash plate of the pump and the speed of speed change.

In this control flow, a target deviation current DICMDp is set at Step G1 as shown in FIG. 30. The target deviation current DICMDp is predetermined in relation with the speed change speed DI as shown in FIG. 31, and from this relation, a value which corresponds with the speed change speed DI(1) that is calculated at Step E4 in FIG. 25 is taken as the target deviation current DICMDp(1). Then, a determination is made whether the target engine rotational speed Ne' is greater than the actual engine rotational speed (i.e., the current engine rotational speed) Ne at Step G2.

If the target engine rotational speed is greater than the actual engine rotational speed (Ne'>Ne), then the control proceeds to Step G3, where a calculation is made for the target current ICMDp which is required for making the speed change ratio greater (i.e., to shift toward LOW). This target current is calculated by adding the target deviation current DICMDp to the control current IOp which is required for retaining the spool 85 of the pump control valve 84 at the neutral position. On the other hand, if the target engine rotational speed is equal to or less than the actual engine rotational speed (Ne'≦Ne), then the control proceeds to Step G4, where a calculation is made for the target current ICMDp which is required for making the speed change ratio smaller (i.e., to shift toward TOP). This target current is calculated by subtracting the target deviation current DICMDp from the control current IOp which is required for retaining the spool 85 at the neutral position.

Figure 32:
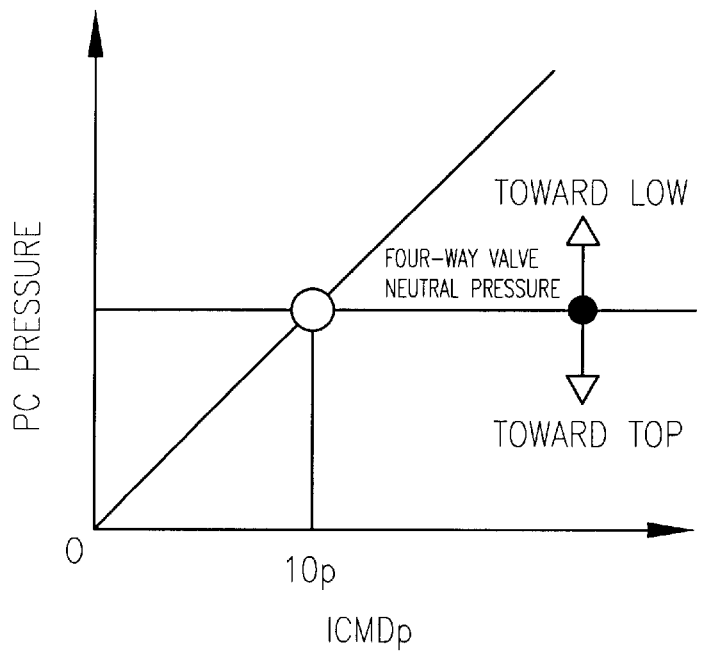
FIG. 32 is a graph showing a relation between the target current (ICMDp) applied to the fourth linear solenoid valve and the control pressure PC.

With this target current ICMDp as a control current, the fourth linear solenoid valve 54 is actuated at Step G5. FIG. 32 shows the relation between the control pressure PC and the target current ICMDp which is applied to the linear solenoid valve 54. If the target current ICMDp equals the above mentioned control current IOp, then the pump control valve 84 is kept at the neutral. When the target current ICMDp is increased or decreased from this value, the speed is shifted toward LOW or toward TOP, respectively. In this way, the feedback control is performed to bring the actual engine rotational speed Ne close to the target engine rotational speed Ne'.

Now, the control of the motor swash plate which is carried out at Step E8 is described with reference to FIG. 33. This is to control the current applied to the fifth linear solenoid valve 55, taking the engine rotational speed as the value to be controlled. For example, if the actual engine rotational speed Ne is less than the target engine rotational speed Ne', then the speed ratio is controlled to become greater (i.e., shifted toward LOW), which is to make the skew angle β of the motor swash plate greater. On the other hand, if the actual engine rotational speed Ne is greater than the target engine rotational speed Ne', then the speed ratio is controlled to become smaller (i.e., shifted toward TOP), which is to make the skew angle β of the motor swash plate smaller.

Figure 33:
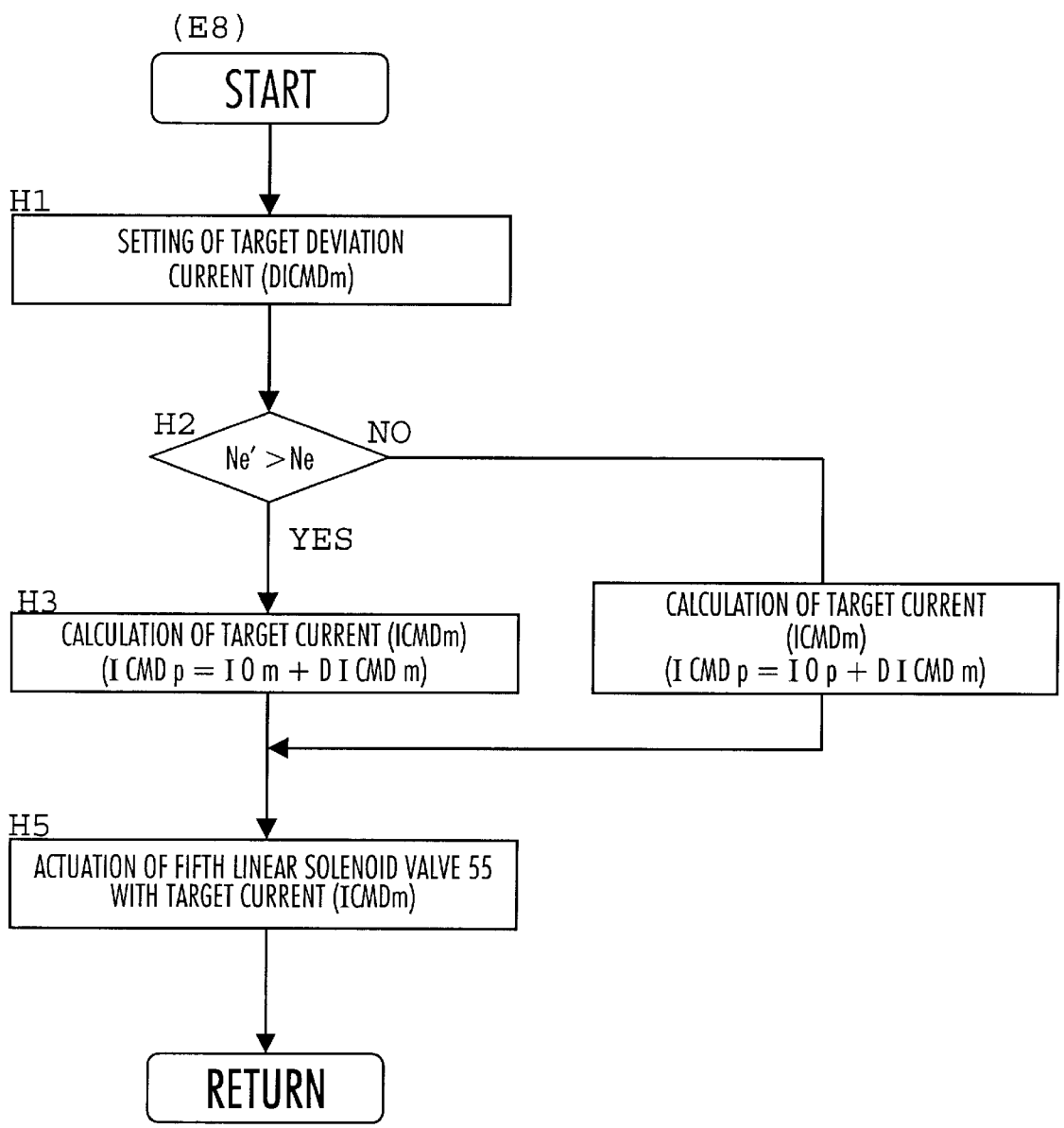
FIG. 33 is a subflow chart showing the control of the swash plate of the motor, which is part of the Ne control subflow shown in FIG. 25.
Figure 34:
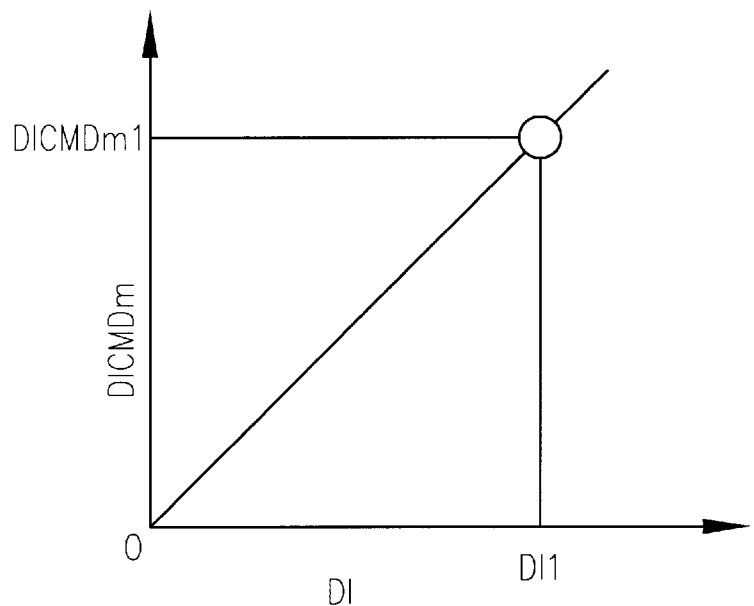
FIG. 34 a graph showing a relation between the current inducing the target skew angle of the swash plate of the motor and the speed of speed change.

In this control flow, a target deviation current DICMDm is set at Step H1 as shown in FIG. 33. The target deviation current DICMDm is predetermined in relation with the speed change speed DI as shown in FIG. 34, and from this relation, a value which corresponds with the speed change speed DI (1) that is calculated at Step E4 in FIG. 25 is taken as the target deviation current DICMDm(1). Then, a determination is made whether the target engine rotational speed Ne' is greater than the actual engine rotational speed (i.e., the current engine rotational speed) Ne at Step H2.

If the target engine rotational speed is greater than the actual engine rotational speed (Ne'>Ne), then the control proceeds to Step H3, where a calculation is made for the target current ICMDm which is required for making the speed change ratio greater (i.e., to shift toward LOW). This target current is calculated by adding the target deviation current DICMDm to the control current IOm which is required for retaining the spool 88 of the motor control valve 87 at the neutral position. On the other hand, if the target engine rotational speed is equal to or less than the actual engine rotational speed (Ne'≦Ne), then the control proceeds to Step H4, where a calculation is made for the target current ICMDm which is required for making the speed change ratio smaller (i.e., to shift toward TOP). This target current is calculated by subtracting the target deviation current DICMDm from the control current IOm which is required for retaining the spool 88 at the neutral position.

Figure 35:
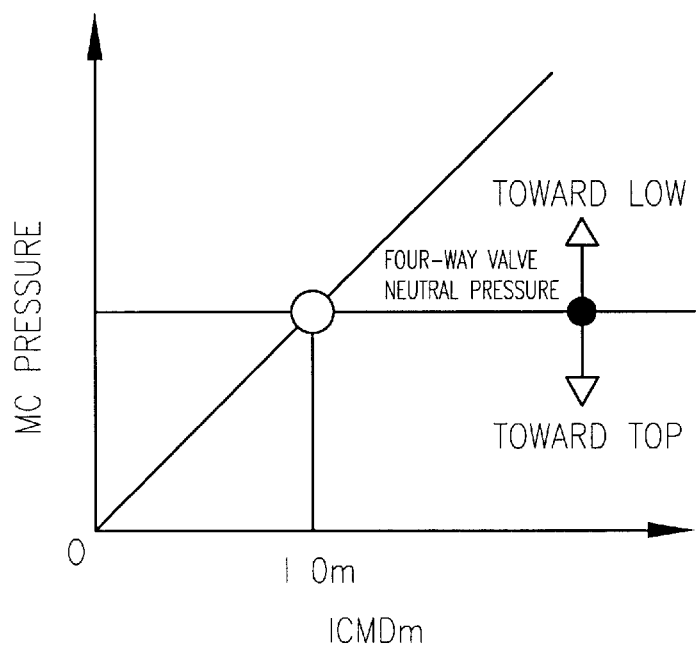
FIG. 35 is a graph showing a relation between the target current (ICMDm) applied to a fifth linear solenoid valve and a control pressure MC.

With this target current ICMDm as a control current, the fifth linear solenoid valve 55 is actuated at Step H5. FIG. 35 shows the relation between the control pressure MC and the target current ICMDm. If the target current ICMDm equals the above mentioned control current IOm, then the motor control valve 87 is kept neutral. As the target current ICMDm is increased or decreased from this value, the speed is shifted toward LOW or toward TOP, respectively. In this way, the feedback control is performed to bring the actual engine rotational speed Ne close to the target engine rotational speed Ne'.

Now, the control of the lock-up brake which is carried out at Step E10 is described with reference to FIG. 36. This is to control the current applied to the sixth linear solenoid valve 56 by determining the strength of the lock up from the ratio of the actual engine rotational speed Ne to the target engine rotational speed Ne'. For example, if the actual engine rotational speed Ne is less than the target engine rotational speed Ne', then the control current applied to the sixth linear solenoid valve 56 is decreased to make the lock up force smaller. On the other hand, if the actual engine rotational speed Ne is greater than the target engine rotational speed Ne', then the control current applied to the sixth linear solenoid valve 56 is increased to make the lock up force greater.

Figure 36:
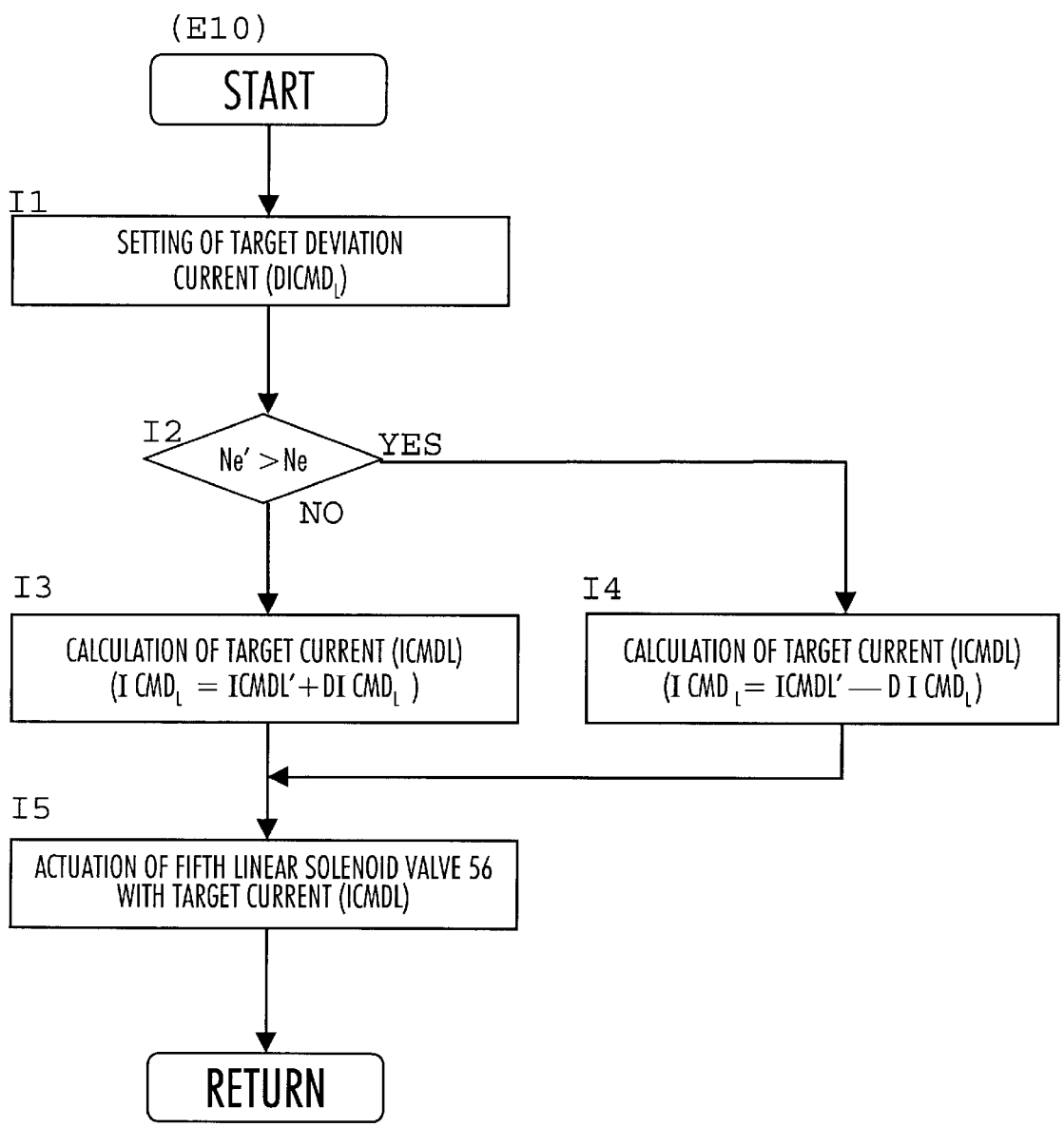
FIG. 36 is a subflow chart showing a lock-up control, which is part of the Ne control subflow shown in FIG. 25.
Figure 37:
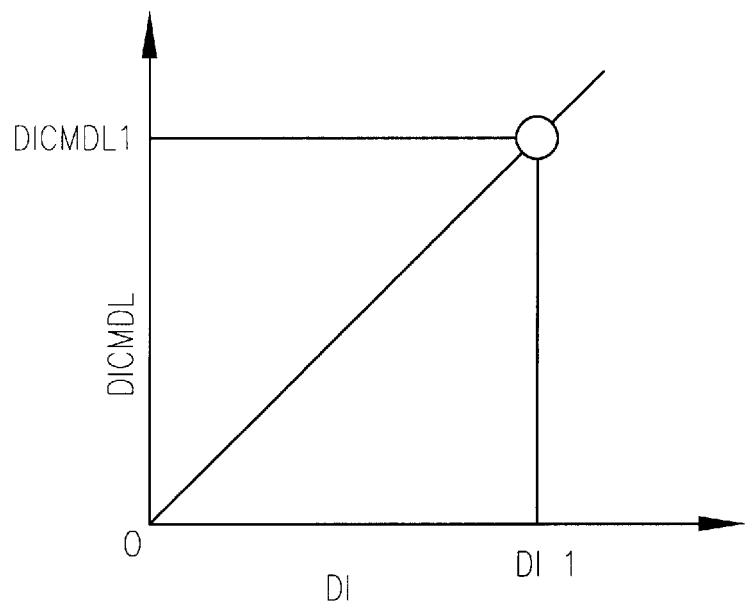
FIG. 37 is a graph showing a relation between the current inducing the lock up and the speed of speed change.

In this control flow, a target deviation current DICMDL is set at Step I1 as shown in FIG. 36. The target deviation current DICMDL is predetermined in relation with the speed change speed DI as shown in FIG. 37, and from this relation, a value which corresponds with the speed change speed DI (1) that is calculated at Step E4 in FIG. 25 is taken as the target deviation current DICMDL(1). Then, a determination is made whether the target engine rotational speed Ne' is greater than the actual engine rotational speed (i.e., the current engine rotational speed) Ne at Step I2.

If the target engine rotational speed is greater than the actual engine rotational speed (Ne'>Ne), then the control proceeds to Step I4, where a calculation is made for a new control current, i.e., a target current ICMDL which will be applied to the sixth linear solenoid valve 56 by subtracting the target deviation current DICMDL from the control current ICMDL' that is applied presently to the six linear solenoid valve 56. Then, this target current is set to weaken the present lock-up force. On the other hand, if the target engine rotational speed is equal to or less than the actual engine rotational speed (Ne'≦Ne), then the control proceeds to Step I3, where a calculation is made for a new control current, i.e., a target current ICMDL which will be applied to the sixth linear solenoid valve 56, by adding the target deviation current DICMDL to the control current ICMDL' that is applied presently to the sixth linear solenoid valve 56. Then, this target current is set to strengthen the present lock-up force.

Figure 38:
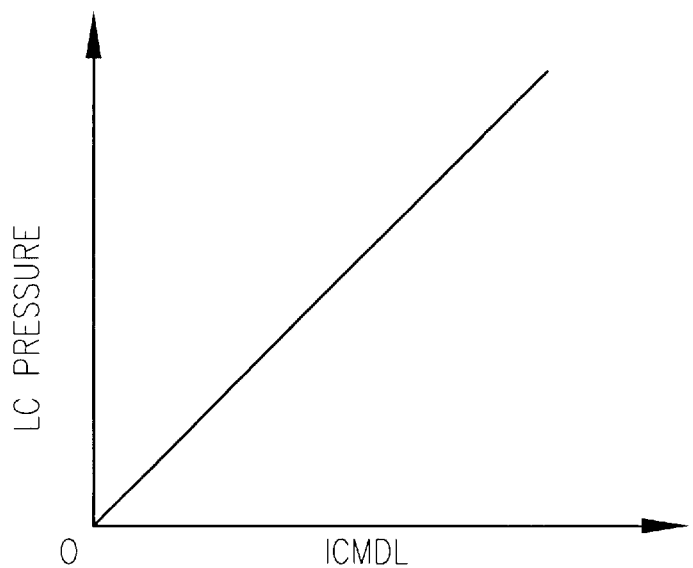
FIG. 38 is a graph showing a relation between the target current applied for the lock up and the control pressure LC for the lock up.

With this target current ICMDL as a control current, the sixth linear solenoid valve 56 is actuated at Step I5. FIG. 38 shows the relation between the control pressure LC and the target current ICMDL, in which the control pressure LC is proportional to the target current ICMDL.

Now, the relief control at Step B6 of FIG. 15 is described. This control is to adjust the relief pressure that is applied to the high pressure relief valves 75F and 75R, which are provided on the first and second oil passages 26a and 26b comprising the hydraulic closed circuit 26. The pressures of the first and second oil passages 26a and 26b change in correspondence with the change of the vehicle drive direction (forward drive and rearward drive) and the condition of the vehicle speed (in acceleration or deceleration) as shown in FIG. 41. Therefore, this relief control responds to the change of these conditions to perform high pressure relief control. The pressure of the oil passage which is at the lower pressure is supplied from the low pressure relief valve 74 through the shuttle valve 70.

In this system, the pressure relief of the oil passage which is at the higher pressure is performed by the high pressure relief valves, which release quickly any overpressure and lower the pressure to a predetermined value, to alleviate the shock of surge pressure. As the maximum value for the high pressure differs depending on the skew angle of the pump swash plate when the vehicle is in acceleration, the target relief pressure is controlled in correspondence with the skew angle of the pump swash plate. Also, the target relief pressure is controlled in correspondence with the vehicle speed so that an appropriate engine brake force is realized while the vehicle is in deceleration.

Figure 39:
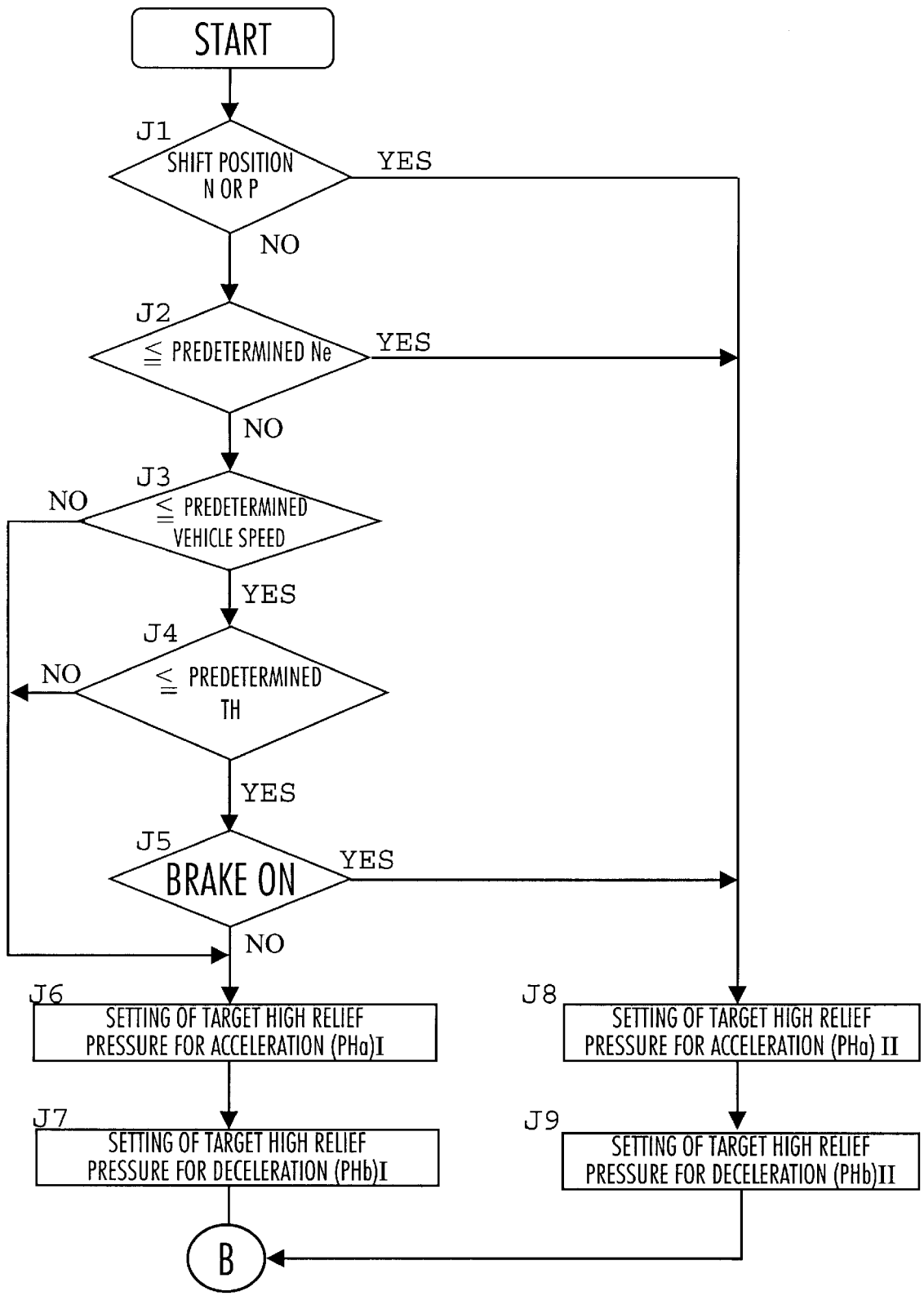
FIG. 39 is a subflow chart showing a relief control process, which is part of the control flow shown in the main flow chart.
Figure 40:
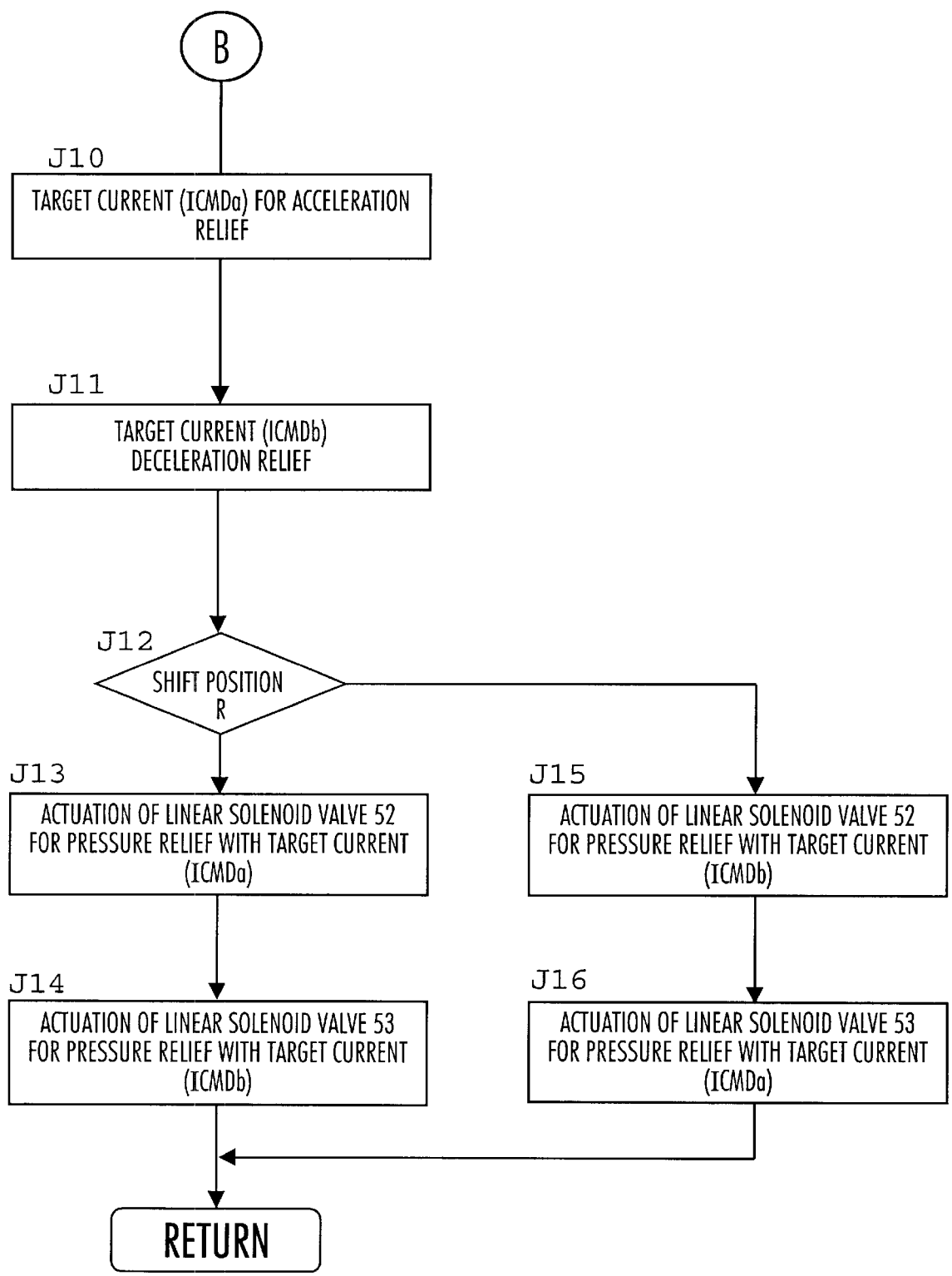
FIG. 40 is a subflow chart showing a relief control process, which is part of the control flow shown in the main flow chart.

The flow of this control is shown in FIGS. 39 and 40, and the circled letters, "B", in the figures combine the two into one continuous flow. In this control, at first, a determination is made of the shift position whether it is in the N or P range at Step J1. If it is in the N or P range, then the control flow proceeds to Steps J8 and J9. However, if the shift position is in any other range than the N or P range, then a determination is made whether the engine rotational speed Ne is equal to or less than a predetermined rotational speed at Step J2. If it is equal to or less than the predetermined rotational speed, then the control flow also proceeds to Steps J8 and J9. However, if the engine rotational speed Ne is above the predetermined rotational speed, then a determination is made whether the vehicle speed V is equal to or less than a predetermined vehicle speed at Step J3. If it is above the predetermined vehicle speed, then the control flow proceeds to Steps J6 and J7. However, if the vehicle speed is equal to or less than the predetermined vehicle speed, then a determination is made of the engine throttle opening θ TH whether it is equal to or smaller than a predetermined throttle opening at Step J4. If it is above the predetermined throttle opening, then the control flow also proceeds to Steps J6 and J7. However, if the engine throttle opening is smaller than the predetermined throttle opening, then a determination is made whether the brake is ON or not at Step J5. If it is ON, then the control flow proceeds to Steps J8 and J9. However, if the brake is OFF, then the control flow proceeds to Steps J6 and J7.

Figure 42:
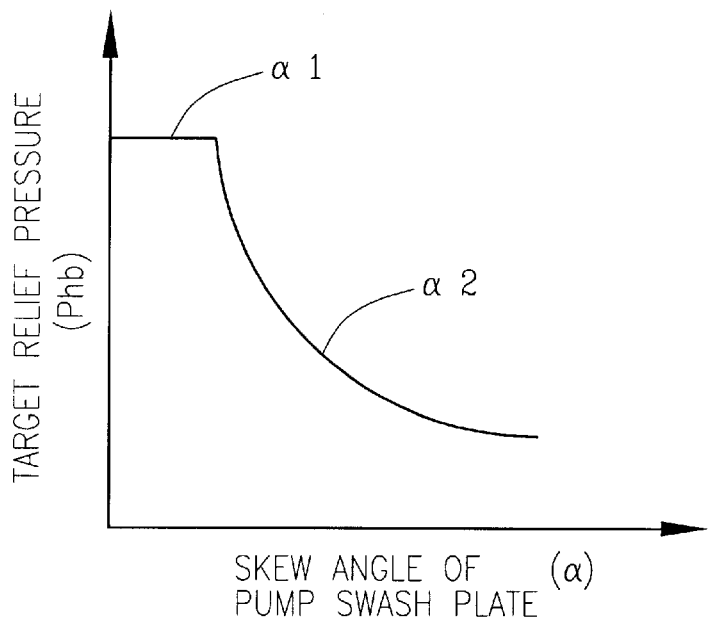
FIG. 42 is a graph showing a relation between the skew angle of the swash plate of the pump and the high relief pressure while the vehicle is in acceleration.
Figure 43:
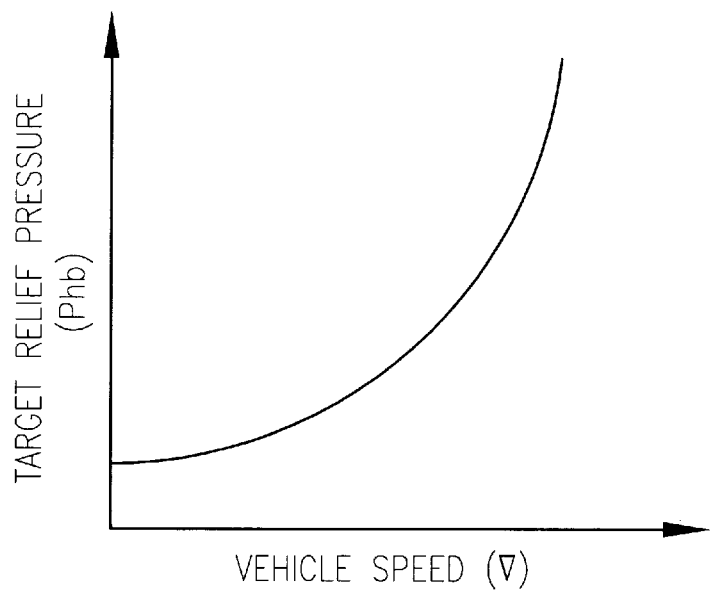
FIG. 43 is a graph showing a relation between the vehicle speed and the target high relief pressure while the vehicle is in deceleration.

A high relief pressure Pha is set in correspondence with the skew angle of the pump swash plate α as shown in FIG. 42 at Step J6. In the figure, the hydraulic pressure indicated by Line a1 is the maximum allowable pressure of the device, and the hydraulic pressure indicated by Line a2 is the target high pressure which alleviates surge pressure in correspondence with the skew angle of the swash plate. Furthermore, the high relief pressure Phb is set in correspondence with the vehicle speed V as shown in FIG. 43 at Step J7. This relief pressure is a target high relief pressure which is set on the basis of the required engine brake force.

On the other hand, a high relief pressure is set on the basis of the specific conditions which are determined at Steps J1–J5 as shown in FIG. 44 at Steps J8 and J9. Specifically, (1) if the shift position is in the N or P range (which is determined at Step J1), then the target relief pressure Ph is set to zero so that the system is made to bypass the closed circuit to establish the neutral condition. (2) if the engine rotational speed decreases below the idling rotational speed (i.e., a predetermined speed) (determined at Step J2), then the target relief pressure is set lower by the amount which corresponds to the rotational speed decrease to prevent the engine from stopping. (3) if the shift position is in any drive range other than the N or P range, the engine rotational speed is above the idling rotational speed, the vehicle speed is equal to or less than the predetermined speed (a relatively low speed), the throttle opening is equal to or smaller than the predetermined throttle opening (a relatively small opening), and the brake is operated, then the condition of the vehicle is judged as being equivalent to stopping, and the target relief pressure is set to the predetermined value. This predetermined value for the target relief pressure is set to zero for both acceleration and deceleration (Pha=0 and Phb=0), or it may be set to a small value which will give a smooth change when the driver releases the brake pedal and steps down the accelerator pedal.

As mentioned previously, the high relief pressure is adjusted as desired by controlling the currents applied to the second and third linear solenoid valves 52 and 53. After the target relief pressure is determined, the target control currents ICMDa and ICMDb which are necessary to set this relief pressure for acceleration or for deceleration are set at Steps J10 and J11. The relation between the target control current and the target relief pressure is shown in FIG. 45, and from this relation, the target control current ICMD which gives the target relief pressure Ph is taken.

Then, a determination is made whether the shift position is in the R (rearward) range or not at Step J12. If the shift position is not in the R range, then the second linear solenoid valve 52, which controls the relief pressure of the first oil passage 26a, is actuated with the target control current ICMDa for acceleration at Step J13, and the third linear solenoid valve 53, which controls the relief pressure of the second oil passage 26b, is actuated with the target control current ICMDb for deceleration at Step J14. However, if the shift position is in the R range, then the second linear solenoid valve 52 is actuated with the target control current ICMDb for deceleration at Step J15, and the third linear solenoid valve 53 is actuated with the target control current ICMDa at Step J16.

Figure 46:
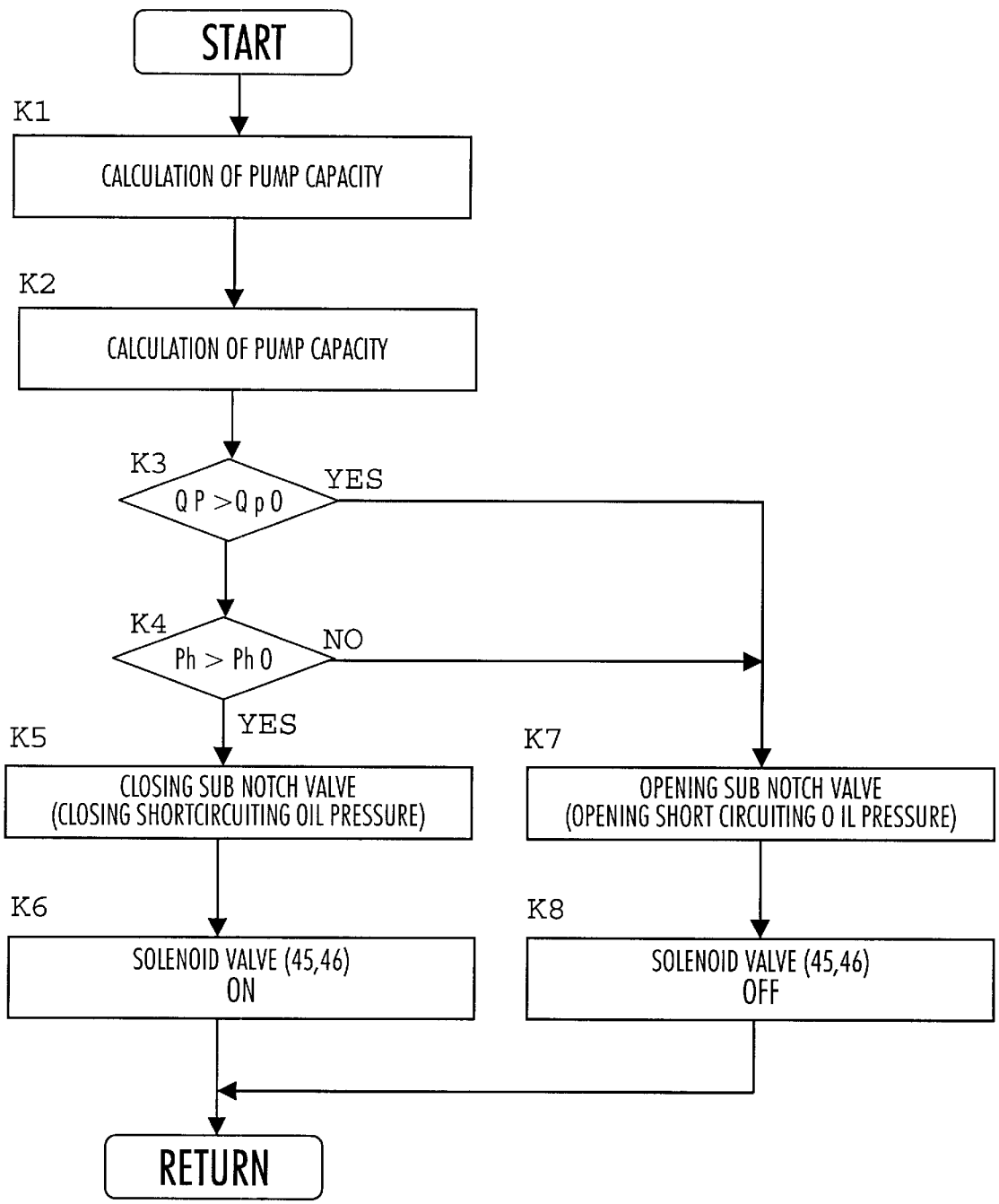
FIG. 46 is a subflow chart that shows variable notch control, which is part of the control flow shown in the main flow chart.

Now, the variable notch control B7 is described with reference to FIG. 46. This is to optimize the pressure change of each cylinder bore in correspondence with the discharges of the pump 24 and the motor 25 and the high pressure generated in the operation thereof. For example, an open and close control which is shown in the table of FIG. 47 is performed for the operation of the pump 24.

In this control flow, at first, the displacement volume Vp of the pump is determined from the skew angle α of the pump swash plate at Step K1. FIG. 48 shows the relation between the skew angle of the pump swash plate and the displacement volume of the pump, and it is calculated by Equation (2). Then, the discharge of the pump Qp (=Vp×Np) is calculated at Step K2. Here, Np is the rotational speed of the pump, and it is calculated by Equation (3) with the engine rotational speed Ne and the rotational speed of the wheels Nv, which values are detected with the respective sensors.

$$Vp = S \times PD \times \tan \alpha \times N \qquad (2)$$

Here, S is the sectional area of the cylinder bore; PD is the diameter of the pitch circle of the cylinders; and N is the number of cylinders.

$$Np = \{Ne - i1 \times i2 \times (1 + ip) \times Nv\}/ip \qquad (3)$$

Figure 49:
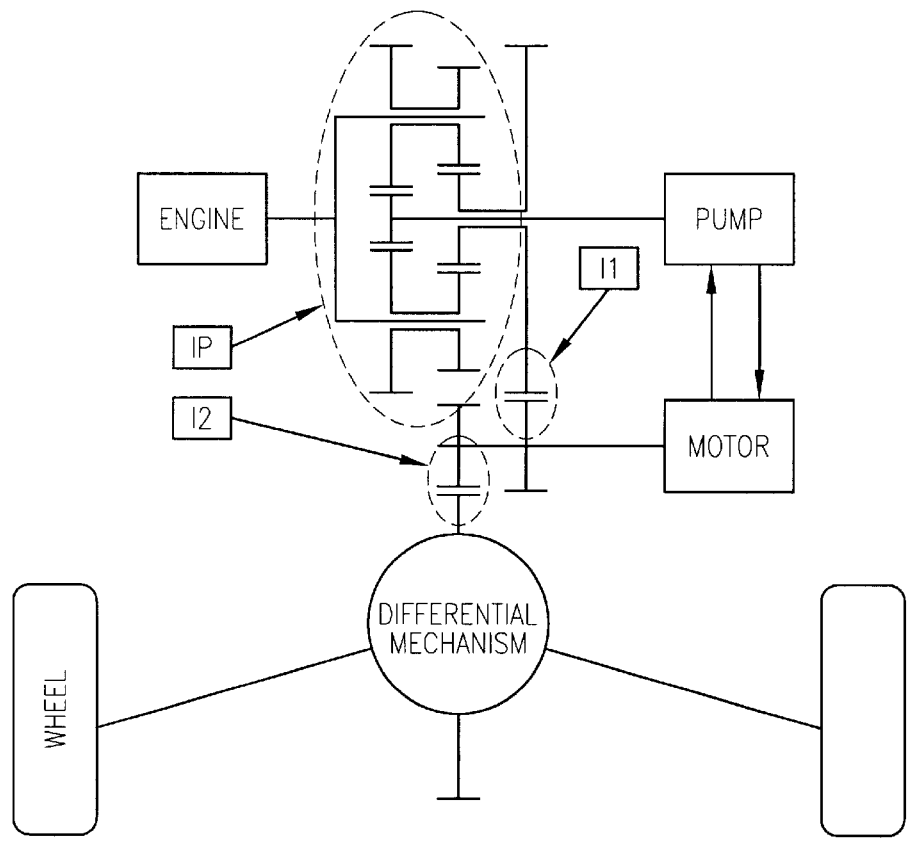
FIG. 49 is a skeleton diagram showing a power transmission system, which is applied to the vehicle equipped with the continuously variable transmission of the present invention.

Here, i1 is the reduction ratio of the power transmission mechanism 4; i2 is the reduction ratio of the final speed reduction mechanism 5; and ip is the reduction ratio of the power distribution mechanism 3 (refer to FIG. 49).

Then, a determination is made whether the discharge of the pump Qp is greater than a predetermined value Qp0 or not at Step K3. If the discharge is greater than the predetermined value (Qp>Qp0), then the control flow proceeds to Steps K7 and K8. However, if the discharge is equal to or less than the predetermined value (Qp≦Qp0), then another determination is made of the high pressure Ph generated in the oil passage which is at the higher pressure whether this high pressure is greater than a predetermined pressure Ph0 or not at Step K4. If it is so (Ph>Ph0), then the control flow proceeds to Steps K5 and K6. However, if the high pressure Ph is equal to or smaller than the predetermined pressure Ph0 (Ph≦Ph0), then the control flow proceeds to Steps K7 and K8. The control at Step K5 is to close the variable notch valves, so the solenoid valves 45 and 46 are turned ON at Step K6. On the other hand, the control at Step K7 is to open the variable notch valves, so the solenoid valves 45 and 46 are turned OFF at Step K8.

Figure 50:
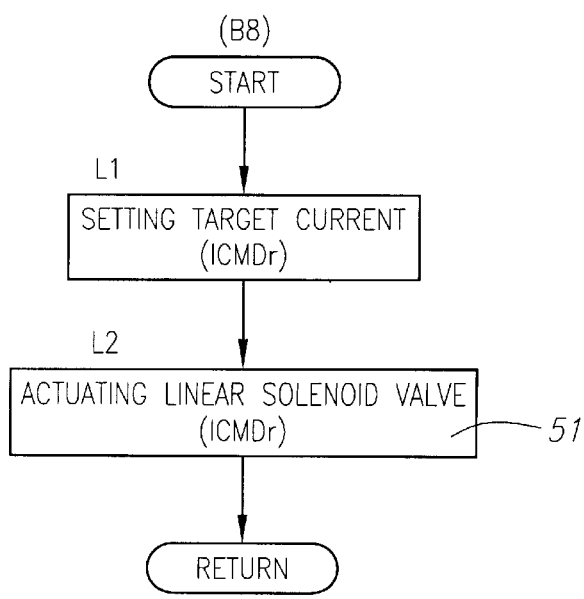
FIG. 50 is a subflow chart showing a regulator control process, which is part of the control flow shown in the main flow chart.

Now, the regulator control B8 is described with reference to FIG. 50. The line pressure PL, which is supplied from the regulator valve 60, is used for controlling the skew angles of the pump and motor swash plates. To swivel the swash plates, the higher the pressure of the oil passage which is at the higher pressure, the greater the actuation force required. For this reason, the line pressure PL can be set to a high pressure which can satisfy the actuation force necessary for controlling the swash plates even when the oil passage which is at the higher pressure has the maximum pressure. However, if the line pressure were increased in this way, then the loss of the engine's driving force would be great, and the fuel efficiency would be low because the line pressure PL must be maintained at the high pressure. To solve this problem, the regulator control B8 is performed to set a minimum required line pressure PL so as to improve the fuel efficiency.

Figure 51:
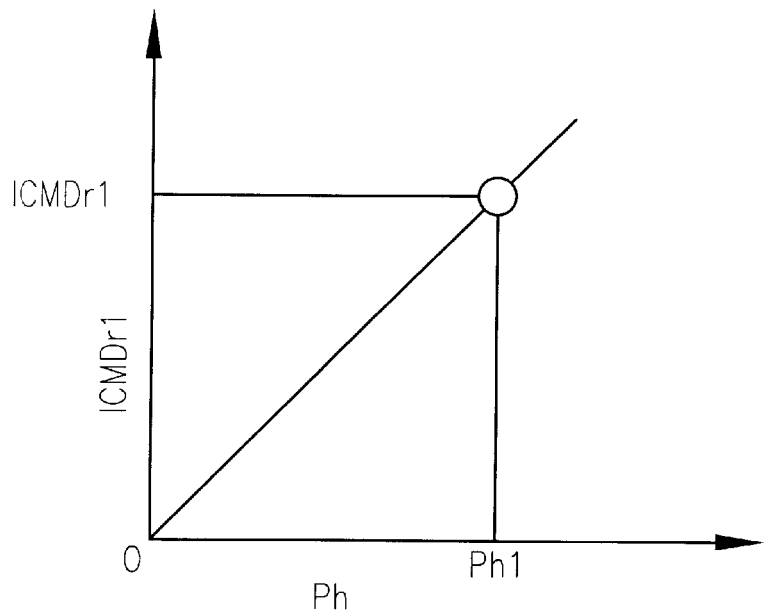
FIG. 51 is a graph showing a relation between the control current of the first linear solenoid valve and the pressure of an oil passage in higher pressure.
Figure 52:
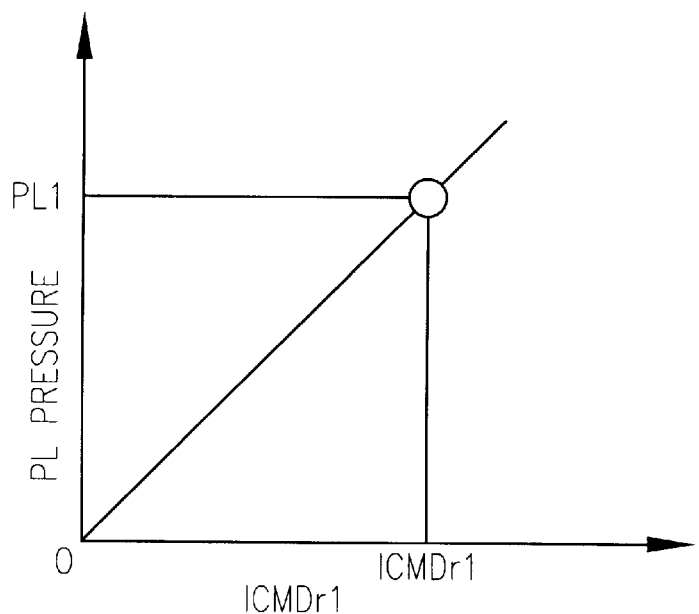
FIG. 52 is a graph showing a relation between the control current of the first linear solenoid valve and the line pressure PL.

In this control flow, a target current ICMDr is determined at Step L1 for the actuation of the first solenoid valve 51 in correspondence with the pressure Ph of the oil passage which is at the higher pressure as shown in FIG. 51. With this target current ICMDr, the first linear solenoid valve 51 is actuated at Step L2 to generate the minimum required line pressure PL as shown in FIG. 52. This minimum line pressure is effective in the presence of the pressure Ph of the oil passage which is at the higher pressure, thus improving the fuel efficiency.

If an abrupt braking operation is executed in the above operational control, then the skew angle control for the swash plates and the control of the high pressure relief are carried out differently from the controls which are described above. When the brake is operated quickly or abruptly, this abrupt braking operation is determined at Step B9 of the control flow as shown in FIG. 17. Then, after the flag set for the abrupt braking operation is determined as one (PBF=1) at Step C8, a feedback termination control is performed at Step B10. These controls are described in detail in the following.

Figure 53:
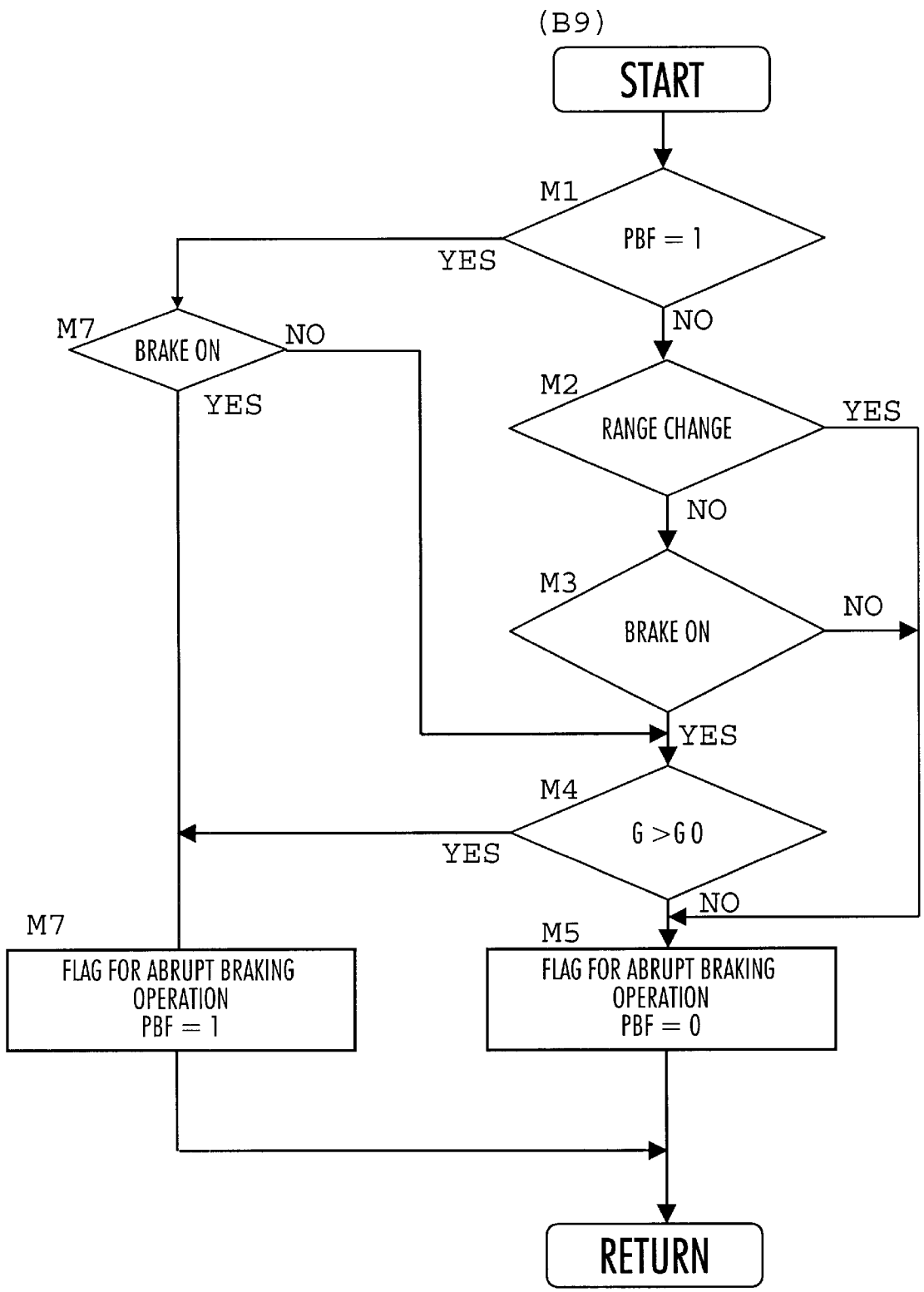
FIG. 53 is a flow chart showing a control flow for abrupt braking operation determination.

FIG. 53 shows the control flow for the determination whether there is an abrupt braking operation, which is executed at Step B9. In this control flow, at first, a determination is made of the flag which is set for an abrupt braking operation whether the value for this flag is one (PBF=1) or not at Step M1. Generally, the initial value for the flag is zero (PBF=0), so the control flow proceeds to Step M2, where a determination is made whether there is a change of drive range or not, i.e., whether the shift lever is operated or not. If there is a speed range change, then the control flow proceeds to Step M5, where the flag for abrupt braking operation is made to zero (PBF=0). If the shift lever is not operated, then the control flow proceeds to Step M3, where a determination is made whether the brake is operated or not. If the brake is OFF, then the control flow proceeds to Step M5, where the flag for abrupt braking operation is made to zero (PBF=0). However, if the brake is ON, then the control flow proceeds to Step M4, where a determination is made of the deceleration G of the vehicle whether it is greater than a standard deceleration G0 or not. If the vehicle deceleration is greater than the standard deceleration (G>G0), then the flag for abrupt braking operation is made to one (PBF=1) at Step M7. However, if the vehicle deceleration is equal to or less than the standard deceleration (G≦G0), then the flag for abrupt braking operation is made to zero (PBF=0) at Step M5.

It is clear from this control flow that the flag for abrupt braking operation is set to one (PBF=1) if the brake is operated and the deceleration of the vehicle is greater than the standard deceleration. In this case, this standard deceleration is set, for example, to a deceleration which is experienced with a braking operation that is as abrupt as to cause a of the wheels. With this value for the standard deceleration, the flag for abrupt braking operation is set to one (PBF=1) when the driver applies an abrupt braking or a panic braking. However, if the shift lever is operated, then the flag for abrupt braking operation is set to zero (PBF=0).

The reason is that the wheels are not locked up if the shift lever is operated even though a great deceleration can be created with the manipulation of the shift lever. The operation of the shift lever causes the target engine rotational speed to be set to a value totally different from the one which is set for the case where a complete closure of the accelerator may result from an braking operation. This latter condition is the problem which the present invention can solve, and when the shift lever is operated, this problem never happens.

After the flag for abrupt braking operation is set to one (PBF=1) in this way, the control flow returns to Step M1 and proceeds to Step M6, where a determination is made whether the brake is ON or not. If it is ON, then the control flow proceeds to Step M7, where the flag for abrupt braking operation is kept at one (PBF=1). On the other hand, if the brake turns OFF, then the control flow proceeds to Step M4, where a determination is made whether the vehicle deceleration G is greater than the standard deceleration G0 or not. If it is so (G>G0), then the flag for abrupt braking operation is made to one (PBF=1) at Step M7. However, if the vehicle deceleration is equal to or less than the standard deceleration (G≦G0), then the flag for abrupt braking operation is made to zero (PBF=0) at Step M5. In this way, the flag for abrupt braking operation is maintain at one (PBF=1) until the vehicle deceleration G becomes smaller than the standard deceleration G0 even though the brake has turned OFF.

However, this determination control may be also arranged in such a way that when the brake turns OFF, the control flow proceeds immediately to Step M5 to make the flag for abrupt braking operation to zero (PBF=0) notwithstanding the deceleration G of the vehicle.

Figure 17:
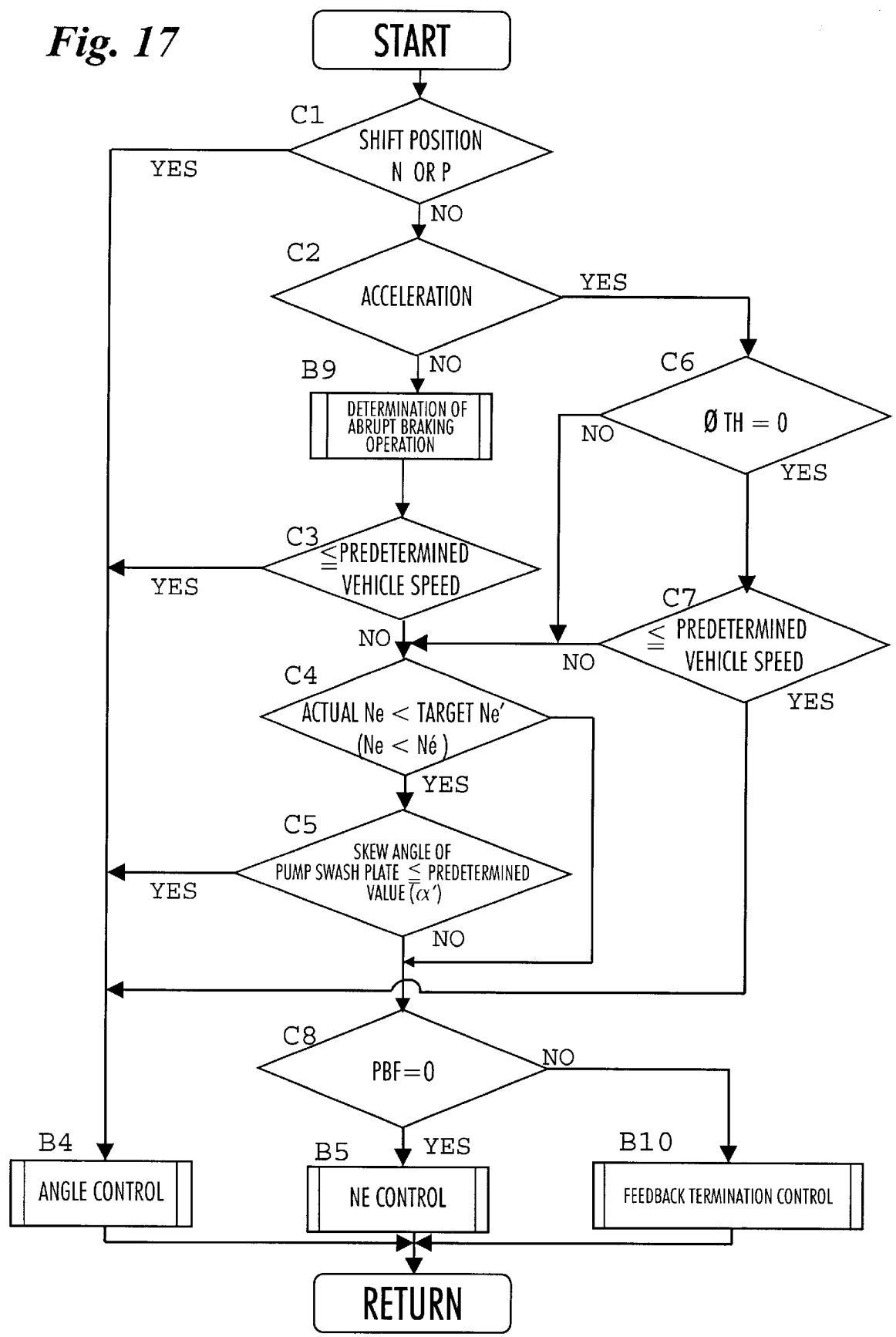
FIG. 17 is a subflow chart showing control determinations, which are part of the control flow shown in the main flow chart.
Figure 54:
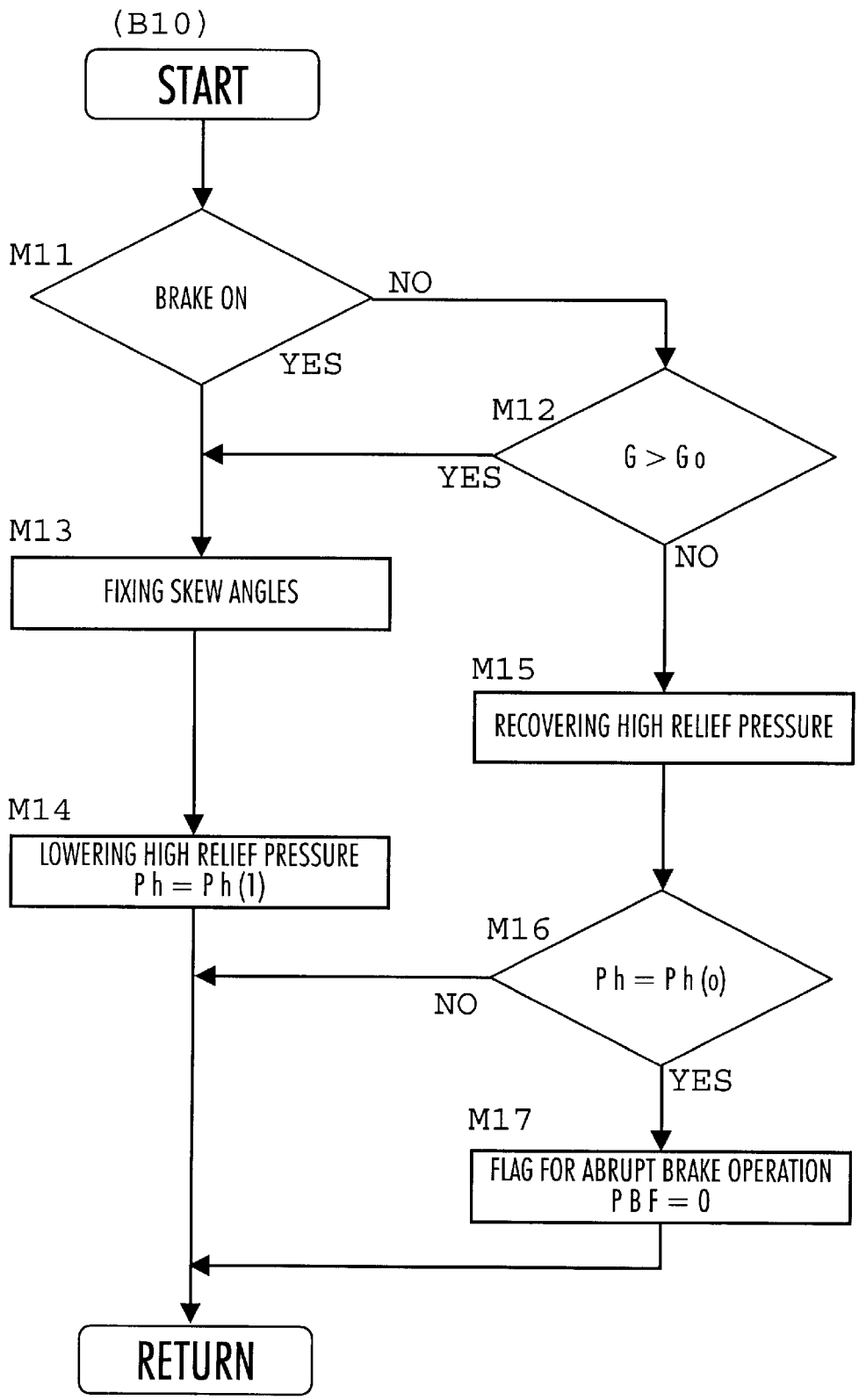
FIG. 54 is a flow chart showing a control flow for feedback termination.

In this abrupt braking operation determination, if the condition of the vehicle is determined as in an abrupt braking operation, i.e., the flag for abrupt braking operation is one (PBF=1), then the control flow proceeds from Step C8 in FIG. 17 to a feedback termination control B10, whose control flow is detailed in FIG. 54.

In this control, at first, a determination is made whether the brake is ON or not at Step M1. If it is ON, then a control is performed to fix the skew angles for the pump and motor swash plates at the current angles at Step M13, and the high relief pressure is decreased to a predetermined low pressure (Ph=Ph(1)) at Step M14. This is to terminate the feedback control, which is based on the target engine rotational speed, and to terminate the power transmission through the hydraulic closed circuit while retaining the skew angles (i.e., the speed change ratio) at the time, constant. Or instead of maintaining the speed change ratio constant after the termination, the speed change ratio may be controlled to shift toward the TOP gradually.

The predetermined low pressure Ph(1), which is set at Step M14, is higher than the low relief pressure, which is set by the low pressure relief valve 74 (refer to FIG. 3). In this condition, the relation between the oil passage at a higher pressure and the oil passage at a lower pressure of the first and second oil passages 26a and 26b is maintained without being reversed, and also the position of the shuttle valve 70 is maintained without being reversed so that the hydraulic control of the oil passage at a higher pressure can be continued.

Figure 56:
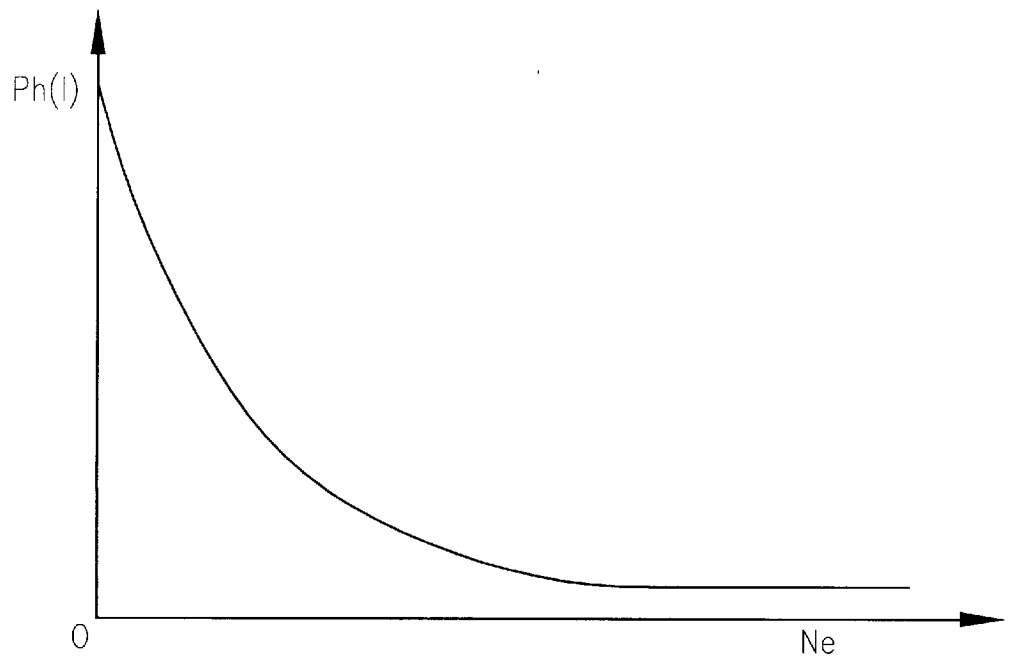
FIG. 56 is a graph showing a relation between the engine rotational speed and the high relief pressure Ph(1), which is set for the feedback termination control.

Furthermore, the predetermined low pressure Ph(1) is determined in reverse proportion to the engine rotational speed Ne as shown in FIG. 56, and the higher the engine rotational speed Ne, the lower the predetermined low pressure Ph(1). In consideration of the general condition that the engine torque is relatively large while the engine rotational speed is low but it becomes smaller as the engine rotational speed increases, there is no problem of engine stall even if the above predetermined low pressure Ph(1) is set to a relatively high value while the engine rotational speed is low and the engine torque is large. Therefore, the predetermined low pressure Ph(1) is set to as high a pressure as possible which will not cause an engine stall, so as to enable smooth recovery of the high relief pressure after the release of the brake.

After the start of the feedback termination control, if the braking operation is terminated (i.e., the brake turns OFF), then the control flow proceeds from Step M11 to Step M12, where a determination is made of the deceleration G of the vehicle whether it is smaller than a standard deceleration G0 or not. If the vehicle deceleration is greater than the standard deceleration (G>G0), then the skew angles of the swash plates are fixed at Step M13, and the high relief pressure is lowered at Step M14. However, if the vehicle deceleration is equal to or less than the standard deceleration (G≦G0), then the control flow proceeds to Step M15, where the high relief pressure Ph is increased to the original relief pressure Ph(0) gradually. When the high relief pressure Ph reaches the original high relief pressure Ph(0), the control flow proceeds from Step M16 to Step M17 to make the flag for abrupt braking operation to zero (PBF=0). Thereafter, the operational control returns to the general swash plate and high relief pressure controls.

However, it is preferable that this control flow be rearranged in such a way that the swash plate control can start before the high relief pressure Ph reaches the original high relief pressure Ph(0). In this way, the return of the control will be more smooth when the high relief pressure Ph reaches the original pressure because the swash plates will have achieved the skew angles which are desirable for the target engine rotational speed and the speed of the vehicle. The return to the general swash plate control may be timed to the start of the control which increases the high relief pressure to the original pressure (i.e., to the start of Step M15), or it may be executed some time after the start of the control for recovery of the high relief pressure.

Figure 55:
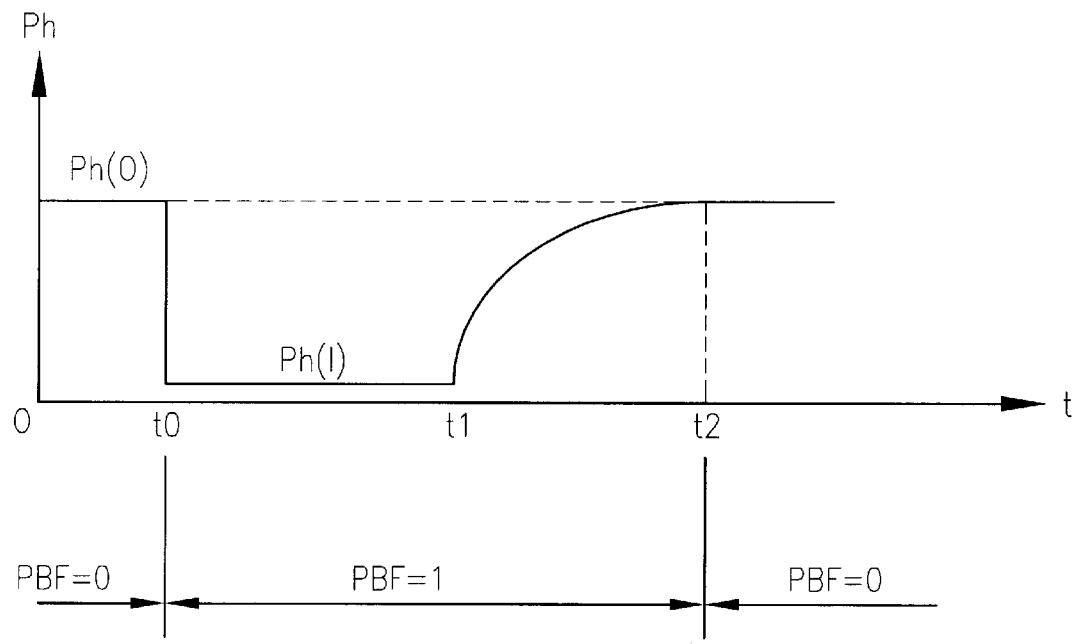
FIG. 55 is a graph showing the chronological changes of the high relief pressure while the feedback termination control is carried out.

FIG. 55 shows the chronological changes of the high relief pressure Ph during the feedback termination control. In the figure, the flag for abrupt braking operation is set to one (PBF=1) at Time t0, and in response to this, the high relief pressure Ph is decreased to the predetermined low pressure (Ph=Ph(1)). Thereafter, the brake is turned OFF, and the deceleration becomes equal to or smaller than the standard deceleration (G≦G0) at Time t1. As shown in the figure, the high relief pressure Ph is increased gradually to the original high relief pressure Ph(0). In this recovery of the high relief pressure, the rate of pressure increase is controlled in proportion to the deviation of the actual high relief pressure Ph from the original high relief pressure Ph(0). The rate of pressure increase is great in the initial stage as the deviation is large, and the rate of pressure increase becomes smaller as the deviation becomes smaller. Thus, the pressure increase is rapid at first, and then it becomes gradual as the pressure comes close to the original pressure. When the high relief pressure returns to the original pressure at Time t2, the flag for abrupt braking operation is switched to zero (PBF=0).

With this feedback termination control, there will be no engine racing or shock when the accelerator pedal is stepped down after releasing the brake pedal which was operated in an panic or abrupt braking, because the speed change ratio has been maintained at the original value (or to a value toward the TOP). As the high relief pressure is lowered to establish a neutral condition so as to cut off the power transmission between the pump and the motor when an abrupt braking operation is carried out, there will be no engine stall even if the wheels are locked up by this abrupt braking operation.

Furthermore, as the high relief pressure is increased gradually to the original pressure when the operational control returns from the feedback termination control to the original ordinary control, this shift of control is carried out smoothly without any shock. As mentioned previously, the predetermined low pressure Ph(1), to which the high relief pressure is lowered in response to an abrupt braking operation, is set to as high a pressure as possible so that the engine is prevented from stalling. In addition, the difference between the predetermined low pressure Ph(1) and the original high relief pressure Ph(0) is made as small as possible so that the return or increase to the original pressure is performed smoothly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.9-137847 filed on May 12, 1997, which is incorporated herein by reference.

What is claimed is:

1. A hydraulic continuously variable transmission for use on a vehicle, comprising a hydraulic pump and a hydraulic motor, at least one of which is a variable displacement type, said hydraulic pump which is driven by an engine delivering oil that actuates said hydraulic motor, which in turn drives the vehicle;

said transmission further comprising:
   a hydraulic closed circuit which comprises a first oil passage connecting a port of said hydraulic pump with a port of said hydraulic motor and a second oil passage connecting another port of said hydraulic pump with another port of said hydraulic motor;
   first pressure controlling means, which controls pressure in said first oil passage;
   second pressure controlling means, which controls pressure in said second oil passage;
   brake operation detecting means, which detects operation of a brake; and
   deceleration detecting means, which detects deceleration of the vehicle;
   wherein:
      when said brake operation detecting means detects the operation of the brake and said deceleration detecting means detects a deceleration of the vehicle which is greater than a predetermined value, either said first pressure controlling means or said second pressure controlling means lowers one of the pressures of said first oil passage and said second oil passage which has a higher pressure than the other oil passage to a predetermined pressure; said predetermined pressure being higher than the pressure of said other oil passage.

2. The continuously variable transmission as set forth in claim 1 wherein:
   said predetermined pressure corresponds to said engine's rotational speed and is so set as to be lowered as said engine rotational speed increases.

3. The continuously variable transmission as set forth in claim 1 further comprising:

shift determination means which detects a shift position change;

wherein:

only while said shift determination means detects no shift position change either said first pressure controlling means or said second pressure controlling means lower one of the pressures of said first oil passage and said second oil passage which has a higher pressure than the other oil passage to a predetermined pressure.

4. The continuously variable transmission as set forth in claim 1 wherein:

once said one of the pressures is lowered to said predetermined pressure, said predetermined pressure is held as long as said brake operation detecting means is detecting the operation of the brake.

5. The continuously variable transmission as set forth in claim 4 wherein:

once said one of the pressures is lowered to said predetermined pressure, said predetermined pressure is held until said brake operation detecting means detects that said brake has been released and said deceleration detecting means detects that the deceleration of the vehicle has become smaller than said predetermined value.

6. The continuously variable transmission as set forth in claim 4 or 5 wherein:

when said one of the pressures is returned to its original pressure, one of said first pressure controlling means and said second pressure controlling means controls said one of the pressures so as to gradually increase to said original pressure.

7. The continuously variable transmission as set forth in claim 1 wherein:

capacities of said at least one of said hydraulic pump and said hydraulic motor, which is of the variable displacement type, is maintained unchanged while said one of the pressures is being lowered to said predetermined pressure.

8. The continuously variable transmission as set forth in claim 1 wherein:

after said one of the pressures lowered to said predetermined pressure, capacities of said at least one of said hydraulic pump and said hydraulic motor, which is of the variable displacement type, is so controlled to gradually shift the speed ratio toward TOP.

9. A method of controlling a hydraulic continuously variable transmission in a vehicle during braking of the vehicle, which transmission includes a hydraulic pump and a hydraulic motor connected by a hydraulic closed circuit having a first oil passage and a second oil passage separately connecting separate ports of the hydraulic pump and the hydraulic motor, comprising the steps of:

detecting a braking operation of the vehicle;

detecting a deceleration of the vehicle greater than a predetermined value; and lowering the pressure of one of the first oil passage and the second oil passage which has a higher pressure than the other oil passage to a predetermined pressure when said braking operation and said deceleration are detected; said predetermined pressure being controlled to a pressure higher than the pressure of said other oil passage.

10. The method as set forth in claim 9 wherein:

said predetermined pressure corresponds to the rotational speed of the engine of the vehicle and is so set as to be lowered as said engine rotational speed increases.

11. The method as set forth in claim 9 further including the step of determining a shift position change; and only lowering the pressure in the one of said first oil passage and said second oil passage which has a higher pressure than the other oil passage to a predetermined pressure when there is a determination that no shift position change is occurring.

12. The method as set forth in claim 9 wherein, once said one of the pressures is lowered to said predetermined pressure, said predetermined pressure is held as long as said braking operation is detected.

13. The method as set forth in claim 9 wherein, once said one of the pressures is lowered to said predetermined pressure, said predetermined pressure is held until said brake operation is released and said deceleration of the vehicle has become smaller than said predetermined value.

14. The method as set forth in claim 12 or 13 wherein, when said lowered predetermined pressure is discontinued, said one of the pressures is gradually increased to the original pressure in that oil passage.

15. The method as set forth in claim 9 wherein at least one of said hydraulic pump and said hydraulic motor is of a variable displacement type, the capacity of the at least one of said hydraulic pump and said hydraulic motor being of the variable displacement type is maintained unchanged while said one of the pressure is being lowered to said predetermined pressure.

16. The method as set forth in claim 9 wherein at least one of said hydraulic motor is of a variable displacement type, and wherein, after said one of the pressure is lowered to said predetermined pressure, the capacity of the at least one of said hydraulic pump and said hydraulic motor being of the variable displacement type is controlled to gradually shift the speed ratio toward TOP.

* * * * *